United States Patent
Yamasaki

(10) Patent No.: US 7,286,753 B2
(45) Date of Patent: Oct. 23, 2007

(54) IMAGE CAPTURING APPARATUS

(75) Inventor: Masafumi Yamasaki, Tokyo (JP)

(73) Assignee: Olympus Corporation (JP)

( * ) Notice: Subject to any disclaimer, the term of this patent is extended or adjusted under 35 U.S.C. 154(b) by 257 days.

(21) Appl. No.: 11/073,387

(22) Filed: Mar. 4, 2005

(65) Prior Publication Data

US 2005/0195277 A1   Sep. 8, 2005

(30) Foreign Application Priority Data

Mar. 4, 2004   (JP)   .............................. 2004-061437

(51) Int. Cl.
*G03B 17/00* (2006.01)
*G03B 17/24* (2006.01)

(52) U.S. Cl. .......................... 396/51; 396/310; 348/61

(58) Field of Classification Search ................. 396/51, 396/52–53, 310–311; 348/61, 78
See application file for complete search history.

(56) References Cited

U.S. PATENT DOCUMENTS

| | | | | |
|---|---|---|---|---|
| 4,017,168 A | * | 4/1977 | Brown | ........................ 352/243 |
| 5,815,741 A | * | 9/1998 | Okuyama et al. | ............. 396/51 |
| 6,104,431 A | * | 8/2000 | Inoue et al. | ........... 348/333.01 |
| 6,558,050 B1 | * | 5/2003 | Ishibashi | ..................... 396/420 |
| 6,628,898 B2 | * | 9/2003 | Endo | ........................... 396/51 |
| 2003/0235411 A1 | * | 12/2003 | Morikawa et al. | .......... 396/281 |

FOREIGN PATENT DOCUMENTS

| | | |
|---|---|---|
| JP | 09-130732 | 5/1997 |
| JP | 2001-281520 | 10/2001 |

* cited by examiner

*Primary Examiner*—Christopher Mahoney
(74) *Attorney, Agent, or Firm*—Ostrolenk, Faber, Gerb & Soffen, LLP

(57) ABSTRACT

An image capturing apparatus includes an image capturing device for generating image data, a line-of-sight-direction/angular velocity detecting portion for detecting biological information, such as the direction of a line of sight of a photographer or the angular velocity of the head of the photographer, when the photographer observes a subject, and a controller/recorder. Among those elements, the image capturing device and the line-of-sight-direction/angular-velocity detecting portion are worn on the head of the photographer. The controller/recorder records, in a recording memory, the image data and the biological information in association with each other together with time information concerning a time at which the image data is obtained and a time at which the biological information is obtained. Then, based on the recorded biological information, the recorded image data is edited.

8 Claims, 34 Drawing Sheets

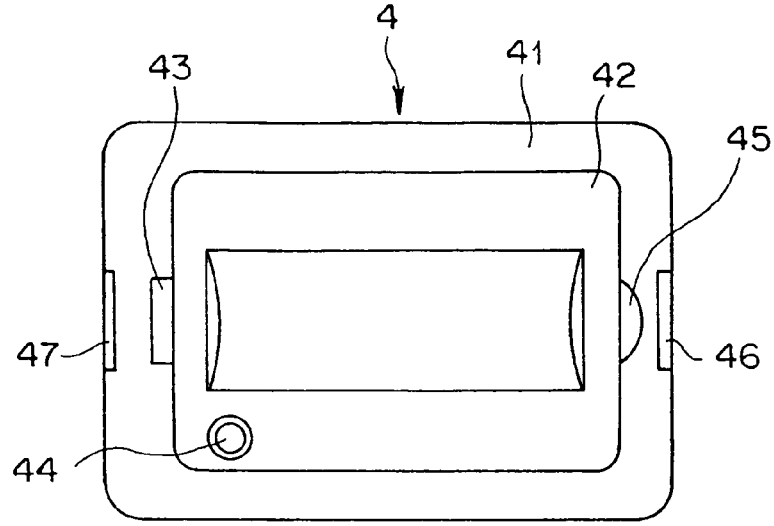
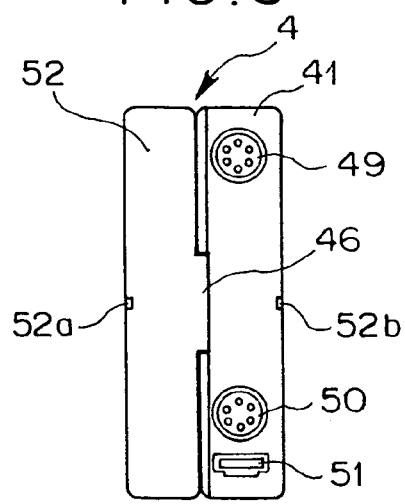
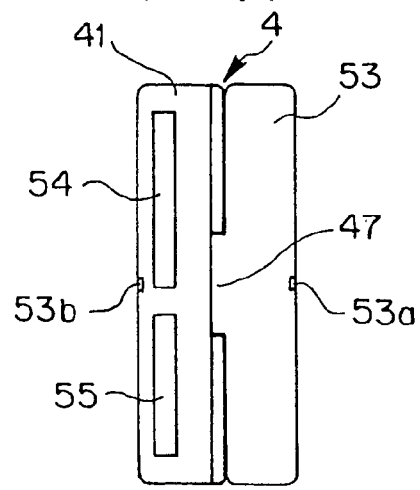

FIG.44

| MOVING-PICTURE DATA MANAGEMENT AREA |
|---|
| FILE NAME : ...... <br> FLG : ...... <br> START TIME : ...... <br> END TIME : ...... <br> UNIT SIZE : ...... <br> UNIT 1 :     ADR (A), ADR (B), ADR (C), ADR (D) <br> UNIT 2 : ...... <br> UNIT 3 : ...... <br> ⋮ <br> FILE NAME : ...... <br> ⋮ |

FIG.45

| FILE | PHOTOGRAPHING DATE | PHOTOGRAPHING TIME | EDITING |
|---|---|---|---|
| NO. 1 : | JANUARY 5, 2004 | 10:00~10:30 | NOT EDITED |
| NO. 2 : | JANUARY 5, 2004 | 11:00~11:20 | NOT EDITED |
| NO. 3 : | JANUARY 5, 2004 | 14:00~15:00 | EDITED |
| ⋮ | ⋮ | ⋮ | ⋮ |

FIG.46

| EDITED MOVING-PICTURE DATA MANAGEMENT AREA |
|---|
| FILE NAME : ...... <br> START TIME : ...... <br> END TIME : ...... <br> PHOTOGRAPHING TIME : ...... <br> RECORDING AREA : ...... <br> ⋮ |

IMAGE CAPTURING APPARATUS

This application claims benefit of Japanese Application No. 2004-61437 filed in Japan on Mar. 4, 2004, the contents of which are incorporated by this reference.

BACKGROUND OF THE INVENTION

1. Field of the Invention

The present invention relates to image capturing apparatuses, and more particularly, to an image capturing apparatus worn on the head of a photographer.

2. Description of the Related Art

Hitherto, image capturing apparatuses, such as video cameras and digital cameras, are widely used for capturing subject images.

When performing a photographing operation by using a known image capturing apparatus, a photographer has to perform, for example, a zooming operation, while checking a subject via a camera finder with the camera in hand. Accordingly, the photographer has to concentrate on the photographing operation, and when performing photographing at various events, such as sporting events or festivals, he/she cannot participate in them. Particularly for video cameras that require the photographer to perform a photographing operation at very short intervals, it is more difficult for him/her to participate in events than when using digital cameras for photographing still images.

Image capturing apparatuses that are worn on the head of a photographer are known. As this type of device, for example, Japanese Unexamined Patent Application Publication No. 2001-281520, discloses the following type of optical device. A line-of-sight detection sensor is disposed near an eyeball of a user to detect the condition of the eyeball. Then, based on the detection results, the focus adjustment, zoom control, rotation control for lenses based on the line of sight can be performed. In particular, for the rotation control for lenses, the camera itself is moved based on the line-of-sight information so that the photographing direction matches the line of sight. That publication also discloses a technique for performing zoom control based on the movement of the crystalline lens of an eyeball of the user.

Image editing devices for performing predetermined editing processing on photographed images have also been proposed.

For example, Japanese Unexamined Patent Application Publication No. 9-130732 discloses a moving-picture editing device that can handle different scene changes. In this device, each frame image which forms an input video signal is compared with the adjacent frame image, and a comparison result is detected as a change in the image. When the degree of change exceeds a predetermined threshold, it is determined that a scene change, which is the switching of scenes, has occurred. In this case, based on the continuity of the degree of change, a determination is further made as to whether the scene change is instantaneous switching of scenes or gradual switching of scenes. When it is determined that the scene change is instantaneous switching of scenes, the point at which the scene change has occurred is detected as an instantaneous scene change. When it is determined that the scene change is gradual switching of scenes, a period from the point at which the scene change has occurred to the point at which the change of the image has stabilized is detected as a period of a gradual scene change. This moving-picture editing device edits moving pictures while handling both the instantaneous scene change and the gradual scene change.

In the configuration disclosed in Japanese Unexamined Patent Application Publication No. 2001-281520, the camera itself is moved so that the photographing direction matches the line of sight. This makes the rotation mechanism of the camera large and heavy, which is not suitable for an image capturing apparatus worn on the head. It is also difficult to perform precise control due to the complexity of the adjustment between the visual axis and the optical axis of the camera. Additionally, the zoom control based on the movement of the crystalline lens of the eyeball does not always reflect the user's intention. That is, from the movement of the crystalline lens, only focus information (information concerning the distance to a subject) can be obtained, and even when the user looks a distant place, it does not always mean that he/she wishes to zoom the distant place.

In the technique disclosed in Japanese Unexamined Patent Application Publication No. 9-130732, the image editing processing is not performed based on the photographer's intention or based on the movement of the photographer. Thus, editing results do not always satisfy the photographer. Additionally, it takes time to perform editing processing since the degree of change is detected for all frame images.

SUMMARY OF THE INVENTION

Accordingly, it is an object of the present invention to provide an image capturing apparatus with a simple structure in which editing processing reflecting a photographer's intention can be performed after a photographing operation.

To achieve the above-described object, the present invention provides an image capturing apparatus including: an image capturing portion (sometimes referred to interchangeably herein as "capturing means") configured to be worn on the head of the photographer, for generating image data a biological-information detector (sometimes referred to interchangeably herein as "detecting means") configured to be worn on the head of the photographer, for detecting biological information concerning a movement of the photographer when the photographer observes a subject, the biological information being used for performing editing processing on the image data; an image-data recorder to record (sometimes referred to interchangeably herein as "recording means") the image data in association with time information concerning a time at which the image data is generated; and a biological-information recorder to record the biological information in association with the time information concerning the time at which the image data is generated.

The above and other objects, features, and advantages of the invention will become more clearly understood from the following description referring to the accompanying drawings.

BRIEF DESCRIPTION OF THE DRAWINGS

FIG. 5 is a plan view illustrating a controller/recorder when an operation panel is closed in the same embodiment;

FIG. 6 is a right side view illustrating the controller/recorder when the operation panel is closed in the same embodiment;

FIG. 7 is a left side view illustrating the controller/recorder when the operation panel is closed in the same embodiment;

FIG. 44 illustrates a detailed configuration of a moving-picture data management area in the same embodiment;

FIG. 45 illustrates an example of information obtained by referring to the moving-picture data management area in the same embodiment;

FIG. 46 illustrates a detailed configuration of an edited moving-picture data management area in the same embodiment;

DETAILED DESCRIPTION OF THE PREFERRED EMBODIMENTS

The present invention is described in detail below with reference to the accompanying drawings through illustration of a preferred embodiment.

A head-mounted camera (hereinafter simply referred to as the "camera") 1 shown in FIG. 1 according to an embodiment of the present invention serves as an image capturing apparatus in terms of an image capturing function and also serves as an image playback device in terms of an image playback function. The camera 1 is also used as a head-mounted display device with a safety function, which is described below. The camera 1 also has an image editing function and thus serves as an image editing device.

The image playback device can be applied to an image playback method and an image playback program. By recording the image playback program on a recording medium, the recording medium recording the image playback program thereon can be implemented.

Similarly, the image editing device can be applied to an image editing method and an image editing program. By recording the image editing program on a recording medium, the recording medium recording the image editing program thereon can be implemented.

Figure 1:
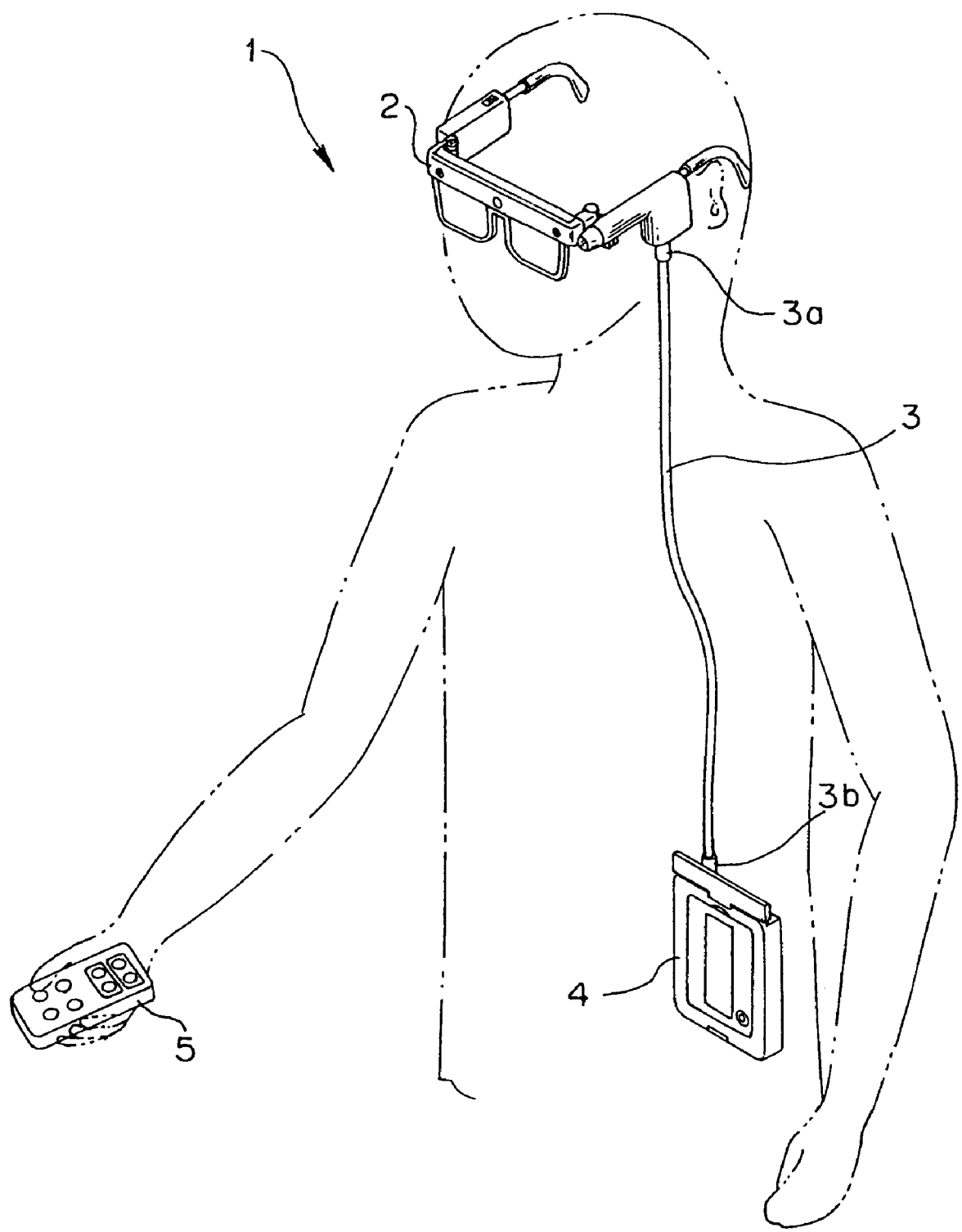
FIG. 1 is a perspective view illustrating a state in which a head-mounted camera constructed in accordance with an embodiment of the present invention is used.

The camera 1 includes, as shown in FIG. 1, a head-mounted unit 2 formed substantially in the shape of a pair of spectacles, a controller/recorder 4, which serves as the main body of the camera 1, connected to the head-mounted unit 2 via connecting means, such as a cable 3, and a remote controller 5 for remotely performing input operations for the camera 1.

The head-mounted unit 2 allows a user to observe a subject substantially directly in a see-through display mode and also to capture an image of the subject. The head-mounted unit 2 can be worn on the head in a manner similar to ordinary eyesight-correcting spectacles, as is seen from the shape of the head-mounted unit 2. The head-mounted unit 2 is light and small so that the weight and the size thereof can be as close as possible to those of actual spectacles.

A connecting terminal 3a provided at one end of the cable 3 is connected to a cable connecting terminal 32 (see FIG. 2) of the head-mounted unit 2, and a connecting terminal 3b provided at the other end of the cable 3 is connected to a cable connecting terminal 49 (see FIG. 6) of the controller/recorder 4, thereby connecting the head-mounted unit 2 with the controller/recorder 4. As means for electrically connecting the head-mounted unit 2 with the controller/recorder 4, although wired means such as the cable 3 is used, wireless means for wirelessly connecting the two elements may be used.

The controller/recorder 4 serves as image-data recording means, biological-information recording means, processing means, parallax correction means, computation means, safety means, relative-velocity detecting means, relative-velocity/relative-distance detecting means, walking detecting means, cornea-reflected-light detecting means, area setting means, minimum-value detecting means, pupil detecting means, and line-of-sight-direction computation means. The controller/recorder 4 controls the entire camera 1, and also serves as an image editing device for recording images captured by the head-mounted unit 2 and for editing the recorded images. The controller/recorder 4 is also formed to be as light and small as possible so that it can be used under various conditions. For example, it can be attached to a belt at the user's waist or it can be stored in an inner pocket of a jacket. The controller/recorder 4 can also be stored in a bag by using a long cable 3.

The remote controller 5 allows a photographer to remotely control with a photographer's hand, operations that are comparatively frequently performed, such as controlling the see-through display operation and photographing operations performed by the head-mounted unit 2. Accordingly, the remote controller 5 is formed to be light and small so that it can be held in the palm of the hand, and wirelessly communicates with the controller/recorder 4.

In this embodiment, the head-mounted unit 2, the controller/recorder 4, and the remote controller 5 are separately provided from each other. This makes the user comfortable when wearing the head-mounted unit 2, which is formed light and small, and also allows the user to easily operate this camera 1 by using the remote controller 5.

Figure 2:
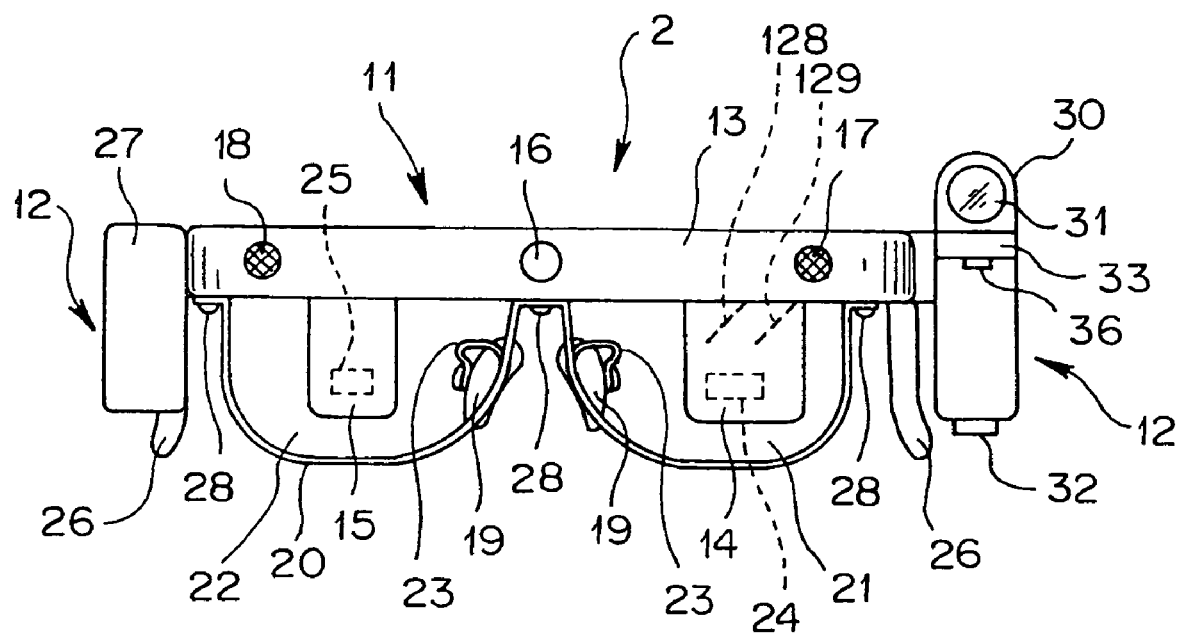
FIG. 2 is a front view illustrating the head-mounted camera in the same embodiment.
Figure 3:
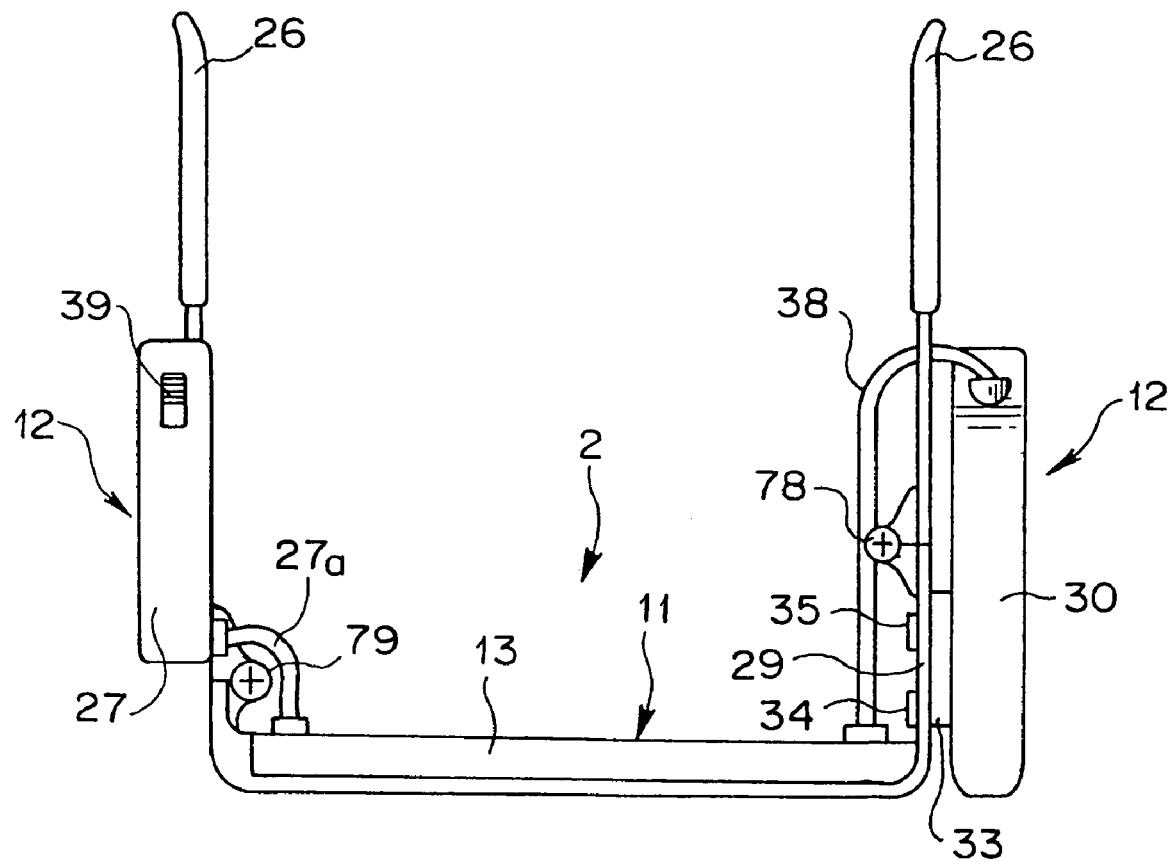
FIG. 3 is a plan view illustrating the head-mounted camera in the same embodiment.
Figure 4:
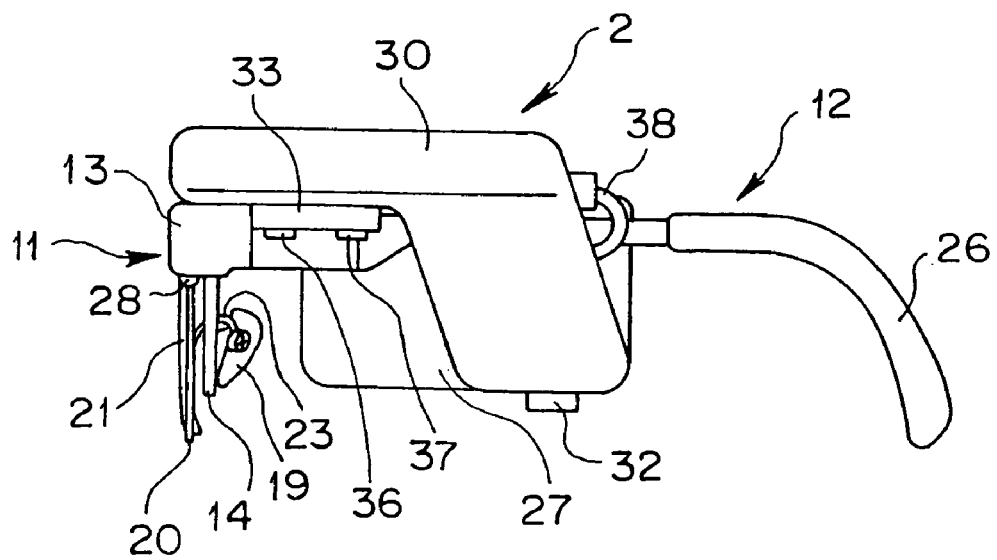
FIG. 4 is a right side view illustrating the head-mounted camera in the same embodiment.

The external appearance and the overview of the head-mounted unit 2 are described below with reference to FIGS. 2 through 4. FIGS. 2, 3, and 4 are a front view, a plan view, and a right side view, respectively, illustrating the head-mounted unit 2.

The head-mounted unit 2 includes a front portion 11 corresponding to lens, rims, a bridge, and joint portions of regular spectacles and temples 12 extended from the left and right sides of the front portion 11 in the backward direction (opposite to the subject) and foldable with respect to the front portion 11.

The front portion 11 includes a frame 13, which serves as support means, integrating part of an optical system for displaying images, part of an optical system for detecting the direction of the line of sight, and electric circuits.

The frame 13 is provided substantially at the center with a projector light-emitting portion 16, which serves as distance measurement means used for measuring the distance to a subject. The frame 13 is also provided at the left and right ends with a first microphone 17 and a second microphone 18 for collecting stereo sound from a subject.

Transparent optical members 14 and 15, which serve as optical waveguide members, are attached to the frame 13 in association with the left and right eyes. Between the transparent optical members 14 and 15, the transparent optical member 14 is used for detecting the direction of the line of sight, which is described below, while the transparent optical member 15 is used for displaying images, which is described below. The transparent optical members 14 and 15 are formed to be minimal sizes required for fulfilling the corresponding functions.

On the transparent optical member 14, a holographic optical element (HOE) 24, a half mirror 128, and a HOE 129 are disposed. On the transparent optical member 15, a HOE 25, which serves as a combiner, is disposed. Details of the individual optical systems are described below.

Eyesight-correcting lenses 21 and 22 are detachably attached to the frame 13 such that they are positioned on the transparent optical members 14 and 15 at the side of a subject.

More specifically, a rim 20, which serves as fixing means, for fixing the lenses 21 and 22 is attached to the frame 13 with bises 28 at the central portion, at the left side of the left-eye portion, and at the right side of the right-eye portion.

A pair of nose pads 19 for placing the head-mounted unit 2 on the ridge of the nose is provided for the rim 20 via a pair of cringles 23.

With this configuration, the bises 28 can be unscrewed to easily remove the rim 20 and the lenses 21 and 22. The lenses 21 and 22 can be replaced by a new pair having a different eyesight level, and the new pair can be fixed.

If the rim 20 is formed of a material having a predetermined level of elasticity, one bis 28 can be unscrewed or loosened so that only one of the left-eye lens 21 and the right-eye lens 22 can be selectively (independently) detached.

As described above, the camera 1 is a head-mounted camera with eyesight-correcting lenses, and also serves as a head-mounted display device with eyesight-correcting lenses in terms of an image display function.

As the eyesight-correcting lenses 21 and 22, regular spectacle lenses may be used, thus inexpensively formed.

Although in this embodiment the eyesight-correcting lenses 21 and 22 are disposed on the transparent optical members 14 and 15 at the side of a subject, they may be disposed on the rear surface (closer to the eyes) of the transparent optical members 14 and 15.

An image capturing device 30, which serves as image capturing means for capturing an image of a subject and as distance measurement means, is fixed to a joint portion 29 via a base 33 at the lateral surface of the frame 13 at the side of the left eye (i.e., the right side in FIG. 2 or 3) such that the photographing direction is adjustable.

The base 33 is attached to the joint portion 29 with bises 34 and 35, and the image capturing device 30 is mounted on the base 33 with bises 36 and 37. The relative angle of the image capturing device 30 with respect to the front portion 11 can be adjusted via the base 33 so that the optical axis of a photographing optical system 31 (see also FIG. 31) contained in the image capturing device 30 and the visual axis can be adjusted. The adjustment of the mounting position of the image capturing device 30 is described below with reference to FIGS. 19A, 19B, and 20.

The cable connecting terminal 32 to be connected to the connecting terminal 3a at one end of the cable 3 is disposed on the lower edge of the image capturing device 30.

A cable 38 is extended from the rear surface of the image capturing device 30, and is laid under the left-eye temple 12, and is then connected to the frame 13. With this configuration, an electric circuit within the frame 13 and an electric circuit within the image capturing device 30 can be connected to each other.

The temples 12 are connected to the front portion 11 via hinges 78 and 79 so that they are foldable with respect to the front portion 11. That is, the temples 12 can be folded toward the central portion of the front portion 11 i.e., they can be folded along the front portion 11, thereby making the head-mounted unit 2 easy to store and carry. End covers 26 for placing the head-mounted unit 2 on the ears are provided at the tip ends of the left and right temples 12.

A storage portion 27 for storing various electronic circuits, such as angular velocity sensors 141 and 142 (see FIG. 11), which are described below, for the head-mounted unit 2 is provided at the right-eye temple 12. A switch, which serves as safety operation means, for forcefully prohibiting images from being displayed in a see-through manner, is disposed on the top surface of the storage portion 27 such that it can be operated externally. A cable 27a is extended from the storage portion 27, and is connected to the circuits within the frame 13, and is further connected to the circuits within the controller/recorder 4 via the circuits within the image capturing device 30.

Figure 8:
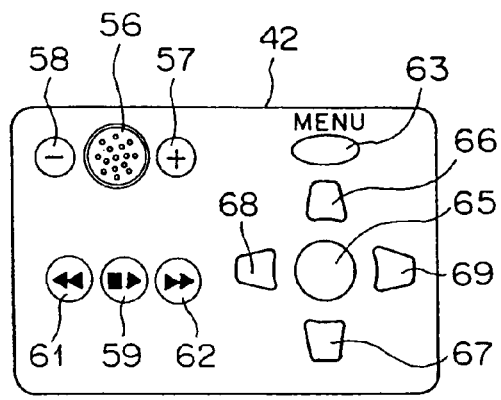
FIG. 8 is a plan view illustrating operation switches disposed on the operation panel in the same embodiment.
Figure 9:
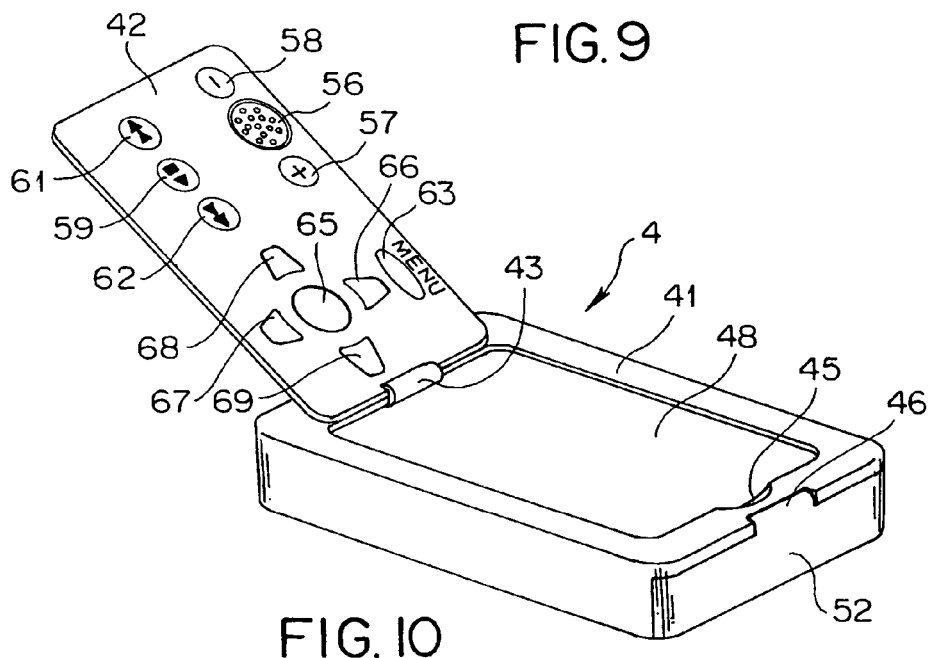
FIG. 9 is a perspective view illustrating the controller/recorder when the operation panel is opened in the same embodiment.

The external appearance and the overview of the controller/recorder 4 are described below with reference to FIGS. 5 through 9. FIGS. 5, 6, and 7 are a plan view, a right side view, and a left side view, respectively, illustrating the controller/recorder 4 when an operation panel is closed. FIG. 8 is a plan view illustrating operation switches disposed on the operation panel. FIG. 9 is a perspective view illustrating the controller/recorder 4 when the operation panel is opened.

The controller/recorder 4 is formed of a controller/recorder main unit 41 and the operation panel 42 provided for the controller/recorder main unit 41 via a hinge 43 so that it can be opened and closed.

The controller/recorder main unit 41 has built-in circuits, which are described below, and also includes a liquid crystal display device (hereinafter simply referred to as the "LCD") 48, which serves as an LCD monitor, such that the user can check the LCD 48 when the operation panel 42 is opened. The LCD 48 is used for displaying images during a playback operation and also for displaying menu screens for setting various modes. A recess 45 is also formed so that the user can place a finger when opening or closing the operation panel 42.

At the right side of the controller/recorder main unit 41, as shown in FIG. 6, a lid 52 that can be opened and closed with respect to the controller/recorder main unit 41 via a hinge 46 is provided. By allowing an engagement portion 52a of the lid 52 to engage with a mating engagement portion 52b provided for the controller/recorder main unit 41, the controller/recorder main unit 41 can remain closed. When the lid 52 is opened, as shown in FIG. 6, the cable connecting terminal 49 to be connected with the cable connecting terminal 32 of the head-mounted unit 2 via the cable 3, an AV/S connecting terminal 50 for connecting the controller/recorder 4 with a television set, and a PC connecting terminal 51 for connecting the controller/recorder 4 with a personal computer (PC) are exposed. In this manner, cords can be connected together at the right side surface of the controller/recorder main unit 41 without being extended from the other surfaces, thereby reducing a troublesome operation for arranging the cords.

Also at the left side of the controller/recorder main unit 41, as shown in FIG. 7, a lid 53 that can be opened and closed with respect to the controller/recorder main unit 41 via a hinge 47 is provided. By allowing an engagement portion 53a of the lid 53 to engage with a mating engagement portion 53b provided for the recorder/controller main unit 41, the controller/recorder main unit 41 can remain closed. When the lid 53 is opened, as shown in FIG. 7, a recording memory insertion slot 54 for inserting a recording memory 157 (see FIG. 11), which serves as detachable recording means, for example, a card memory, and a battery insertion slot 55 for detachably inserting batteries for supplying power are exposed.

On the outer surface of the operation panel 42, as shown in FIG. 5, a power switch 44 which is exposed even when the operation panel 42 is closed is provided. On the inner surface of the operation panel 42, various operation switches shown in FIG. 8 which are exposed only when the operation panel 42 is opened are disposed.

More specifically, on the inner surface of the operation panel 42, there are provided a speaker 56 for playing back sound, a switch 57 for increasing the volume of sound generated from the speaker 56, a switch 58 for decreasing the volume, a playback start/stop switch 59 for starting or pausing playing back image information recorded on the image memory 157, a switch 61 for fast-forwarding and searching images in the backward direction, a switch 62 for fast-forwarding and searching images in the forward direction, a menu button 63 for displaying menu screens for setting various functions and dates concerning the camera 1 on the LCD 48, menu selection switches 66, 67, 68, and 69 for moving an item to be selected or scrolling information displayed on the menu screens in the top, bottom, left, and right directions, and a setting switch 65 for setting the selected item.

Special modes which are not used frequently, such as a calibration mode for detecting the direction of a line of sight, which is described below, can be set by selecting a predetermined menu by operating the menu button 63.

The switches disposed on the operation panel 42 are switches mainly for setting items of information which are not frequently changed during a photographing operation.

The external appearance and the overview of the remote controller 5 are described below with reference to the plan view of FIG. 10.

As stated above, switches which are relatively frequently changed during a photographing operation are disposed on the remote controller 5. The remote controller 5 includes, as shown in FIG. 10, an FA/A/M switch 71, a F/V switch 72, a release switch (REL) 73, a record switch (REC) 74, a zoom switch 75, and an exposure correction switch 76.

The FA/A/M switch 71 is switching means for switching the following operation. When a telephotographing operation having a focal distance greater than or equal to a predetermined value is performed, a photographed image corresponding to a photographic frame indicating the photographic range is enlarged and is displayed in a see-through manner as an electronic view. The FA/A/M switch 71 switches this operation between a full auto (FA) mode, an auto (A) mode, and a manual (M) mode.

The F/V switch 72 is switching means for switching whether a photographic frame (F) indicating the photographic range or a photographed image (electronic view) (V) output from the image capturing device 30 is displayed on the transparent optical member 15 in a see-through manner.

The release switch (REL) 73 is used for starting photographing still images, which have higher definition than moving pictures.

The record switch (REC) 74 switches between a recording start operation and a recording end operation for moving pictures, which can be switched every time the record switch 74 is pressed.

The zoom switch 75, which serves as photographic-frame setting means, includes a tele switch 75a and a wide switch 75b for switching the zoom (optical zoom and/or electronic zoom) of the image capturing device 30 containing the photographing optical system 31 to the tele (T) mode and to the wide (W) mode, respectively.

An exposure correction switch 76 includes an exposure-decreasing correction switch 76a and an exposure-increasing correction switch 76b for respectively decreasing and increasing the exposure of an image to be photographed.

The zoom operation performed by the photographing optical system 31 and changing of the visual angle of a photographic frame observed from a photographer, who is also an observer, are performed in cooperation with each other. From this point of view, it can be said that the zoom switch 75 includes the tele switch 75a and the wide switch 75b for respectively reducing and enlarging the visual angle of the photographic frame observed from the photographer.

Figure 21:
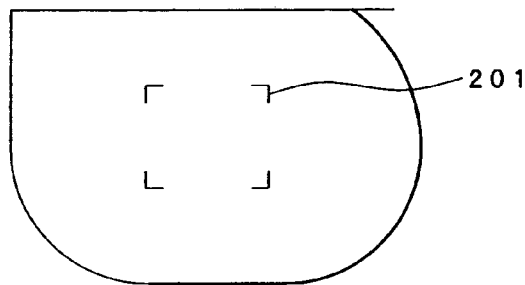
FIG. 21 illustrates a display example of the see-through display initial state in the same embodiment.

The "photographic frame" is an index of the range of a subject photographed by the image capturing device 30 (see FIG. 21).

Figure 11:
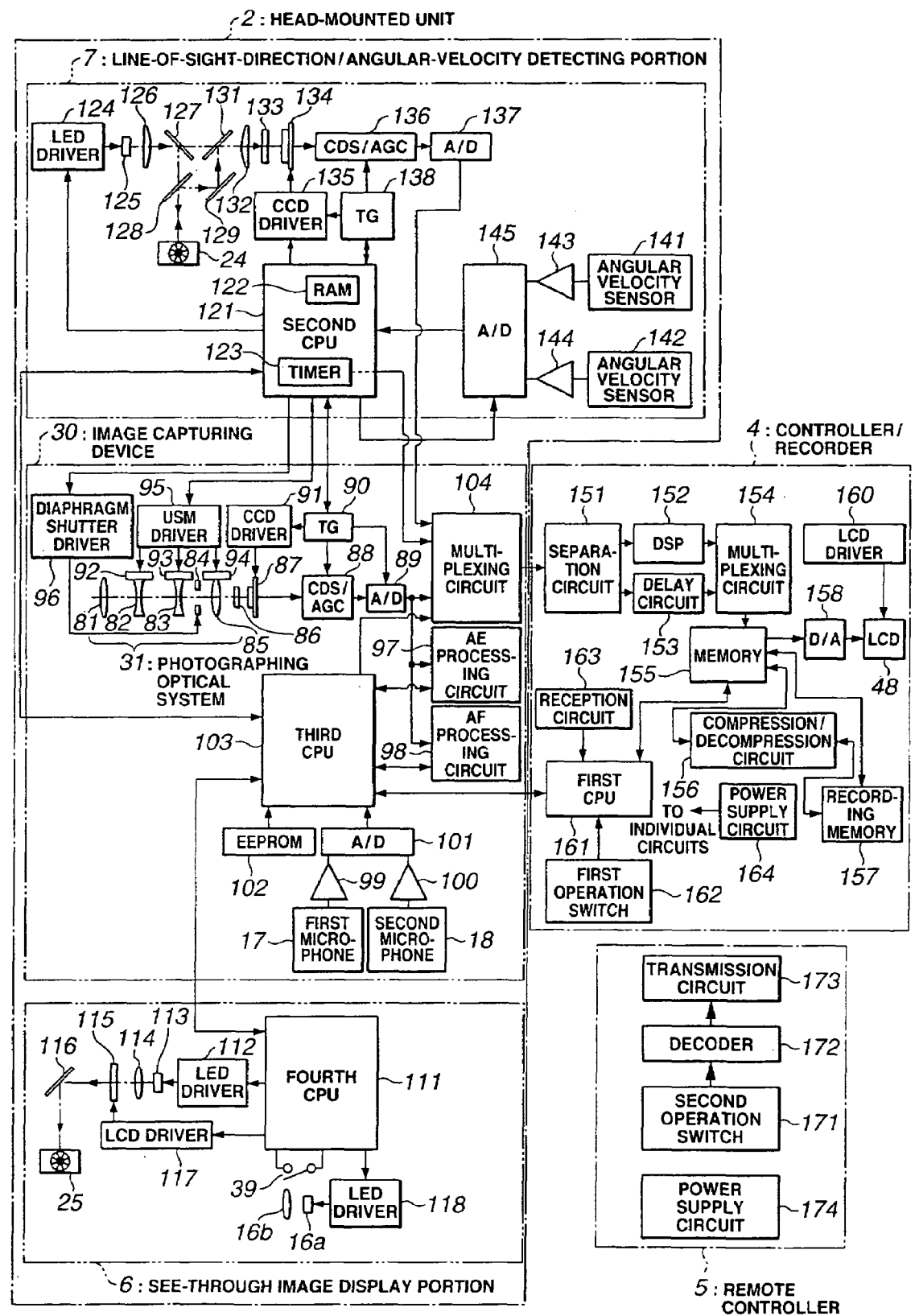
FIG. 11 is a block diagram illustrating the configuration of, mainly, an electronic circuit of the head-mounted camera of the same embodiment.

FIG. 11 is a block diagram illustrating the configuration of, mainly, an electronic circuit of the camera 1. As stated above, the camera 1 includes the head-mounted unit 2 having an image capturing function, the controller/recorder 4 having a function of recording images photographed by the head-mounted unit 2 and also having a function of controlling the entire camera 1, and the remote controller 5 for remotely controlling the camera 1. The head-mounted unit 2 further includes the image capturing device 30, which serves as image capturing means, a see-through image display portion 6, which serves as display means for displaying images in a see-through manner and also serves as safety means, and a line-of-sight-direction/angular-velocity detecting portion 7, which serves as biological information detection means formed of line-of-sight-direction detecting means for detecting the direction of a line of sight of the photographer and angular velocity detection means for detecting the angular velocity accompanied by the movement of the head of the photographer. The image capturing device 30, the see-through image display portion 6, and the line-of-sight-direction/angular-velocity detecting portion 7 are connected to the controller/recorder 4 via the cable 3.

The see-through image display portion 6 includes a light-emitting device (LED) driver 112, an LED 113, a condenser lens 114, an LCD 115, an LCD driver 117, an HOE 116, an HOE 25, a projector LED 16a, an LED driver 118, a condenser lens 16b, a switch 39, and a fourth central processing unit (CPU) 111. In this embodiment, the see-through image display portion 6 is provided at the side of only one eye of the observer (in this case, the right eye). Thus, the observer observes a see-through image with the right eye.

The LED driver 112 causes the LED 113 to emit light under the control of the fourth CPU 111.

The LED 113, which is a light-emitting source and also forms projection means, emits light by being driven by the LED driver 112. The LED 113 is formed of diodes that emit three colors of light, i.e., red (R), green (G), and blue (B).

The condenser lens 114, which forms the projection means, condenses light emitted by the. LED 113.

The LCD 115, which forms the projection means, displays photographic frames or photographed images, and serves as transmissive LCD means illuminated from backward by light emitted from the LED 113 via the condenser lens 114.

The LCD driver 117 drives the LCD 115 to display photographic frames based on the control of the fourth CPU 111, and also serves as parallax correction means, which is described below.

The HOE 116 is a reflective optical member for reflecting the emitted light via the LCD 115 in the vertical downward direction (see FIGS. 13 and 14) while correcting for the parallax, which is described below.

The HOE 25, which serves as a reflective combiner, reflects and diffracts the light from the HOE 116 toward the photographer's eye so as to project a photographic frame displayed on the LCD 115 so that the photographer can observe the frame and also to transmit external light toward the photographer's eye. The HOE 25 used in this embodiment is formed to be a minimal size in accordance with a minimal size of the transparent optical member 15.

The projector LED 16a is contained in the projector light-emitting portion 16 for performing distance measurement, and is a light-emitting source for emitting light for performing distance measurement.

The condenser lens 16b is used for projecting the distance-measurement light emitted from the projector LED 16a on a subject.

The LED driver 118 drives the projector LED 16a based on the control of the fourth CPU 111.

The switch 39 is connected to the fourth CPU 111, and when the fourth CPU 111 detects that the switch 39 is closed, the fourth CPU 111 prohibits the display operation of the see-through image display portion 6. The photographer can perform a photographing operation by using this camera 1 while taking normal action, such as walking or driving, without paying attention to the photographing operation. When an image is displayed in a see-through manner while the photographer is in such a state, he/she may be distracted by the displayed image. Accordingly, to prevent this situation beforehand, the switch 39 is provided to prohibit the see-through display operation. In this case, although images are not displayed, a photographing operation itself can be continued.

The fourth CPU 111 is control means for controlling the circuits within the see-through image display portion 6, and performs the control operation by being bi-directionally connected to a third CPU 103 of the image capturing device 30, which is described below, in cooperation with the third CPU 103.

The operation of the see-through image display portion 6 is as follows.

The fourth CPU 111 drives the LED driver 112 to cause the LED 113 to emit light. The light emitted from the LED 113 is condensed by the condenser lens 114 and illuminates the LCD 115 from backward.

The LED 113 includes diodes that can emit red (R), green (G), and blue (B) light, and when a photographic frame is displayed, only the G diode, for example, is allowed to emit light.

The fourth CPU 111 generates a signal corresponding to the photographic frame indicating the photographic range and outputs the signal to the LCD driver 117, and also transfers a control signal giving an instruction to emit light to the LED driver 112. Then, the LCD driver 117 drives the LCD 115 based on the signals to allow the LCD 115 to display the photographic frame, and also causes the LED 113 to emit light to illuminate the LCD 115 from backward.

The image of the photographic frame projected from the LCD 115 is reflected vertically downward by the HOE 116 while being corrected for the parallax, and is projected on the HOE 25.

The HOE 25 reflects the light from the HOE 116 toward the photographer's eye. Then, the photographer can observe the photographic frame indicating the photographic range as a virtual image.

When distance measurement is performed, the fourth CPU 111 transfers a control signal indicating an instruction to emit light for distance measurement to the LED driver 118.

Upon receiving the control signal, the LED driver 118 causes the projector LED 16a to emit light, and the light emitted from the projector LED 16a is converted into parallel light by the condenser lens 16b and is projected on a subject.

The illuminated light is reflected by the subject and is received by the image capturing device 30 so as to perform distance-measurement computation, which is described below.

The line-of-sight-direction/angular-velocity detecting portion 7 is disposed at the side of the eye (in this case, the left eye) opposite to the eye for which the see-through display portion 6 is disposed. The line-of-sight-direction/angular-velocity detecting portion 7 is divided into a line-of-sight-direction detecting portion, which serves as a line-of-sight-direction detecting unit, and an angular-velocity detecting portion, which serves as an angular-velocity detecting unit.

The line-of-sight-direction detecting portion, which is line-of-sight-direction detecting means, includes an LED driver 124, an LED 125, a condenser lens 126, a reflective mirror 127, the half mirror 128, the HOE 24, the HOE 129, a reflective mirror 131, an image-forming lens 132, a bandpass filter 133, a CCD 134, a CCD driver 135, a correlated double sampling (CDS)/automatic gain control (AGC) circuit 136, an analog-to-digital (A/D) conversion circuit 137, and a timing generator (TG) 138. Among those elements, the LED driver 124, the LED 125, the condenser lens 126, the reflective mirror 127, and the HOE 24 form a projection system, which serves as infrared-light projection means for projecting infrared parallel light on the photographer's eye. The HOE 24, the half mirror 128, the HOE 129, the reflective mirror 131, the image-forming lens 132, the bandpass filter 133, and the CCD 134 form a light-receiving system for receiving light reflected by the photographer's eye.

The angular-velocity detecting portion, which is angular-velocity detecting means, includes the angular velocity sensors 141 and 142, amplifiers 143 and 144, and an A/D conversion circuit 145.

A second CPU 121 is provided for controlling the entire line-of-sight-direction/angular-velocity detecting portion 7 formed of the line-of-sight-direction detecting portion and the angular-velocity detecting portion.

The LED driver 124 drives the LED 125 under the control of the second CPU 121.

The LED 125 is an infrared-emitting diode for emitting infrared for detecting the direction of the line of sight by being driven by the LED driver 124.

The condenser lens 126 converts the infrared light emitted from the LED 125 into parallel light.

Figure 15:
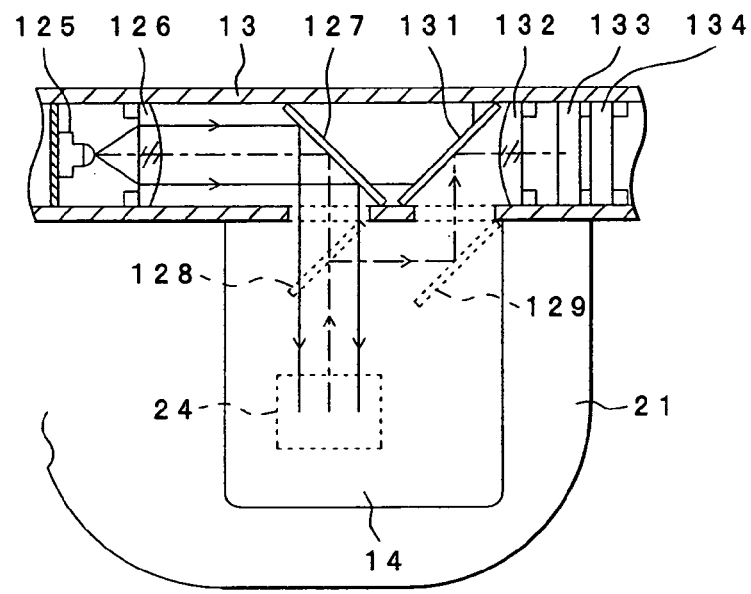
FIG. 15 is a front view, partially in section, illustrating an example of the configuration of the optical system of a line-of-sight-direction detecting portion in the same embodiment.
Figure 16:
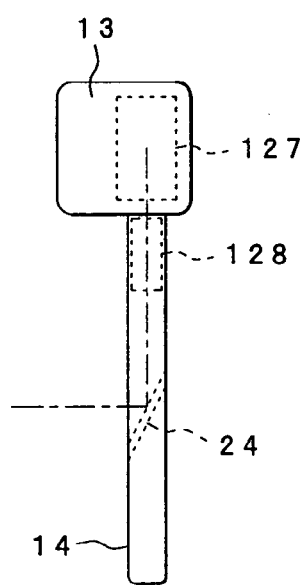
FIG. 16 is a left side view illustrating an example of the configuration of the optical system of the line-of-sight-direction detecting portion in the same embodiment.

The reflective mirror 127 is a reflective optical member for reflecting the infrared parallel light converted by the condenser lens 126 in the vertical downward direction (see FIGS. 15 and 16).

The half mirror 128 transmits the infrared light from the reflective mirror 127 toward the HOE 24 and also reflects the light from the HOE 24 in the horizontal direction.

The HOE 24 reflects the infrared light transmitted from the half mirror 128 toward the observer's eye, and also reflects the light from the observer's eye toward the half mirror 128. The HOE 24 of this embodiment is formed to a minimal size in accordance with a minimum size of the transparent optical member 14. The HOE 24 has wavelength selectivity for a predetermined narrow band of the infrared light, and exhibits a high reflection characteristic for the selected infrared band and exhibits a high transmission characteristic for the other wavelength light. As described above, although the HOE 24 has a function of selecting a band completely different from the band selected by the HOE 25 of the see-through image display portion 6, the overall luminance transmittance characteristic (or average luminance transmittance characteristic) of the HOE 24 is similar to that of the HOE 25. By using optical elements exhibiting similar luminance transmittance characteristics for the left and right eyes on the average, the user can be comfortable without getting tired even over a long use.

The HOE 129 reflects the light from the observer's eye via the HOE 24 and the half mirror 128 in the vertical downward direction. The HOE 129 has the same wavelength selection characteristic as the HOE 24. Accordingly, the light from the observer's eye via the HOE 129 other than the infrared light contained in the above-described predetermined band can be cut (i.e., transmitted without being reflected). As a result, a Purkinje image, which is described below, can be detected with higher precision while reducing the influence of noise caused by the light in the other wavelength ranges. The use of the HOE 129 as the optical element increases the wavelength selectivity, and the presence of the HOE 129 in the transparent optical member 14 is unnoticeable since it has a transmittance characteristic for the wavelength light other than the infrared light.

The reflective mirror 131 reflects the light from the HOE 129 in the horizontal direction.

The image-forming lens 132 is used for forming an image corresponding to the light reflected by the reflective mirror 131 on the image-capturing plane of the CCD 134.

The bandpass filter 133 transmits only the infrared light of the above-described predetermined band from the light whose image is formed by the image-forming lens 132. As stated above, although the band is already restricted by the HOE 129, light other than the infrared light, for example, visible light, may enter the light passing through the HOE 129 since the HOE 129 is disposed in the transparent optical member 14. Accordingly, the band is further restricted by the bandpass filter 133. By disposing the bandpass filter 133 before the CCD 134, the influence of external noise can further be reduced.

The CCD 134, which is two-dimensional photoelectric conversion means formed as an image capturing element having a two-dimensional image capturing plane, photoelectrically converts an image formed in the observer's eye and outputs a resulting electric signal. Based on the output of the CCD 134, the position of the Purkinje image and the position of the center of the pupil are determined as described below, and based on the relationship between the two positions, the direction of the line of sight is calculated.

The CCD driver 135 drives the CCD 134 under the control of the second CPU 121.

The CDS/AGC circuit 136 performs processing, such as noise elimination or amplification, on a video signal output from the CCD 134.

The TG 138 supplies timing signals to the CCD driver 135 and the CDS/AGC circuit 136 under the control of the second CPU 121 so that they can operate in cooperation with each other.

The A/D conversion circuit 137 converts an analog video signal output from the CDS/AGC circuit 136 into a digital video signal. The digital video signal converted by the A/D conversion circuit 137 is then output to a multiplexing circuit 104 of the image capturing device 30, as described below.

The angular velocity sensors 141 and 142 are housed in the storage portion 27, and detect angular velocities in different directions, for example, the yaw direction and the pitch direction.

The amplifiers 143 and 144 amplify the outputs of the angular velocities 141 and 142, respectively.

The A/D conversion circuit 145 converts analog signals output from the angular velocity sensors 141 and 142 and amplified by the amplifiers 143 and 144 into digital data. The digital data converted by the A/D conversion circuit 145 is output to the second CPU 121.

The second CPU 121 is control means for controlling the circuits within the line-of-sight-direction/angular-velocity detecting portion 7, and performs the control operation by being bi-directionally connected to the third CPU 103 of the image capturing device 30, which is described below, in cooperation with each other. The second CPU 121 has a built-in random access memory (RAM) 122 and a built-in timer 123 for counting the time.

The operation principle of the line-of-sight-direction/angular-velocity detecting portion 7 is described below with reference to the corresponding drawing.

The image capturing device 30 includes the photographing optical system 31, a low-pass filter 86, a CCD 87, a CDS/AGC circuit 88, an A/D conversion circuit 89, a TG 90, a CCD driver 91, an ultra sonic motor (USM) driver 95, a diaphragm shutter driver 96, an auto exposure (AE) processing circuit 97, an auto focus (AF) processing circuit 98, the first microphone 17, the second microphone 18, amplifying circuits 99 and 100, an A/D conversion circuit 101, an electrically erasable programmable read only memory (EEPROM) 102, the multiplexing circuit 104, and the third CPU 103.

The photographing optical system 31 forms an optical subject image and is formed as a zoom optical system whose focal distance is changeable.

The low-pass filter 86 removes undesired high-frequency components from the light passing through the photographing optical system 31.

The CCD 87, which is an image capturing element, converts the optical subject image formed by the photographing optical system 31 and passing through the low-pass filter 86 into an electric signal, and outputs it.

The CDS/AGC circuit 88 is signal processing means for performing processing, such as noise elimination and amplification, which is described below, on the signal output from the CCD 87.

The A/D conversion circuit 89 is signal processing means for converting the analog image signal output from the CDS/AGC circuit 88 into a digital image signal.

The CCD driver 91 controls the driving of the CCD 87.

The TG 90 supplies timing control signals to the CDS/AGC circuit 88, the A/D conversion circuit 89, and the CCD driver 91. The TG 90 is controlled by being bi-directionally connected to the second CPU 121 of the line-of-sight-direction/angular-velocity detecting portion 7.

The USM driver 95 is a drive circuit for selectively driving USMs 92, 93, and 94, which is described below, contained in the photographing optical system 31. The USM driver 95 is controlled by the second CPU 121 of the line-of-sight-direction/angular-velocity detecting portion 7.

The diaphragm shutter driver 96 is a drive circuit for controlling the driving of a diaphragm shutter 84, which is described below, contained in the photographing optical system 31. The diaphragm shutter driver 96 is controlled by the second CPU 121 of the line-of-sight-direction/angular-velocity detecting portion 7.

The AE processing circuit 97 is an auto exposure processing circuit for conducting exposure control calculation based on the output of the A/D conversion circuit 89 and for outputting the calculation result to the third CPU 103.

The AF processing circuit 98 is an auto focus processing circuit for conducting auto focus control calculation based on the output of the A/D conversion circuit 89 and for outputting the calculation result to the third CPU 103.

The first microphone 17 and the second microphone 18 collect stereo sound from a subject, as stated above.

The amplifying circuits 99 and 100 amplify the audio signals input from the first microphone 17 and the second microphone 18, respectively.

The A/D conversion circuit 101 converts analog audio signals amplified by the amplifying circuits 99 and 100 into digital audio signals, and outputs them to the third CPU 103.

In the EEPROM 102, various correction data for exposure control or auto focus control are recorded when the camera 1 was manufactured. The data recorded on the EEPROM 102 is read by the third CPU 103.

The multiplexing circuit 104 multiplexes, based on timer information output from the second CPU 121, the video signal output from the A/D conversion circuit 89, the video signal (one item of biological information) concerning the photographer's eye output from the A/D conversion circuit 137 of the line-of-sight-direction/angular-velocity detecting portion 7, the angular velocity information (one item of biological information) concerning the head of the photographer output from the second CPU 121 of the line-of-sight-direction/angular-velocity detecting portion 7, and the audio data output via the third CPU 103 so that the video signal and the biological information generated at the same time can be related to each other. The multiplexing circuit 104 then outputs the multiplexed data to the controller/recorder 4.

The third CPU 103, which is control means for controlling the circuits within the image capturing device 30, performs the control operation in cooperation with the fourth CPU 111 of the see-through image display portion 6 and the second CPU 121 of the line-of-sight-direction/angular-velocity detecting portion 7. The third CPU 103 is controlled by a first CPU 161, which is described below, of the controller/recorder 4 by bi-directionally communicating with the first CPU 161.

The photographing optical system 31 is formed of a front lens 81, a variator lens 82, a compensator lens 83, the diaphragm shutter 84, the focus lens 85, and the USMs 92, 93, and 94.

Among the lens contained in the photographing optical system 31, the front lens 81 is positioned closest to a subject.

The variator lens 82 is used for changing the focal distance of the photographing optical system 31.

The compensator lens 83 compensates for a deviation of the focus position in accordance with the focal distance of the photographing optical system 31 changed by the variator lens 82.

The diaphragm shutter 84 serve as a diaphragm function of defining a range of light passing through the photographing optical system 31 and a shutter function of defining a time for which the light passes through the photographing optical system 31.

The focus lens 85 adjusts the focus of the photographing optical system 31, and when the focus is adjusted, a subject image is focused and formed on the CCD 87.

The USMs 92, 93, and 94 are drive sources for driving the variator lens 82, the compensator lens 83, and the focus lens 85, respectively.

The controller/recorder 4 includes a separation circuit 151, a digital signal processing (DSP) circuit 152, a delay circuit 153, a multiplexing circuit 154, a memory 155, a compression/decompression circuit 156, a recording memory 157, a digital-to-analog (D/A) circuit 158, the LCD 48 (see FIG. 10), an LCD driver 160, a first operation switch 162, a reception circuit 163, a power supply circuit 164, and the first CPU 161.

The separation circuit 151 separates the signal received from the multiplexing circuit 104 into image data and other types of data. The separation circuit 151 then outputs the image data to the DSP circuit 152 and the other data to the delay circuit 153.

The DSP circuit 152 performs predetermined digital signal processing on the image data output from the separation circuit 151.

The delay circuit 153 delays the data input from the separation circuit 151 so that the data can be temporally synchronized with the image data processed by the DSP circuit 152.

The multiplexing circuit 154 multiplexes the image data processed by the DSP circuit 152 and the data output from the delay circuit 153.

The memory 155, which is formed of, for example, a frame buffer, temporarily stores a signal from the multiplexing circuit 154.

The compression/decompression circuit 156 compresses a digital signal stored in the memory 155 and also decompresses a compressed digital signal read from the recording memory 157.

The recording memory 157 serves as both image data recording means and biological information recording means, and records a digital signal compressed by the compression/decompression circuit 156.

The D/A conversion circuit 158 converts the digital signal stored in the memory 155 into an analog signal.

The LCD 48 displays an image based on the analog image signal converted by the D/A conversion circuit 158.

The LCD driver 160 controls the driving of the LCD 48.

The first operation switch 162, which includes switches, such as those shown in FIG. 8, is used for inputting various operations concerning the camera 1.

The reception circuit 163 receives signals from a transmission circuit 173, which is described below, of the remote controller 5.

The power supply circuit 164 contains detachable batteries and supplies power to the controller/recorder 4, and also supplies power to the head-mounted unit 2.

The first CPU 161, which is control means for integrally controlling the camera 1, controls the circuits within the controller/recorder 4 and also controls the head-mounted unit 2 by communicating with the third CPU 103.

The remote controller 5 includes a second operation switch 171, a decoder 172, the transmission circuit 173, and a power supply circuit 174.

Figure 10:
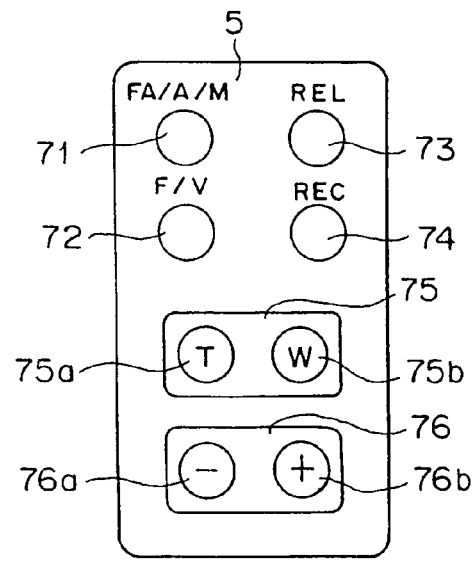
FIG. 10 is a plan view illustrating the configuration of a remote controller in the same embodiment.

The second operation switch 171 includes switches, such as those shown in FIG. 10.

The decoder 172 codes an input from the second operation switch 171 into a wireless transmission signal.

The transmission circuit 173 transmits the signal coded by the decoder 172 to the reception circuit 163 of the controller/recorder 4. The first CPU 161 of the controller/recorder 4 performs predetermined processing on information concerning an operation performed on the operation switch received from the reception circuit 163 so as to perform predetermined control on the head-mounted unit 2 via the third CPU 103.

The power supply circuit 174 having batteries supplies power to the circuits within the remote controller 5.

The operation of the camera 1 is as follows.

Light passing through the photographing optical system 31 forms an image on the image capturing plane of the CCD 87 via the low-pass filter 86.

When a moving-picture recording operation is performed by the operation of the first operation switch 162 of the controller/recorder 4 or when a still-image photographing operation is performed by the operation of the release switch 73 of the remote controller 5, the subject image formed on the CCD 87 is photoelectrically converted into an analog image signal, and is then output.

The image signal from the CCD 87 is input into the CDS/AGC circuit 88 and is subjected to known correlated double sampling by the CDS circuit of the CDS/AGC circuit 88 so as to remove reset noise, and the resulting signal is then amplified into a predetermined signal level by the AGC circuit of the CDS/AGC circuit 88.

The analog image signal output from the CDS/AGC circuit 88 is converted into a digital image signal (image data) by the A/D conversion circuit 89. In this embodiment, the output signal from the A/D conversion circuit 89 is referred to as "raw image data". The raw image data in this embodiment is defined as digital data obtained immediately after conducting A/D conversion on the analog output signal from the CCD 87 and before being subjected to other digital signal processing.

Timing signals generated by the TG 90 are input into the CDS/AGC circuit 88 and the A/D conversion circuit 89, and a timing signal from the TG 90 is also input into the CCD driver 91.

Signals output from the first microphone 17 and the second microphone 18 are amplified by the amplifying circuits 99 and 100, respectively, and are then converted into digital data by the A/D conversion circuit 101 in a time division manner with a predetermined sampling period. The digital data is then transferred to the third CPU 103. The third CPU 103 transfers the digital audio data to the multiplexing circuit 104 at a predetermined timing.

The image data represented by the signal output from the A/D conversion circuit 89, the audio data output from the first microphone 17 and the second microphone 18, the line-of-sight-direction data (line-of-sight-direction information) and the angular velocity data concerning the head of the photographer output from the line-of-sight-direction/angular-velocity detecting portion 7, and the timer information counted by the timer 123 of the second CPU 121 are multiplexed by the multiplexing circuit 104.

Figure 42:
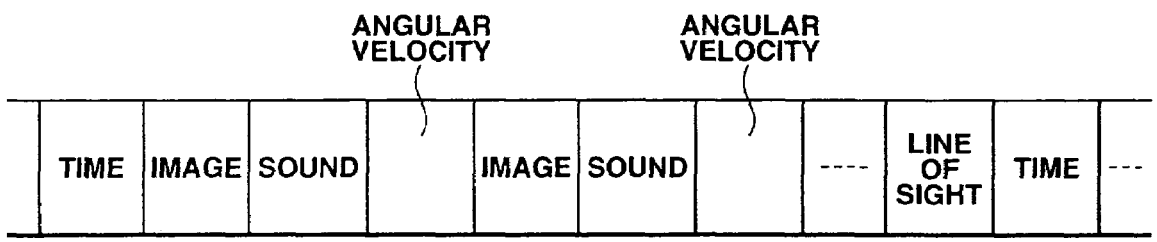
FIG. 42 illustrates the configuration of a time-series signal output from a multiplexing circuit in the same embodiment.

The time-series configuration of the signal multiplexed by the multiplexing circuit 104 is as shown in FIG. 42, i.e., the detection start time at which each item of data is detected is recorded first, and then, the image data, audio data, angular velocity data, etc. are output alternately at predetermined intervals. In the signal shown in FIG. 42, the cycle at which each of the image data, audio data, and angular velocity data is input is set to be, for example, 1/30 seconds, and the cycle at which the line-of-sight-direction data is input is set to be, for example, one second. When each item of data for one second is set to be one unit, after the start time data, 30 sets, one set being formed of the image data, audio data, and angular velocity data, are repeatedly recorded, and finally, the line-of-sight-direction data is recorded. The arrangement (order) of data shown in FIG. 42 is just an example, and, for example, the line-of-sight-direction data may be recorded immediately after the time data.

A plurality of items of such unit digital data are output to the controller/recorder 4 via the cable 3.

As described above, in the image capturing device 30, an image signal generated in the CCD 87 is subjected to analog signal processing and is converted into a digital signal and output. Accordingly, analog signals are not output from the image capturing device 30. The image capturing device 30 is thus resistant to external noise that may influence image signals transmitted via the cable 3.

The image capturing device 30 outputs raw image data, which eliminates the need to provide a signal processing circuit for performing signal processing, such as color separation and white balance control, in the image capturing device 30. With this configuration, the head-mounted unit 2 provided with the image capturing device 30 can be lighter and smaller.

The signal transmitted from the multiplexing circuit 104 to the controller/recorder 4 is separated into the image data and other data by the separation circuit 151.

The image data is then subjected to predetermined image processing computation in the DSP circuit 152, and is also subjected to auto white balance processing based on the computation result.

Meanwhile, the data other than the image data (i.e., data including the line-of-sight-direction data, angular velocity data, and audio data) is delayed in the delay circuit 153 so that it can be temporally synchronized with the image data processed by the DSP circuit 152.

The output from the DSP circuit 152 and the output from the delay circuit 153 are input into the multiplexing circuit 154, and are then multiplexed. The multiplexed signal is temporarily stored in the memory 155.

Among various data stored in the memory 155, the image data and audio data are compressed in predetermined formats by the compression circuit of the compression/decompression circuit 156, and are then recorded in the recording memory 157.

Meanwhile, the time data, angular velocity data, and line-of-sight-direction data stored in the memory 155 are directly recorded on the recording memory 157. The angular velocity data and line-of-sight-direction data may be subjected to known lossless compression before being recorded on the recording memory 157.

As the recording memory 157, various types of recording media, such as a card memory or a disk memory, for example, a digital versatile disk (DVD), are applicable. An overview of the recording formats of the above-described various data is described later.

When a recorded image is selected by operating the menu button 63, the menu selection switch 66, 67, 68, or 69, or the setting switch 65 of the first operation switch 162, and when a playback instruction is given by operating the playback start/stop switch 59, compressed data stored in the recording memory 157 is decompressed by the decompression circuit of the compression/decompression circuit 156, and the decompressed data is temporarily stored in the memory 155. This image data is converted into an analog image signal by the D/A conversion circuit 158, and the analog image signal is then displayed on the LCD 48. In this case, the operation of the LCD 48 is controlled by a signal generated by the LCD driver 160.

Meanwhile, the digital image data output from the A/D conversion circuit 89 is transmitted to the AE processing circuit 97 and the AF processing circuit 98 within the image capturing device 30.

The AE processing circuit 97 calculates the luminance of the image data for one frame and adds the luminance values by weighting them so as to compute an AE evaluation value corresponding to the brightness of the subject, and outputs the computation result to the second CPU 121 via the third CPU 103. The second CPU 121 controls the exposure time of the CCD 87 or the diaphragm shutter 84 based on the AE evaluation value.

Under the control of the second CPU 121 via the third CPU 103, the AF processing circuit 98 extracts high frequency components from the luminance components of the image data for one frame by using a high-pass filter, and calculates the accumulative values of the extracted-high frequency components so as to compute an AF evaluation value corresponding to the contour components at the high frequency side, and outputs a computation result to the second CPU 121 via the third CPU 103. Based on the AF evaluation value calculated by the AF processing circuit 98, the second CPU 121 causes the USM driver 95 to drive the focus lens 85 to detect the focal point so that an in-focus state can be obtained.

In the EEPROM 102, various correction data required for, for example, exposure control or auto focus processing, are recorded when the camera 1 was manufactured. The second CPU 121 executes various types of processing by reading the correction data from the EEPROM 102 via the third CPU 103 as necessary.

Figure 12:
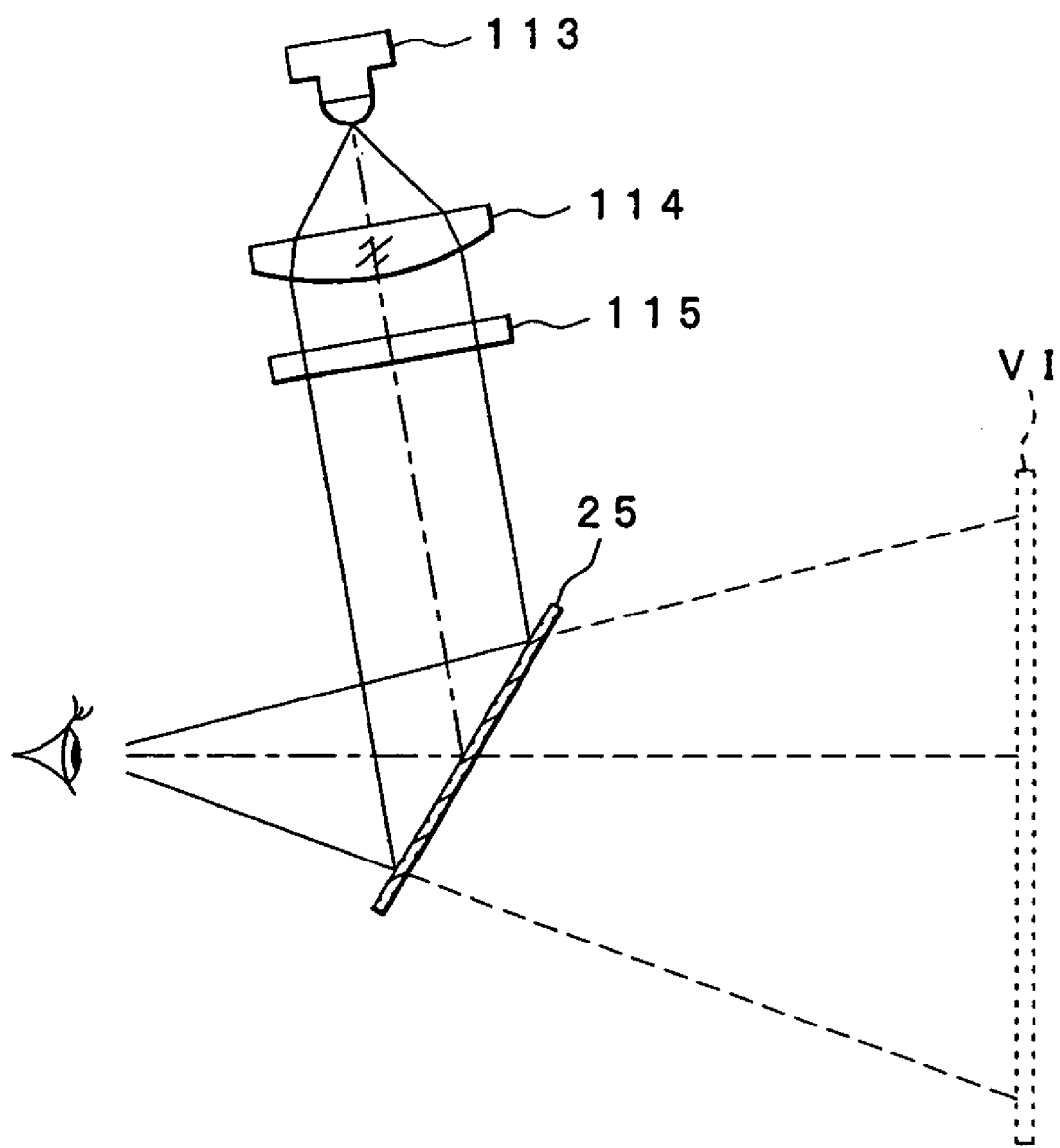
FIG. 12 illustrates the principle of an optical system of a see-through image display portion in the same embodiment.
Figure 13:
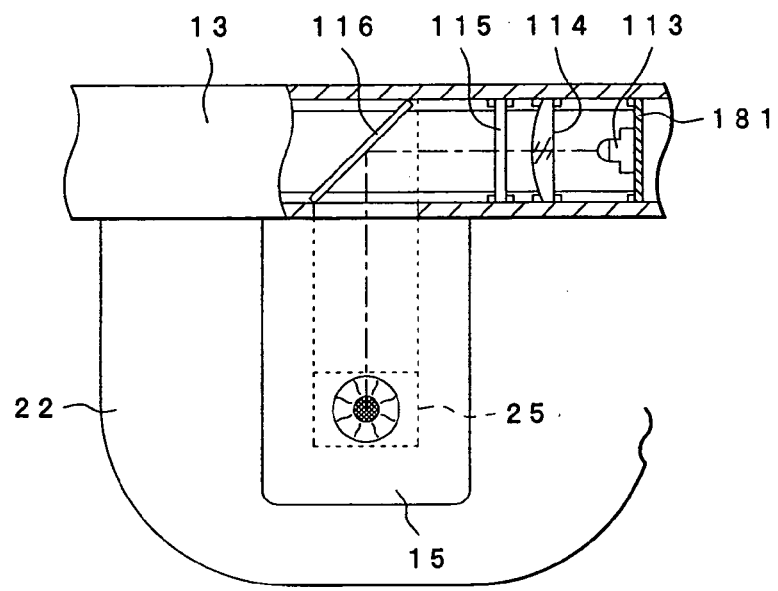
FIG. 13 is a front view, partially in section, illustrating the optical system of the see-through image display portion in the same embodiment.
Figure 14:
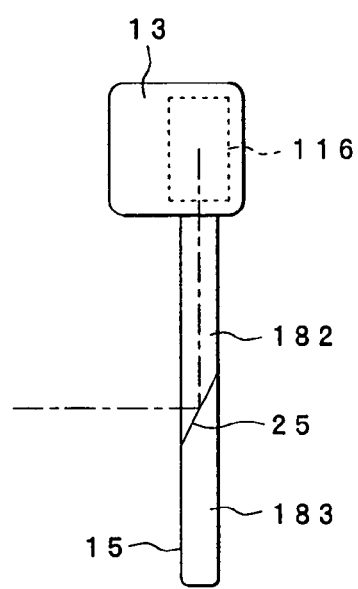
FIG. 14 is a left side view illustrating the configuration of the optical system of the see-through image display portion in the same embodiment.

The optical structure of the see-through image display portion 6 is described below with reference to FIGS. 12 through 14. FIG. 12 illustrates the principle of the optical system of the see-through image display portion 6. FIGS. 13 and 14 are a front view, partially in section, and a left side view, respectively, illustrating the configuration of the optical system of the see-through image display portion 6.

In the see-through image display portion 6, a photographic frame indicating a photographic range can be superimposed as a virtual image on a subject substantially directly observed by the photographer. Such a display mode is referred to as the "see-through display". The term "substantially directly observing/observed" includes not only a case where the photographer observes the subject directly with his/her eyes, but also a case where the photographer observes the subject through a generally planar transparent member formed of, for example, glass or plastic, or a case where the photographer observes the subject through an eyesight-correcting lens.

The principle of displaying see-through images by the optical system of the see-through image display portion 6 (hereinafter referred to as the "see-through image display optical system") in this embodiment is described below with reference to FIG. 12.

Light emitted from the LED 113 is condensed by the condenser lens 114 and illuminates the LCD 115 from backward. As stated above, when a photographic frame is displayed, the LED 113 causes, for example, only the G diode, to emit light.

The fourth CPU 111 generates a signal corresponding to the photographic frame indicating the photographic range and outputs it to the LCD driver 117. The LCD driver 117 drives the LCD 115 based on this signal to allow the LCD 115 to display the photographic frame.

The photographic frame image output from the LCD 115 is reflected by the HOE 25 and is guided to the photographer's eye. Then, the photographer can observe the photographic frame indicating the photographic range as a virtual image VI. The HOE 116 is not shown since only the principle is illustrated in FIG. 12.

The HOE 25 is a volume-phase holographic optical element using a photosensitive material, such as photopolymer or dichromated gelatin, and is designed to reflect light having R, G, and B wavelengths emitted from the LED 113 with the maximum reflectivity. Accordingly, when emitting G light to display a photographic frame, the green photographic frame is clearly displayed as a virtual image. The HOE exhibits excellent wavelength selectivity, and more specifically, the HOE exhibits high reflection characteristics for the R, G, and B wavelength light with extremely narrow wavelength intervals and exhibits high transmission characteristics for the other wavelength light. Accordingly, external light having the same wavelength range as the display light is diffracted and reflected and does not reach the photographer's eyes, but external light having the other wavelength ranges reaches the photographer's eyes. Generally, since visible light has a wide wavelength interval, an external image can be observed without any problem even if light having very narrow wavelength intervals including the R, G, and B wavelengths does not reach the photographer's eyes.

In the see-through image display portion 6, an image captured by the image capturing device 30 can be see-through displayed as a color image. In this case, the captured image is displayed on the LCD 115, and also, the LED 113 is controlled to emit three R, G, and B types of light. This allows the captured image to reach the photographer's eyes through the second HOE 25 as a virtual image.

The HOE 116 reflects light from the LCD 115 toward the HOE 25, and also has a function of correcting for the curvature of field. Although in this embodiment the HOE 116 is used, a free-form optical element may be used. Although the free-form optical element is light and small, it can correct for the complicated aberration, and thus, clear images with small aberration can be displayed without increasing the weight of the head-mounted unit 2.

Specific arrangements of the see-through image display optical system are described below with reference to FIGS. 13 and 14.

In the portion inside the frame 13 and above the transparent optical member 15, the LED 113, the condenser lens 114, the LCD 115, and the HOE 116 are disposed in the order shown in FIG. 13. Those elements are fixed by being sandwiched between support frame portions disposed in the frame 13. In this case, the LED 113 is fixed by the support frame portions while being mounted on an electronic circuit board 181. The HOE 116 is tilted so that it can reflect light from the LED 113 vertically downward.

The transparent optical member 15 includes, as shown in FIG. 14, optical waveguide members 182 and 183 formed of transparent glass or plastic to have a predetermined thickness and the HOE 25 tilted between the optical waveguide members 182 and 183 to reflect light backward. With this configuration, light reflected by the HOE 116 propagates inside the optical waveguide member 182 disposed above the HOE 25 and reaches the HOE 25. The propagation of light inside the optical waveguide member 182 may be only the transmission, as shown in FIG. 14, or a combination of the transmission and internal total reflection may be employed. If the optical system is designed to implement a combination of the transmission and the total reflection, the transparent optical member 15 can be thin-walled, thereby further reducing the weight of the head-mounted unit 2.

Among the above-described elements, the see-through image display optical system includes the LED 113, the condenser lens 114, the LCD 115, the HOE 116, the HOE 25, and the optical waveguide members 182 and 183.

A description is now given, with reference to FIGS. 15 and 16, of an example of the configuration of the optical system of the line-of-sight-direction detecting portion in the line-of-sight-direction/angular-velocity detecting portion 7. FIGS. 15 and 16 are a front view, partially in section, and a left side view, respectively, illustrating examples of the optical system of the line-of-sight-direction detecting portion.

In the portion above the transparent optical member 14 within the frame 13, the LED 125, the condenser lens 126, the reflective mirror 127, the reflective mirror 131, the image-forming lens 132, the bandpass filter 133, and the CCD 134 are sequentially disposed in the order shown in FIG. 15.

In the transparent optical member 14 under the reflective mirror 127, the half mirror 128 and the HOE 24 are disposed. The HOE 129 is disposed next to the half mirror 128 in the transparent optical member 14.

With this configuration, infrared light emitted from the LED 125 is converted into parallel light by the condenser lens 126, and is then reflected by the reflective mirror 127 vertically downward.

The infrared light reflected by the reflective mirror 127 enters the transparent optical member 14, transmits the half mirror 128 disposed in the transparent optical member 14, and is then reflected by the HOE 24 toward the observer's eye.

The infrared light reflected by the observer's eye is reflected by the HOE 24 upward, and is then reflected by the half mirror 128 in the lateral direction. The light is further reflected by the HOE 129 upward and reaches the reflective mirror 131 disposed in the frame 13.

The light reflected by the reflective mirror 131 in the lateral direction passes through the image-forming lens 132 and the bandpass filter 133, and an image of the observer's eye in the wavelength range of the infrared light reflected by the HOE 24 is formed on the CCD 134.

The image signal converted by the CCD 134 is further transferred to the controller/recorder 4 via the CDS/AGC circuit 136, the A/D conversion circuit 137, and the multiplexing circuit 104. Then, in the first CPU 161 of the controller/recorder 4, the position of a Purkinje image and the central position of the pupil are determined, as described below, and the direction of the line of sight is further determined based on the relationship between the two positions.

The half mirror 128 and the HOE 129 are positioned, for example, in the transparent optical member 14, and in this case, it is preferable that they are positioned at an upper portion of the transparent optical member 14 where they are not seen by the observer when he/she wears the head-mounted unit 2.

According to the configuration shown in FIGS. 15 and 16, by the use of the HOE 24 having high wavelength selectivity and high reflectivity for the selected wavelength light and also by the provision of the bandpass filter 133 having wavelength selectivity similar to that of the HOE 24 before the CCD 134, a signal having a high signal-to-noise (S/N) ratio can be obtained.

With this configuration, the direction of the line of sight of the observer observing a subject can be determined correctly.

Figure 17:
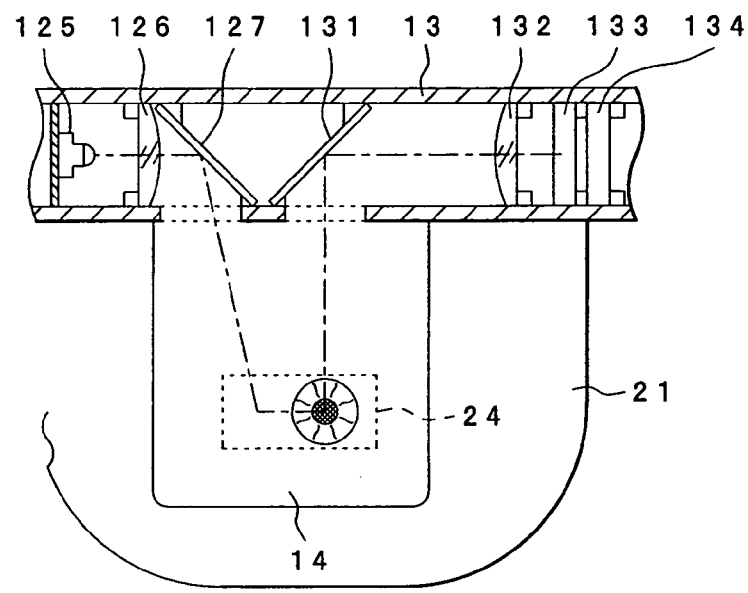
FIG. 17 is a front view, partially in section, illustrating another example of the configuration of the optical system of the line-of-sight-direction detecting portion in the same embodiment.
Figure 18:
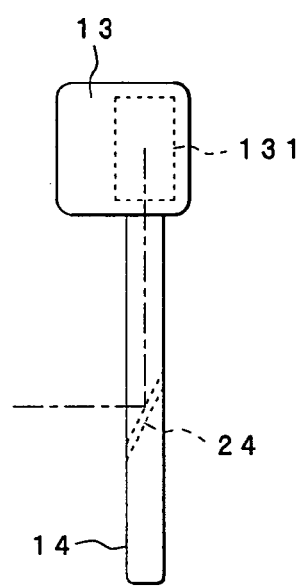
FIG. 18 is a left side view illustrating another example of the configuration of the optical system of the line-of-sight-direction detecting portion in the same embodiment.

Another example of the configuration of the optical system of the line-of-sight-direction detecting portion in the line-of-sight-direction/angular-velocity detecting portion 7 is described below with reference to FIGS. 17 and 18. FIGS. 17 and 18 are a front view, partially in section, and a left side view, respectively, illustrating examples of the optical system of the line-of-sight-direction detecting portion.

In the configuration shown in FIGS. 15 and 16, since the half mirror 128 and the HOE 129 are directly exposed to external light, it is difficult to completely shield external light from reaching the CCD 134. In contrast, in the configuration shown in FIGS. 17 and 18, the optical path for projecting infrared light on the observer's eye and the optical path for receiving infrared light reflected by the observer's eye by the CCD 134 are completely separated.

That is, in the optical system of the line-of-sight-direction detecting portion, the half mirror 128 and the HOE 129 are omitted, and also the HOE 24 is formed slightly elongated horizontally than the HOE 24 shown in FIG. 15.

The infrared light reflected by the reflective mirror 127 is obliquely incident on, for example, the left portion, of the HOE 24. The HOE 24 projects the infrared light from the reflective mirror 127 on the observer's eye slightly obliquely with respect to the horizontal direction.

The light reflected by the observer's eye is received by, for example, the right portion, of the HOE 24, and is reflected toward the reflective mirror 131 almost vertically upward. The other features of the configuration after the reflective mirror 131 are similar to those shown in FIGS. 15 and 16.

According to the configuration shown in FIGS. 17 and 18, by the use of the HOE 24 having high wavelength selectivity and high reflectivity for the selected wavelength light and by the provision of the bandpass filter 133 having wavelength selectivity similar to that of the HOE 24 before the CCD 134, a signal having a high S/N ratio can be obtained. Since only the HOE 24 is disposed on the transparent optical member 14, which is exposed to external light, the influence of external light can further be reduced compared to the configuration shown in FIGS. 15 and 16 in which the half mirror 128 and the HOE 129 are disposed on the transparent optical member 14.

The propagation of light in the transparent optical member 14 may be only the transmission, as shown in FIG. 16 or 18. However, as in the propagation of light in the transparent optical member 15, a combination of the transmission and internal total reflection may be employed. If the optical system is designed to implement a combination of the transmission and the total reflection, the transparent optical member 14 can be thin-walled, thereby further reducing the weight of the head-mounted unit 2.

Figures 19A, 19B:
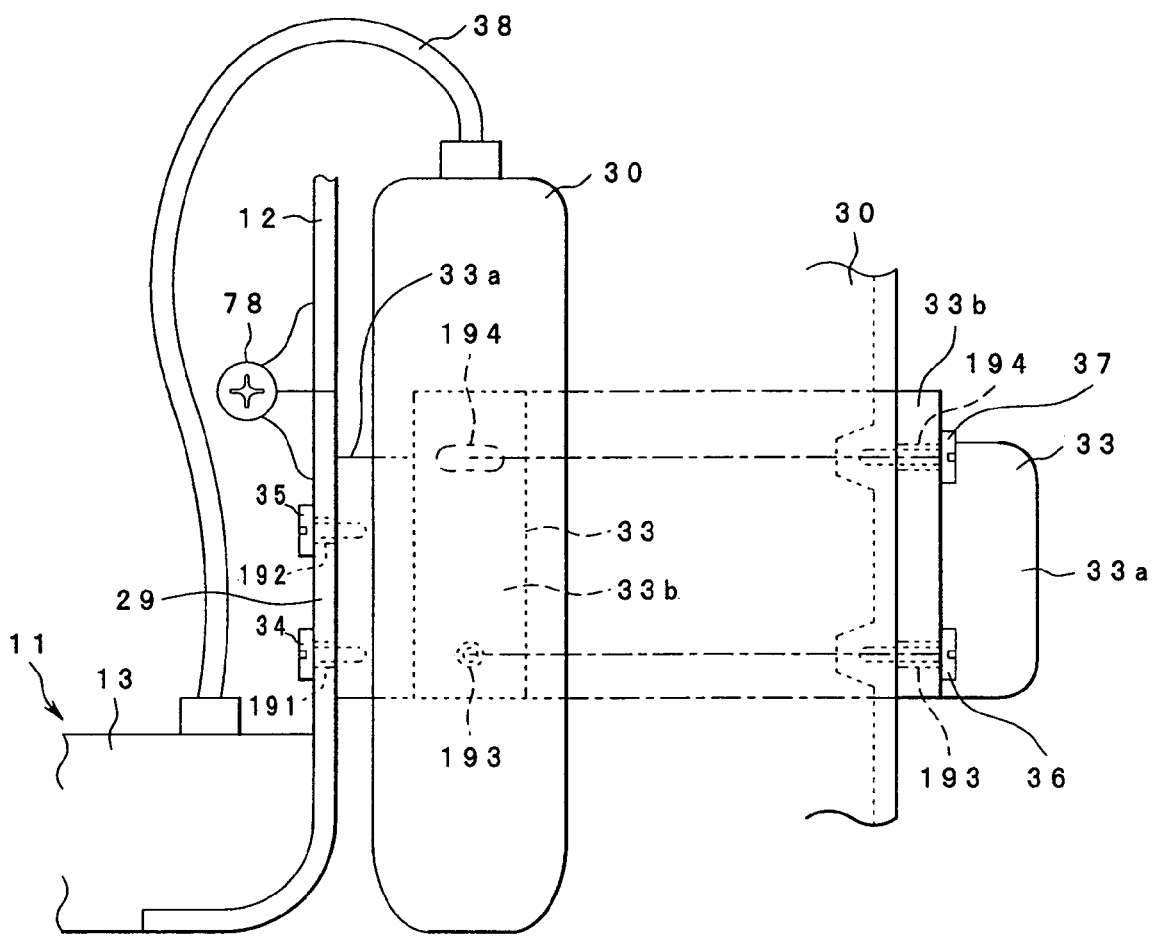
FIGS. 19A and 19B are a plan view and a right side view, respectively, illustrating the configuration in which the image capturing device is attached to the frame in the same embodiment.
Figure 20:
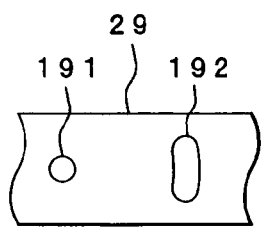
FIG. 20 is a right side view illustrating the configuration of holes formed in the frame for attaching the image capturing device in the same embodiment.

A description is now given, with reference to FIGS. 19A, 19B, and 20, of the configuration in which the image capturing device 30 is attached to the side surface of the frame 13 such that the angle of the image capturing device 30 is adjustable in the pitch direction and in the yaw direction. FIGS. 19A and 19B are a plan view and a right side view, respectively, illustrating the configuration in which the image capturing device 30 is attached to the frame 30. FIG. 20 is a right side view illustrating the configuration of holes formed in the frame 13 for attaching the image capturing device 30.

In the camera 1 of this embodiment, the photographer specifies a photographic frame indicating the photographic range, and performs a photographing operation with a field angle corresponding to the visual angle of the specified photographic frame, and thus, the parallax correction is necessary. The parallax is caused by a horizontal positional deviation between the visual axis of the photographer and the optical axis or by an angular deviation between the visual axis and the optical axis. Between the two deviations, the influence of the angular deviation is much larger, and thus, an adjusting mechanism (adjusting means) for precisely correcting for the angular deviation is provided.

The frame 13 and the temple 12 are connected to each other via the hinge 78, as shown in FIG. 19A, so that the temple 12 is foldable with respect to the frame 13. The hinge 78 is disposed via a somewhat long joint portion 29 extended from the frame 13 at a position slightly farther away from the front portion 11 than the hinge 79 at the right side.

A base 33, which serves as the adjusting means, formed generally in an L shape when viewed from the front is connected to the side surface of the joint portion 29. The base 33 includes a portion 33a along the side surface of the joint portion 29 and a portion 33b raised from the side surface of the joint portion 29 substantially at right angles. This adjusting mechanism is a mechanism for adjusting the relative angle between the front portion 11 and the image capturing device 30 and is used in an adjusting device for the camera 1 implementing the camera adjusting method. By using this adjusting mechanism, the visual axis and the optical axis of the photographing optical system 31 contained in the image capturing device 30 can be adjusted.

In the joint portion 29, as shown in FIG. 20, a hole 191, which forms pitch-direction adjusting means, is punched in the forward portion and an elongated hole 192 constituting a circular arc around the hole 191, which forms the pitch-direction adjusting means, is punched in the backward portion. Bises 34 and 35, which form the pitch-direction adjusting means, are screwed into the portion 33a of the base 33 via the holes 191 and 192, respectively, thereby fixing the base 33 to the joint portion 29.

In the portion 33b of the base 33, as shown in FIG. 19A, a hole 193, which forms yaw-direction adjusting means, is punched in the forward portion, and an elongated hole 194 constituting a circular arc around the hole 193, which forms the yaw-direction adjusting means, is punched in the backward portion. As shown in FIG. 19B, bises 36 and 37, which form the yaw-direction adjusting means, are screwed into the bottom surface of the image capturing device 30 via the holes 193 and 194, respectively, thereby fixing the image capturing device 30 to the base 33. A cable 38, which is extended from the rear surface of the image capturing device 30, is folded toward the subject and is connected to the electrical circuits within the frame 13.

With this configuration, the bises 34 and 35 are slightly unscrewed, and in this state, the position of the bis 35 in the elongated hole 192 is changed. Then, the base 33 is rotated around the bis 34, and the angle of the base 33 in the pitch direction and also the angle of the image capturing device 30 attached to the base 33 in the pitch direction can be adjusted. After adjusting the base 33 and the image capturing device 30 to desired positions, the bises 34 and 35 are screwed tight.

Similarly, the bises 36 and 37 are slightly unscrewed, and in this state, the position of the bis 37 in the elongated hole 194 is changed. Then, the base 33 is rotated around the bis 36, and the angle of the base 33 in the yaw direction and also the angle of the image capturing device 30 connected to the base 33 in the yaw direction can be adjusted. After adjusting the base 33 and the image capturing device 30 to desired positions, the bises 36 and 37 are screwed tight.

According to this configuration, the angle adjustment in the pitch direction and in the yaw direction between the see-through image display portion 6 and the image capturing device 30 can be performed. Additionally, since the image capturing device 30 is fixed to the front portion 11 with the base 33 therebetween, the image capturing device 30 is not folded with respect to the front portion 11 even if the temple 12 is folded. Thus, the possibility of generating an angular deviation between the image capturing device 30 and the see-through image display portion 6 becomes small. Additionally, since the adjusting mechanism is simple, it can be formed less expensively.

In the above-described example, the relative angle in the yaw direction between the image capturing device 30 and the base 33 is adjusted, and the relative angle in the pitch direction between the joint portion 29 on the side surface of the frame 13 and the base 33 is adjusted. Conversely, by changing the mounting position of the image capturing device 30 on the base 33, the relative angle in the pitch direction between the image capturing device 30 and the base 33 may be adjusted, and by changing the mounting position of the frame 13 on the base 33, the relative angle in the yaw direction between the joint portion 29 on the side surface of the frame 13 and the base 33 may be adjusted.

Display examples of images in the see-through image display portion 6 are described below with reference to FIGS. 21 through 31.

FIG. 21 illustrates a display example in the see-through display initial state. When the camera 1 is powered on or when the system is reset, the see-through image display portion 6 displays a screen, such as that shown in FIG. 21. In this case, as shown in FIG. 21, a photographic frame 201 indicating a photographic range corresponding to a standard lens (for example, having a field angle of 50°) is displayed in a see-through manner. That is, the photographic frame 201 having a visual angle of 50° when viewed from a photographer is displayed in a see-through manner.

Figure 22:
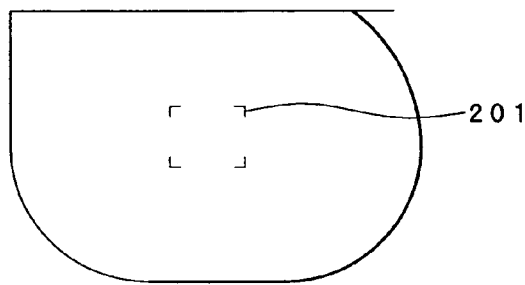
FIG. 22 illustrates a display example when the zoom is changed to the telephotographing mode in the same embodiment.

FIG. 22 illustrates a display example when the zoom is changed to the tele (T) mode, and the photographic frame 201 shown in FIG. 22 indicates a photographic range corresponding to the telephotographing operation. As stated above, the photographic frame 201 can be changed by the operation of the zoom switch 75, and in this case, the focal distance of the photographing optical system 31 is changed so that the field angle of the image capturing device 30 coincides with the visual angle of the photographic frame 201. More specifically, the photographic range corresponding to the focal distance of the standard lens shown in FIG. 21 is shifted to the photographic range corresponding to the tele (T) mode shown in FIG. 22 by the operation of the tele switch 75a of the zoom switch 75.

Figure 23:
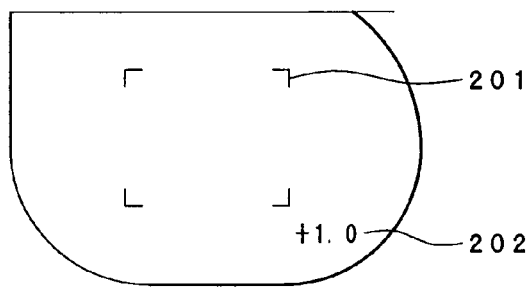
FIG. 23 illustrates a display example when the zoom is changed to the wide mode and when exposure correction is conducted in the same embodiment.

FIG. 23 illustrates a display example when the zoom is changed to the wide (W) mode and when the exposure correction is conducted. The photographic frame 201 shown in FIG. 23 indicates a photographic range corresponding to the wide (W) mode, and the corrected exposure is indicated at the bottom right of the photographic frame 201 as information 202. In this example, the exposure was corrected by +1.0 by the operation of the exposure correction switch 76. The information 202 concerning the exposure correction can be indicated by other than numerical values, such as a bar graph or an index. The photographic range corresponding to the focal distance of the standard lens shown in FIG. 21 is shifted to the photographic range of the photographic frame 201 shown in FIG. 23 by the operation of the wide switch 75b of the zoom switch 75.

Figure 24:
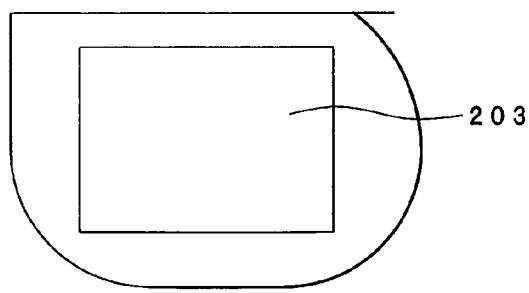
FIG. 24 illustrates a display example when an image is displayed as an electronic view in the same embodiment.

FIG. 24 illustrates a display example when an image is displayed as an electronic view. When the electronic view display (V) is selected by the F/V switch 72, an electronic image 203 captured by the image capturing device 30 is projected on the photographer's eye as a virtual image. The size of the image displayed as an electronic view can be set according to the resolution of the image, and when the resolution is low, the image can be displayed with a small size.

Figure 25:
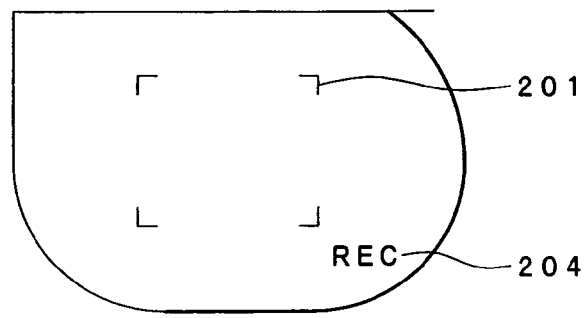
FIG. 25 illustrates a display example when a moving picture is being recorded in the same embodiment.

FIG. 25 illustrates a display example when a moving picture is being recorded. When the record switch 74 is operated to start recording, the photographic frame 201 indicating the photographic range is displayed, as shown in FIG. 25, and also, information 204 indicating that a recording operation is in progress is indicated as "REC", for example, at the bottom right of the photographic frame 201. The information 204 may be other than characters.

Figure 26:
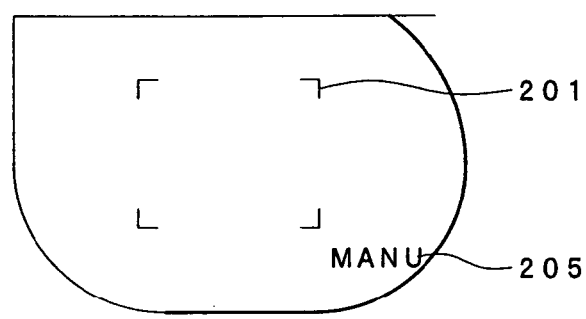
FIG. 26 is a display example in a manual mode in the same embodiment.

FIG. 26 illustrates a display example in the manual mode. When the manual mode (M) is set by the operation of the FA/A/M switch 71, information 205 indicating that the manual mode (M) is selected is displayed as "MANU" at the bottom right of the photographic frame 201. When the information 205 "MANU" is not displayed, the camera 1 is in the auto (A) mode.

Figure 27:
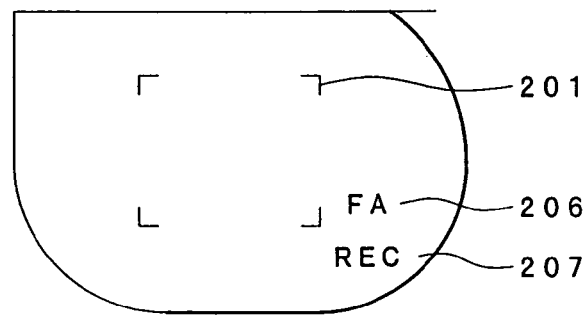
FIG. 27 is a display example in a full auto mode in which a moving picture is being recorded in the same embodiment.

FIG. 27 illustrates a display example in which a moving picture is being recorded in the full auto mode. When the full auto mode (FA) is set by the operation of the FA/A/M switch 71 and when the recording operation is in progress by the operation of the record switch 74, the photographic frame 201 indicating the photographic range is displayed, as shown in FIG. 27, and also, information 206 indicating that the full auto mode is selected is displayed as "FA" and information 207 indicating that the recording is in progress is displayed as "REC" at the bottom right of the photographic frame 201. The information 206 or 207 may be other than characters.

Figure 28:
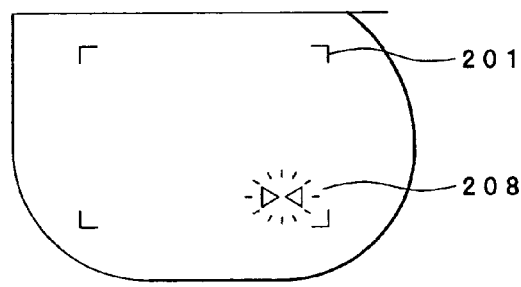
FIG. 28 illustrates a display example of alarm information indicated in a see-through manner in the same embodiment when the focal distance of a photographing optical system is to be further decreased even when it has reached the adjustable lower limit.

FIG. 28 illustrates a display example of alarm information 208 indicated in a see-through manner when the focal distance f of the photographing optical system 31 is to be further decreased even if it has reached the adjustable lower limit k1. That is, when the zoom operation is further continued to decrease the focal distance f in the wide mode even if the zoom has reached the limit of the wide mode, the alarm information 208 is displayed together with the photographic frame 201 indicating the photographic range.

Figure 29:
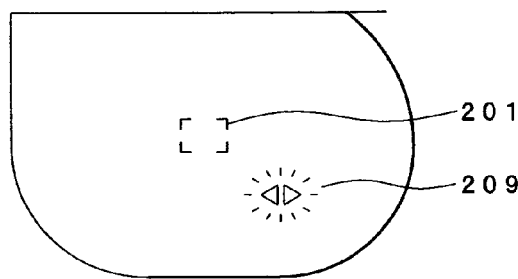
FIG. 29 illustrates a display example of alarm information indicated in a see-through manner in the same embodiment when the focal distance of the photographing optical system is to be further increased even when it has reached the adjustable upper limit.

FIG. 29 illustrates a display example of alarm information 209 indicated in a see-through manner when the focal distance f of the photographing optical system 31 is to be further increased even if it has reached the adjustable upper limit k2. That is, when the zoom operation is further continued to increase the focal distance f in the tele mode even if the zoom has reached the limit of the tele mode, the alarm information 209 is displayed together with the photographic frame 201 indicating the photographic range.

Figure 30:
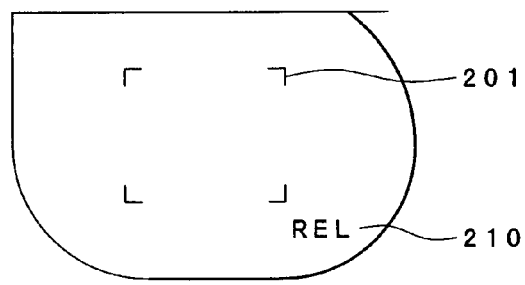
FIG. 30 illustrates a display example when a photographing operation for a still image is performed in the same embodiment.

FIG. 30 illustrates a display example when a photographing operation for a still image is performed. In this case, the photographic frame 201 indicating the photographic range is displayed, and also, information 210 indicating that a still image has been recorded is indicated as "REL" at the bottom right of the photographic frame 201. The information 210 is not restricted to characters.

Figure 31:
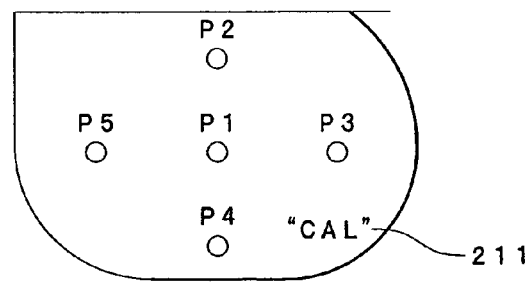
FIG. 31 illustrates a display example in a calibration mode in the same embodiment.

FIG. 31 illustrates a display example in the see-through image display portion 6 in the calibration mode. When the calibration mode is selected by operating the menu button 63, the menu selection switch 66, 67, 68, or 69, or the setting switch 65 of the first operation switch 162, the frame shown in FIG. 31 is displayed. That is, information 211 indicating the calibration mode is selected is displayed as "CAL" at the bottom right of the frame, and also, indexes P1 through P5 for calibration are displayed by sequentially blinking. The index P1 is displayed at the center of the frame, and the indexes P2, P3, P4, and P5 are respectively displayed at the top, right, bottom, and left of the frame.

In the above-described display examples, normal information is displayed by allowing, for example, the G diode of LED 113 to emit light, and alarm information is displayed by allowing, for example, the R diode of LED 113 to emit light.

Figure 32:
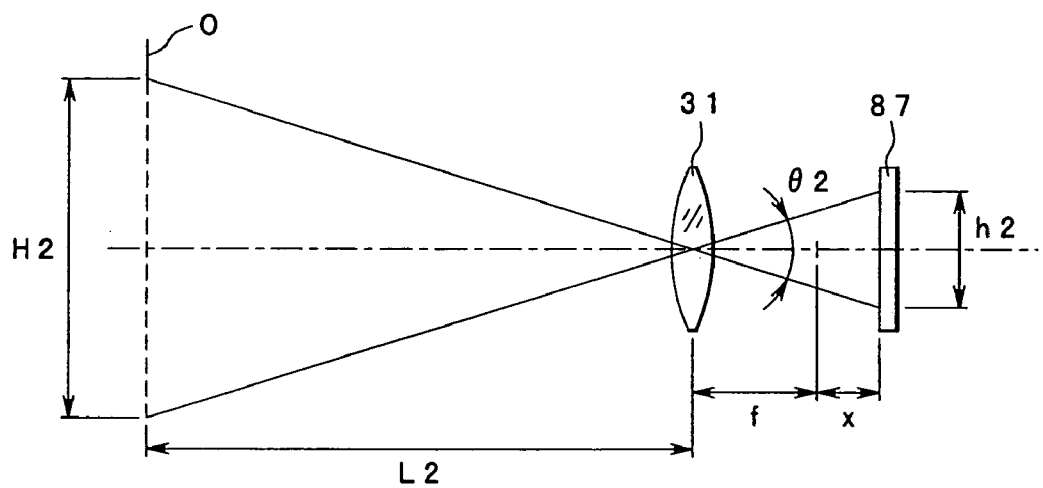
FIG. 32 illustrates the optical relationship between a subject to the photographing optical system and a charge-coupled device (CCD) in the same embodiment.
Figure 33:
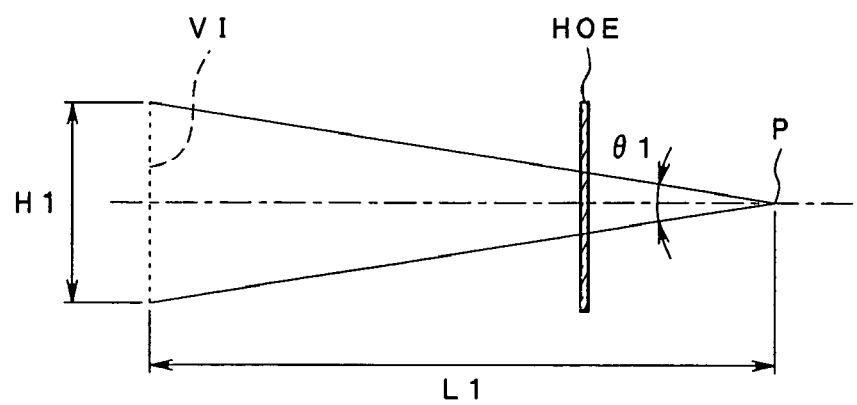
FIG. 33 illustrates the optical relationship of a holographic optical element (HOE) to an eye and a virtual image formed by the HOE in the same embodiment.
Figure 34:
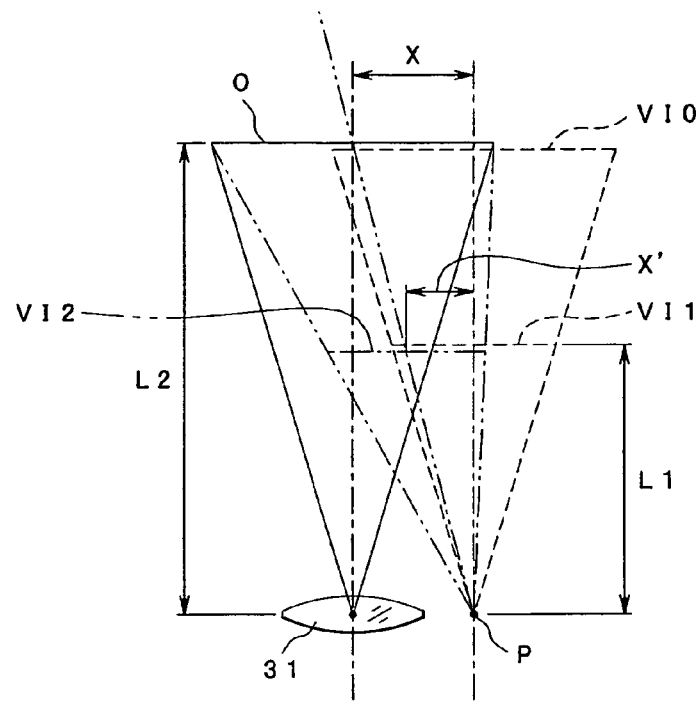
FIG. 34 illustrates the amount by which the virtual image is shifted for correcting the parallax in the same embodiment.

The principle of the correction for the parallax based on the distance to a subject is described below with reference to FIGS. 32 through 34. FIG. 32 illustrates the optical relationship of a subject to the photographing optical system 31 and the CCD 87. FIG. 33 illustrates the optical relationship of a HOE to the eye and a virtual image formed by the HOE. FIG. 34 illustrates the amount by which the virtual image is shifted for correcting the parallax.

As shown in FIG. 32, when the horizontal size of the image capturing area of the CCD 87 is indicated by h2, when the focal distance of the photographing optical system 31 is represented by f, when the distance from the principal point of the photographing optical system 31 to the CCD 87 is designated by f+x, when the distance from the principal point of the photographing optical system 31 to the subject O is indicated by L2, when the horizontal length of the subject O captured by the CCD 87 is represented by H2, and when the photographic field angle in the horizontal direction is indicated by θ2, the following equation holds true.

$$\tan\left(\frac{\theta 2}{2}\right) = \frac{\frac{h2}{2}}{(f+x)} \quad (1)$$

As shown in FIG. 33, when the distance from the pupil P of the photographer to the position of the photographic frame (virtual image VI) indicating the photographic range is indicated by L1, when the horizontal length of the photographic frame is represented by H1, and when the angle (visual angle) concerning the photographic frame having the horizontal length H1 from the position of the pupil P is designated by θ1, the following equation holds true.

$$\tan\left(\frac{\theta 1}{2}\right) = \frac{\frac{H1}{2}}{L1} \quad (2)$$

In order to perform a photographing operation in the photographic range set by the photographer, it is necessary that the photographic field angle and the visual angle be equal to each other, i.e., θ2=θ1. Under the condition of θ2=θ1, the right side of equation (1) and the right side of equation (2) should be equal to each other. To satisfy this requirement, the focal distance f of the photographing optical system 31 can be determined by the following equation.

$$f = \frac{L1}{H1} \cdot h2 - x \quad (3)$$

From the principle of the image formation using a lens, the following equation holds true.

$$\frac{1}{L2} + \frac{1}{f+x} = \frac{1}{f} \quad (4)$$

By eliminating x from equation (3) and equation (4), the following equation can be derived.

$$f = \frac{h2}{\frac{h2}{L2} + \frac{H1}{L1}} \quad (5)$$

If the subject distance L2 is found from equation (5), the focal distance f can be determined.

To establish the relationship of h2/L2<<H1/L1 in an ordinary subject, when it is desired that calculations are simplified or when means for determining the distance to a subject is not provided, the approximation can be obtained by the following equation.

$$f \cong \frac{L1}{H1} \cdot h2 \quad (6)$$

The principle of the parallax correction is described below with reference to FIG. 34.

To discuss the principle of the parallax correction, it is assumed that the optical axis of the photographing optical system 31 and the visual axis of the photographer are perpendicular to the photographer's face and that the optical axis and the visual axis are disposed separately from each other by the distance X. The parallax is caused by the fact that the optical axis and the visual axis are separated from each other by the distance X. If the optical axis and the visual axis are relatively tilted, a large parallax may occur, and it is thus necessary to adjust them to be in parallel. Accordingly, by using an adjusting mechanism, such as that shown in FIGS. 19A, 19B, and 20, the optical axis and the visual axis are adjusted.

As indicated by the solid lines and the broken lines in FIG. 34, if the distance to a virtual image VI0 in a photographic frame indicating the photographic range is equal to the distance to a subject O, a deviation (parallax) between the range observed by the photographer and the range captured by the image capturing device 30 is a constant value X. In actuality, however, the distance L1 from the pupil P of the photographer to a virtual image VI1 is different from the distance L2 from the principal point of the photographing optical system 31 to the subject O. The amount X' by which the parallax is corrected (hereinafter referred to as the "parallax correction amount X'") which allows the photographic frame as the virtual image to match the actual image capturing range is expressed by the following equation.

$$X' = \frac{L1}{L2} \cdot X \quad (7)$$

When the reciprocal of the magnification (i.e., the ratio of the size of the virtual image to the size of the image displayed on the LCD 115) of the virtual image VI1 of the photographic frame is represented by β, the amount SP by which the image displayed on the LCD 115 is shifted (hereinafter referred to as the "shift amount SP") for correcting the parallax is expressed by the following equation.

$$SP = \beta \cdot X' = \frac{L1}{L2} \cdot \beta \cdot X \quad (8)$$

Accordingly, the fourth CPU 111 controls the LCD driver 117 to shift the image displayed on the LCD 115 by the shift amount SP expressed by equation (8). Then, the position of the virtual image VI1 is shifted to the position of a virtual image VI2 by the distance X', and as indicated by the two-dot-chain lines in FIG. 34, the range indicated by the photographic frame of the virtual image coincides with the actual image capturing range.

As described above, the shift amount SP for conducting the parallax correction is determined by the subject distance L2, and basically, the parallax correction should be performed every time the subject distance L2 is changed.

However, when, for example, β=1/100, L1=2 m, L2=2 m, X=4 cm, the shift amount SP is calculated to be 0.4 mm. This parallax correction amount can be converted into the visual angle Sθ by using the following equation.

$$S\theta = \tan^{-1}\left(\frac{X}{L2}\right) \quad (9)$$

According to equation (9), the visual angle Sθ is calculated to be about one degree, which is not a very large parallax. Accordingly, it can be said that the parallax correction is not necessary in most cases when regular photographing is conducted. On the other hand, since the element in the parentheses of the right side of equation (9) is proportional to the reciprocal of the subject distance L2, the visual angle Sθ is increased and the parallax correction using equation (8) is required when the subject distance L2 is small, i.e., when short-distance photographing is performed.

In the above-described example, the subject distance L2 is determined based on triangular distance measurement. That is, light from the projector LED 16a is projected on a subject, and the light reflected by the subject forms the image on the CCD 87. Then, the subject distance L2 is determined from the position of the image on the CCD 87 based on the principle of the triangular distance measurement.

Since the subject distance L2 is equal to the direction of the line of sight, the projector LED 16a is disposed as close as possible to the eye for detecting the direction of the line of sight, and the light from the projector LED 16a is projected in the direction (θ) of the line of sight by using known means for controlling a projecting direction.

Instead of determining the subject distance L2 based on the above-described principle of the triangular distance measurement, the subject distance L2 may be determined from the position of the focus lens 85 when auto focus is conducted. That is, assuming that the position of the subject is infinite, the AF processing circuit 98 shown in FIG. 11 drives the focus lens 85 to move to the position where high frequency components of the image signal of a subject disposed in a predetermined range of the same field angle as the direction (θ) of the line of sight are maximized (i.e., contrast-type focus detection is conducted), and the subject distance L2 is determined from the position of the focus lens 85. In this case, strictly speaking, the subject in the direction (θ) of the line of sight does not coincide with the subject in the same field angle as the direction (θ) to be processed by the AF processing circuit 98. Practically, however, the subject distance can be determined safely since the subject has a certain volume.

Figure 35:
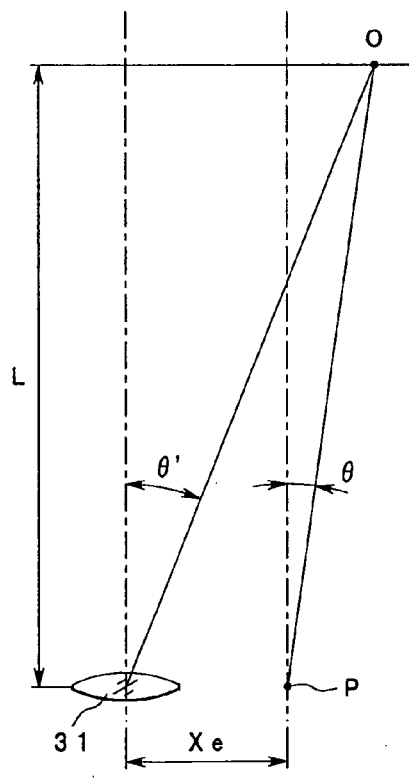
FIG. 35 illustrates the angle when a subject on a line of sight is viewed from the image capturing device in the same embodiment.

A description is now given, with reference to FIG. 35, of a technique for considering a parallax caused by the fact that the image capturing device 30 and the line-of-sight-direction detecting portion of the line-of-sight-direction/angular-velocity detecting portion 7 are disposed away from each other by a predetermined distance. FIG. 35 illustrates the angular relationship when a subject in the direction of the line of sight is viewed from the image capturing device 30.

It is now considered that the photographing optical system 31 of the image capturing device 30 is to be focused on a subject disposed in the direction of the line of sight detected by the line-of-sight-direction/angular-velocity detecting portion 7. When the distance to the subject is far, the subject in the direction of the photographer's line of sight when viewed from the image capturing device 30 almost coincides with the subject viewed from the photographer. However, when the distance to the subject becomes closer, a deviation between the subject viewed from the image capturing device 30 and the subject viewed from the photographer occurs. Accordingly, even if the photographing optical system 31 is to focus on the subject displaced from the correct position viewed from the photographer, the focused subject does not always match that viewed from the photographer. FIG. 35 illustrates the positional relationship when a parallax caused by such a deviation occurs.

It is now assumed that the photographer views a subject O at a distance L in the direction having an angle θ with respect to the visual axis parallel to the optical axis of the photographing optical system 31. When the distance between the optical axis of the photographing optical system 31 and the pupil of the photographer is indicated by $X_e$ and when the angle between the optical axis of the photographing optical system 31 and the line connecting the principal point H of the photographing optical system 31 and the subject O is indicated by θ', the following equation holds true.

$$\tan\theta' = \tan\theta + \frac{X_e}{L} \quad (10)$$

Accordingly, the direction θ of the line of sight detected by the line-of-sight-direction/angular-velocity detecting portion 7, the subject distance L detected by the AF processing circuit 98, and the distance $X_e$ are substituted into equation (10) to determine the angle θ', and the photographing optical system 31 is focused on the subject corresponding to the determined angle θ'. When the subject distance L is large, the second term of the right side of equation (10) can be ignored. That is, θ'≈θ, and the influence of the parallax can be safely ignored.

The subject distance L may be determined by the triangular distance measurement or from the result of the contrast-type focus detection.

The operation of the above-described camera 1 is described below with reference to the flowchart of FIGS. 54 and 55.

When the camera 1 is powered on or when the system is reset, in step S1, the photographic frame indicating the photographic range corresponding to the standard lens (having a field angle of 50°) is displayed in the see-through image display portion 6 in a see-through manner, as shown in FIG. 21.

Then, in step S2, the timer 123 built in the second CPU 121 is checked to determine whether a predetermined time has elapsed.

If it is determined in step S2 that a predetermined time has elapsed, the process proceeds to step S3 in which the input statuses of various switches, such as the first operation switch 162 shown in FIG. 8 or the second operation switch 171 shown in FIG. 10, are monitored.

The timer 123 in step S2 restarts counting time when the process proceeds to step S3 after the lapse of the predetermined time in step S2. If it is determined in step S2 that the predetermined time has not elapsed, the monitoring of the switches in step S3 is not performed. In this manner, by checking the input statuses of the switches at regular time intervals while checking the timer, the load on the CPUs can be reduced, and also, the erroneous operations of the switches caused by the chattering can be prevented. The timers used in steps S14, S20, and S25, which are described below, serve the function similar to the function of the timer in step S2.

After step S3, the subroutine of safety processing, which is described below, is executed in step S4.

After step S4 or if it is determined in step S2 that the predetermined time has not elapsed, the process proceeds to step S5 to determine whether the camera 1 is set either in the auto mode (A) or the manual mode (M), or it is set in the full auto mode (FA). The setting of the mode is performed by the operation of the FA/A/M switch 71, as stated above.

If it is determined in step S5 that the camera 1 is set in the full auto mode (FA), the process proceeds to step S6 to determine whether the record mode is set by the operation of the record switch 74.

If the record mode is not set, the process returns to step S2, and step S2 and the subsequent steps are repeated.

If it is determined in step S6 that the record mode is set, in step S7, the standard photographic frame is set, and also, the information 206 "FA" indicating that the full auto mode is set and the information 207 "REC" indicating the recording is in progress are displayed in a see-through manner, as shown in FIG. 27.

Figure 43:
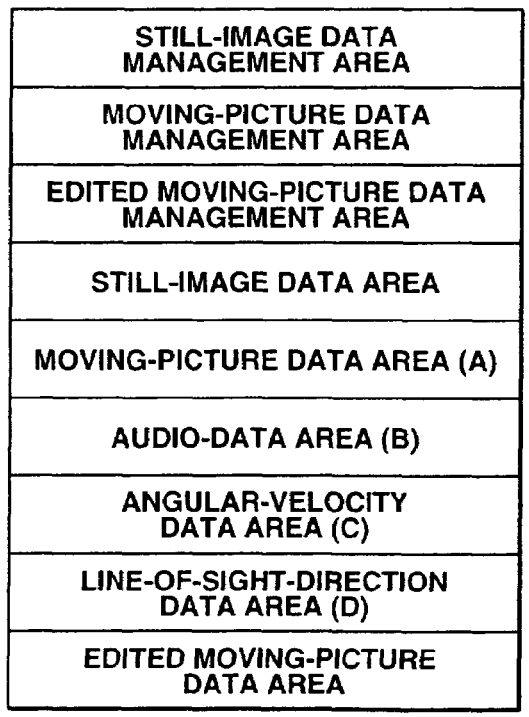
FIG. 43 illustrates the structure of various data recorded in step S8 of FIG. 54.

Then, in step S8, the moving picture data, angular velocity data, line-of-sight-direction data, and audio data are recorded on the recording memory 157, as shown in FIG. 43, which is described below. The process then returns to step S2, and step S2 and the subsequent steps are repeated.

If it is determined in step S5 that the auto mode (A) or the manual mode (M) is set, the process proceeds to step S9 to determine whether the exposure correction is set.

If the exposure correction has been set, the process proceeds to step S10 in which the corrected exposure is indicated as the information 202 in a see-through manner, as shown in FIG. 23.

If it is determined in step S9 that the exposure correction has not been set or after step S10, the process proceeds to step S11. In step S11, it is determined whether the camera 1 is set in the view mode (V) in which the camera 1 displays the image captured by the image capturing device 30 in a see-through manner or in the frame mode (F) in which only the photographic frame indicating the photographic range is displayed. The setting of this mode can be performed by the operation of the F/V switch 72, as stated above.

When it is determined in step S11 that the camera 1 is set in the frame mode (F), it is determined in step S12 whether the camera 1 is set in the auto mode (A) or the manual mode (M). The setting of this mode can be performed by the operation of the FA/A/M switch 71, as stated above.

In the auto mode (A), when the focal distance of the photographing optical system 31 is equal to or greater than a predetermined value, the image captured by the image capturing device 30 is automatically enlarged and is displayed in a see-through manner even if the camera 1 is set in the frame mode (F). With this arrangement, in a telephotographing operation, details of a subject can be easily checked without a troublesome operation, and also, when the focal distance is a regular value (less than the above-described predetermined value), only a photographic frame indicating the photographic range is displayed, thereby making the photographer comfortable to perform a photographing operation even for a long time.

In the manual mode (M), a determination as to whether the image is displayed in a see-through manner is manually performed, and normally, only the photographic frames are displayed in the manual mode (M).

If it is determined in step S12 that the manual mode (M) is selected, the process proceeds to step S13 in which the information 205 "MANU" is indicated, as shown in FIG. 26.

Then, in step S14, the timer is checked to determine whether a predetermined time has elapsed.

If the outcome of step S14 is YES, the process proceeds to step S15 in which a value for correcting the parallax caused by a deviation between the range observed by the photographer and the photographic range observed by the image capturing device 30 is calculated based on the subject distance obtained in step S41 in FIG. 56, which is described below, in the safety processing in step S4 according to the above-described principle.

Then, in step S16, the display of the photographic frame is updated based on the corrected parallax value calculated in step S15 so that the photographic frame can be displayed at a correct position. According to this process, even when the subject distance is changed, the photographic range can be displayed precisely.

If it is determined in step S12 that the camera 1 is set in the auto mode (A), it is determined in step S17 whether the focal distance of the photographing optical system 31 is greater than a predetermined value α, i.e., whether the camera 1 is set in the tele mode (T).

If the focal distance is found to be smaller than or equal to the predetermined value α, the process proceeds to step S14. If the focal distance of the photographing optical system 31 is found to be greater than the predetermined value α, or if it is determined in step S11 that the camera 1 is set in the view mode (V), the process proceeds to step S18. In step S18, the electronic image captured by the image capturing device 30 is superimposed on the subject in a see-through manner by the see-through image display portion 6.

After step S18 or step S16, or if it is determined in step S14 that the predetermined time has not elapsed, it is determined in step S19 whether the size of the photographic frame is increased by operating the wide switch 75b of the remote controller 5.

If it is determined in step S19 that the photographic frame is increased, it is determined in step S20 by checking the timer whether a predetermined time has elapsed.

If it is found in step S20 that the predetermined time has elapsed, it is determined in step S21 whether the focal distance f of the photographing optical system 31 is further to be decreased even though it has reached the adjustable lower limit k1.

If the outcome of step S21 is YES, the process proceeds to step S22 in which the alarm information 208 is displayed in a see-through manner, as shown in FIG. 28.

If the focal distance f has not reached the lower limit k1, the process proceeds to step S23 in which the variator lens 82 of the photographing optical system 31 is driven to decrease the focal distance f so that the photographic range set by the photographer can be implemented.

If it is determined in step S19 that the size of the photographic frame is not increased, it is determined in step S24 whether the size of the photographic frame is decreased by operating the tele switch 75a of the remote controller 5.

If the result of step S24 is YES, it is determined in step S25 by checking the timer whether a predetermined time has elapsed.

If the predetermined time has elapsed, it is determined in step S26 whether the focal distance f of the photographing optical system 31 is further to be increased even though it has reached the adjustable upper limit k2.

If it is found in step S26 that the focal distance f is further to be increased, the process proceeds to step S27 in which the alarm information 209 is displayed in a see-through manner, as shown in FIG. 29. If the focal distance f has not reached the upper limit k2, the process proceeds to step S28 in which the variator lens 82 of the photographing optical system 31 is driven to increase the focal distance f so that the photographic range set by the photographer can be implemented.

If it is determined in step S24 that the photographic frame is not decreased, or if it is determined in step S20 or S25 that the predetermined time has not elapsed, or after step S22, S23, S27, or S28, it is determined in step S29 whether the record mode is set by operating the record switch 74 contained in the second operation switch 171 (or the first operation switch 162) of the remote controller 5.

If the record mode is set, the process proceeds to step S30 in which the information 204 "REC" is indicated in a see-through manner, as shown in FIG. 25, and in step S31, the recording operation is started.

After step S31 or if it is determined in step S29 that the record mode is not set, it is determined in step S32 whether a still-image photographing operation is performed by the release switch 73 contained in the second operation switch 171 (or the first operation switch 162) of the remote controller 5.

If the outcome of step S32 is YES, the process proceeds to step S33 in which a still image is recorded. Then, in step S34, the information 210 "REL" indicating that a still image has been recorded is displayed in a see-through manner, as shown in FIG. 30.

After step S34 or if it is found in step S32 that the still-image photographing operation by using the release switch 73 is not performed, the process returns to step S2, and the above-described operation is repeated.

Figure 54:
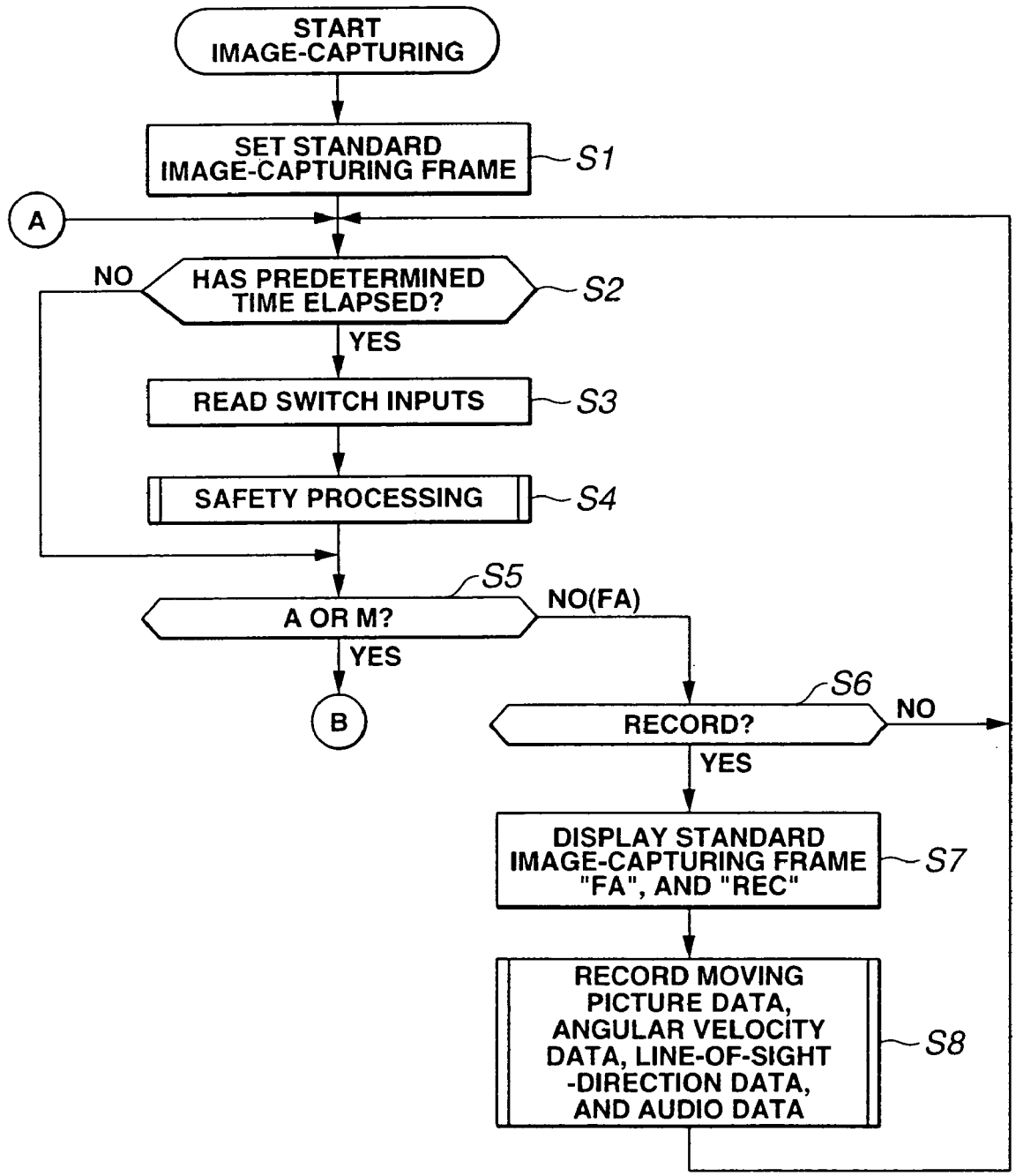
FIGS. 54 and 55 are a flowchart illustrating a part of the operation of the camera in the same embodiment.
Figure 55:
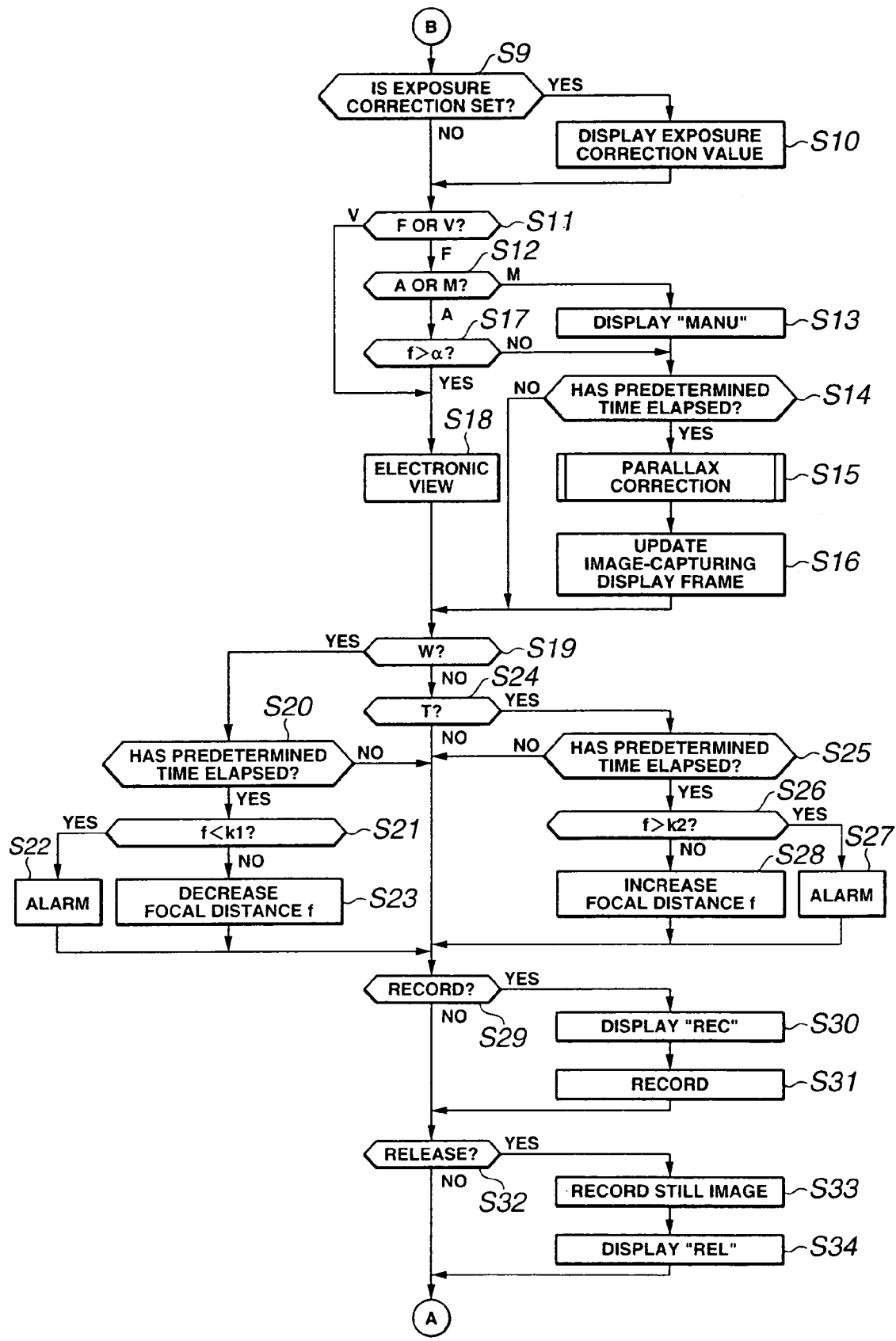
Figure 56:
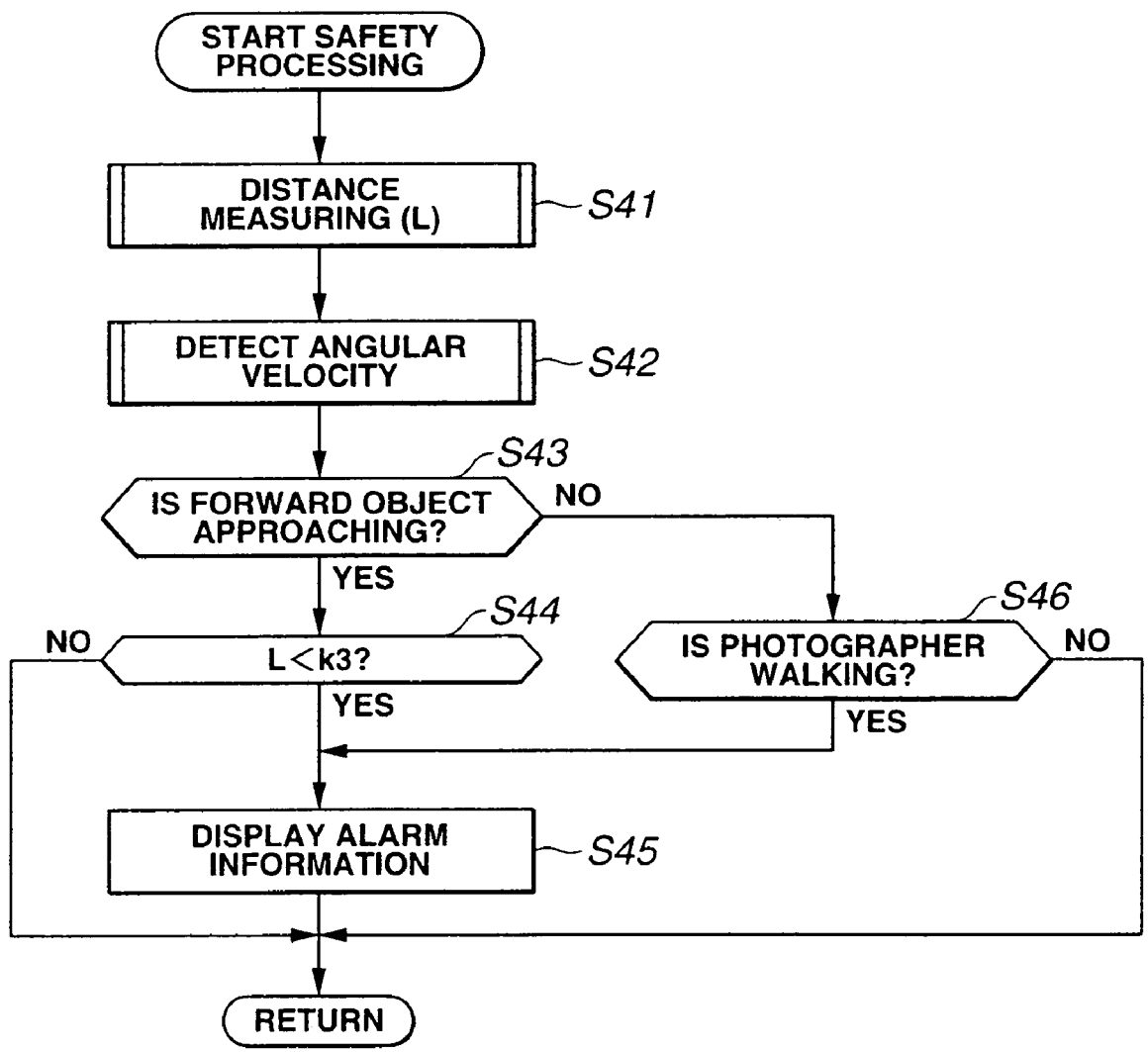
FIG. 56 is a flowchart illustrating a detailed subroutine of safety processing in step S4 of FIG. 54.

FIG. 56 is a flowchart illustrating details of the subroutine of the safety processing in step S4 in FIG. 54.

As described above, by operating the switch 39, the display of a see-through image can be prohibited. Alternatively or additionally, the condition of the photographer is detected, and the see-through display operation during the photographing operation is automatically prohibited depending on the detected condition.

When this safety processing is started, in step S41, the distance to a subject is measured (distance measurement). The principle of the distance measurement is as follows.

The light emitted from the projector LED 16a of the projector light-emitting portion 16 disposed at the center of the frame 13 is converted into almost parallel light by the condenser lens 16b, and is illuminated on the subject. The light is then reflected by the subject and is incident on the image capturing plane of the CCD 87 via the photographing optical system 31.

In this case, when the distance between the condenser lens 16b and the photographing optical system 31 is indicated by L, when the distance from the principal point of the photographing optical system 31 to the image capturing plane of the CCD 87 is represented by f1, and when the distance between the image forming position of the reflected light from the subject O on the image capturing plane of the CCD 87 and the optical axis of the photographing optical system 31 intersecting with the image capturing plane is indicated by ΔL, the distance R to the subject O can be determined by the following equation based on the principle of known triangular distance measurement.

$$R = \frac{L}{\Delta L} \cdot f1 \quad (11)$$

The distance R determined as described above is temporarily stored in the RAM 122 built in the second CPU 121.

Then, in step S42, the angular velocities around the two independent axes are detected by the angular velocity sensors 141 and 142, and are temporarily stored in the RAM 122.

Then, it is determined in step S43 by comparing the current distance-measurement result with the previous distance-measurement result whether an object in front of the photographer is approaching.

If it is determined in step S43 that the object is approaching, it is further determined in step S44 whether the distance L to the subject is smaller than a predetermined distance k3.

If it is determined in step S44 that the distance L is smaller than the predetermined distance k3, in step S45, a predetermined warning mark is indicated on the see-through image display portion 6 in a see-through manner. In this example, only the distance to the object in front of the photographer is determined without considering the moving speed of the object. In step S43, however, the distance to the object is determined, and also, the moving speed of the object may also be determined so that the predetermined distance k3 can be adaptively set according to the moving speed. In this case, as the moving speed of the object is faster, the predetermined distance k3 is set to be larger. The moving speed of the object can be measured by detecting the distance L at regular time intervals.

If it is found in step S43 that the object is not approaching, the process proceeds to step S46 to determine based on the angular velocity data whether the photographer is walking.

That is, feature patterns when a human is walking or running to be output from the angular velocity sensors 141 and 142 have been stored in the EEPROM 102. Then, when the patterns output from the angular velocity sensors 141 and 142 match the feature patterns when a human is walking or running, it is determined in step S46 that the photographer is walking (or running).

If it is determined in step S46 that the photographer is walking or running, the process proceeds to step S45 in which the alarm information is indicated, as stated above.

If it is determined in step S44 that the distance L to the object is greater than or equal to the predetermined distance k3, or if it is determined in step S46 that the photographer is not walking (or running), the alarm information in step S45 is not given.

After step S45, or if the outcome of step S44 or S46 is NO, the safety processing is completed, and the process returns to step S5 of FIG. 54.

Although in this example the alarm information is given, the see-through display operation of the see-through image display portion 6 may be forcefully (automatically) turned OFF.

In the above-described example, the condition of the photographer is detected by comparing the patterns output from the angular velocity sensors 141 and 142 with the predetermined feature patterns. More simply, when values output from the angular velocity sensors 141 and 142 are greater than or equal to predetermined values for a predetermined time, alarm information may be given or the see-through display operation may be prohibited.

It is determined whether the photographer is walking or running. However, any condition of the photographer for preventing the danger may be detected. For example, it may be determined based on the velocity of the photographer relative to the velocity of the object in front whether the photographer is driving. If the photographer is found to be driving, a predetermined warning may be given, or the see-through display operation may be prohibited. In this case, to determine whether the photographer is driving or he/she is only in a bus or a train, the outputs of the angular velocity sensors 141 and 142 may be used, or another sensor may be provided to further increase the detection precision.

The technique for preventing the danger, such as collision with an object in front during a photographing operation, is applied, not only to the camera 1, but also to a head-mounted display device having a see-through display function or to ordinary cameras or display devices.

By providing such a safety function, the camera 1 can be safely used. This function is particularly effective for the camera 1 that allows a photographer to easily perform a photographing operation while taking normal action.

The principle of the line-of-sight-direction detection is described below with reference to FIGS. 36 through 39.

Figure 36:
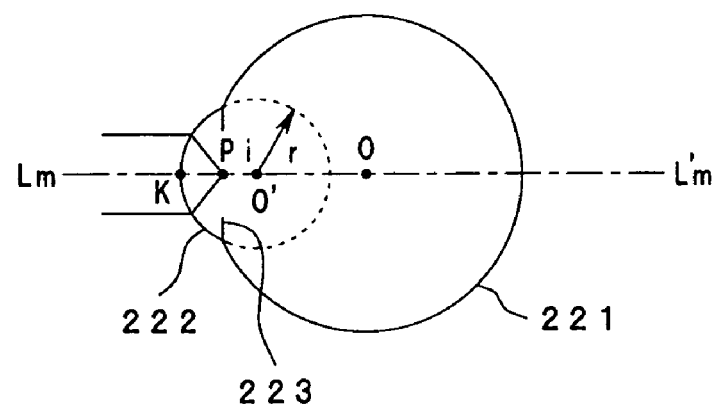
FIG. 36 illustrates a sectional view of an eye on the plane including an optical axis Lm of illumination light and a visual axis Lm' in the direction of the line of sight when the optical axis Lm and the visual axis Lm' coincide with each other in the same embodiment.

FIG. 36 is a sectional view illustrating an eye on the plane including an optical axis Lm of illumination light and a visual axis Lm' in the direction of the line of sight when the optical axis Lm and the visual axis Lm' coincide with each other. In FIG. 36, a large circular arc having a point o at the center indicates an eyeball 221, a circular arc having a point O' at the center represents a cornea 222, and a segment extending from the intersection between the cornea 222 and the eyeball 221 represents an iris 223.

When parallel light having the optical axis Lm is applied to the eye shown in FIG. 36, a light spot Pi (hereinafter referred to as a "Purkinje image") is generated substantially at the middle point between the center of curvature O' and the vertex K of the cornea 222.

When the optical axis Lm of the light incident on the cornea 222 coincides with the visual axis Lm' indicating the direction of the line of sight, the center of the pupil of the circle in the iris 223, the Purkinje image Pi, the center of curvature O' of the cornea 222, and the rotational center O of the eyeball 221 are positioned on the optical axis Lm, as shown in FIG. 36. The Purkinje image Pi is positioned at the center of the pupil. In this state, when the eye is observed in the front, the Purkinje image Pi is observed as a bright image since the reflectivity of the Purkinje image Pi is high, while the pupil or the iris is observed as a dark image since the reflectivity thereof is considerably low.

Figure 37:
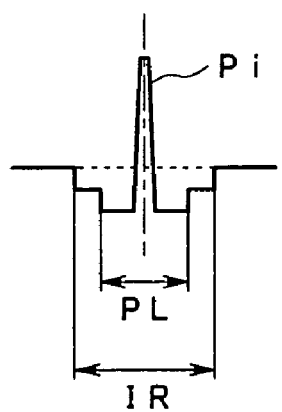
FIG. 37 is a diagram in which the vertical axis indicates plotted output signals from the CCD when the image of the eye is captured by the line-of-sight-direction/angular-velocity detecting portion and the horizontal axis represents the line vertically intersecting with the optical axis Lm in the same embodiment.

FIG. 37 is a diagram in which the vertical axis indicates plotted output signals from the CCD 134 when the image of the eye is captured by the line-of-sight-direction/angular-velocity detecting portion 7 and the horizontal axis represents the line vertically intersecting with the optical axis Lm.

FIG. 37 shows that the image IR of the iris 223 is darker than the eyeball 221 around the iris 223, the image PL of the pupil is darker than the image IR of the iris 223, and the Purkinje image Pi is much brighter than the image IR or the image PL. Accordingly, by detecting the brightness distribution, the position of the Purkinje image from the center of the iris (or pupil) can be determined.

Figure 38:
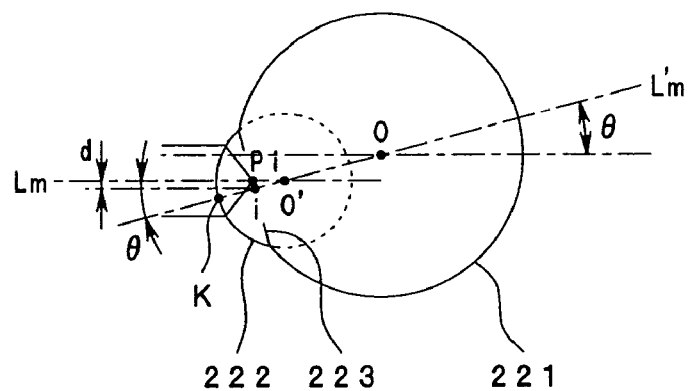
FIG. 38 is a sectional view of an eye on the plane including the optical axis Lm of illumination light and the visual axis Lm' in the direction of the line of sight when the optical axis Lm and the visual axis Lm' intersect with each other in the same embodiment.

FIG. 38 is a sectional view illustrating an eye on the plane including the optical axis Lm of illumination light and the visual axis Lm1 in the direction of the line of sight when the optical axis Lm and the visual axis Lm' intersect with each other.

When the eyeball 221 is rotated around the center O with respect to the optical axis Lm by the angle θ, a relative deviation occurs between the center of the pupil and the position of the Purkinje image Pi. When the distance from the center of curvature O' of the cornea 222 to the center i of the pupil is indicated by $L_x$, the distance d between the center i of the pupil and the Purkinje image Pi on the image capturing plane of the CCD 134 when viewed from the optical axis Lm (although the distance d shown in FIG. 38 appears the distance on the eye, it is, more precisely, the distance on the image capturing plane) is expressed by the following equation:

$$d \approx \beta_1 \cdot L_x \cdot \sin\theta \quad (12)$$

where $\beta_1$ represents the magnification of the image forming lens 132.

Figure 39:
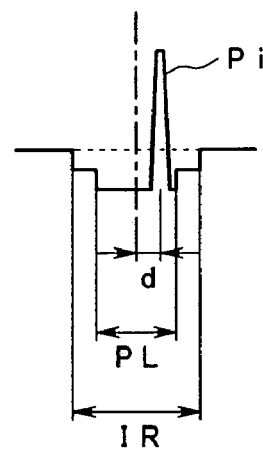
FIG. 39 is a diagram in which the vertical axis represents plotted output signals of the CCD when the image of the eye is captured by the line-of-sight-direction/angular-velocity detecting portion and the horizontal axis designates the line intersecting with the optical axis Lm and the visual axis Lm' and perpendicular to the optical axis Lm in the same embodiment.

FIG. 39 is a diagram in which the vertical axis represents plotted output signals of the CCD 134 when the image of the eye is captured by the line-of-sight-direction/angular-velocity detecting portion 7 and the horizontal axis designates the line intersecting with the optical axis Lm and the visual axis Lm' and perpendicular to the optical axis Lm.

FIG. 39 shows that the Purkinje image Pi is detected at a position displaced from the center of the iris (or pupil) by the distance d.

Accordingly, the image of the eye is formed and captured by the light-receiving system of the line-of-sight-direction detecting portion, and image processing is performed on the captured image data to determine the distance d between the position of the Purkinje image Pi and the center of the iris (or pupil), thereby determining the direction (angle) θ of the line of sight. The image formed on the CCD 134 via the light-receiving system, such as that shown in FIG. 15 or 17, becomes distorted, asymmetrical vertically and horizontally. Such geometric characteristics have been stored in the EEPROM 102 as correction information, and the distortion is corrected based on the correction information, and then, the angle θ indicating the direction of the line of sight is calculated based on equation (12).

Details of the image processing for determining the distance d are as follows.

Figure 40:
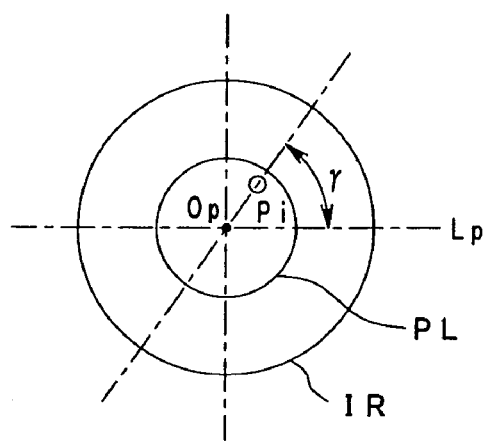
FIG. 40 illustrates the image of an eye obtained from a two-dimensional image capturing device in the same embodiment.

Although the direction of the line of sight has been linearly detected in the above-described principle, the direction of line of sight should be detected two-dimensionally. FIG. 40 illustrates the image of the eye captured by the two-dimensional image capturing element. As shown in FIG. 40, when the center of the pupil is Op, when the Purkinje image is Pi, and when the angle between a predetermined center line Lp passing through the center Op of the pupil and the line connecting the center Op of the pupil and the Purkinje image Pi is γ, the distance between the center Op of the pupil and the Purkinje image Pi corresponds to the distance d in equation (12). Accordingly, based on the distance d, the direction (tilting angle) 0 of the line of sight relative to the direction of the infrared light projected on the observer's eye (hereinafter such a projection direction is referred to as the "reference visual axis") can be determined. The angle γ represents the rotational direction of the eyeball. In this manner, by detecting the position of the center Op of the pupil and the position of the Purkinje image Pi on the two-dimensional image formed on the CCD 134, the two-dimensional line-of-sight direction represented by θ and γ can be determined.

Figure 57:
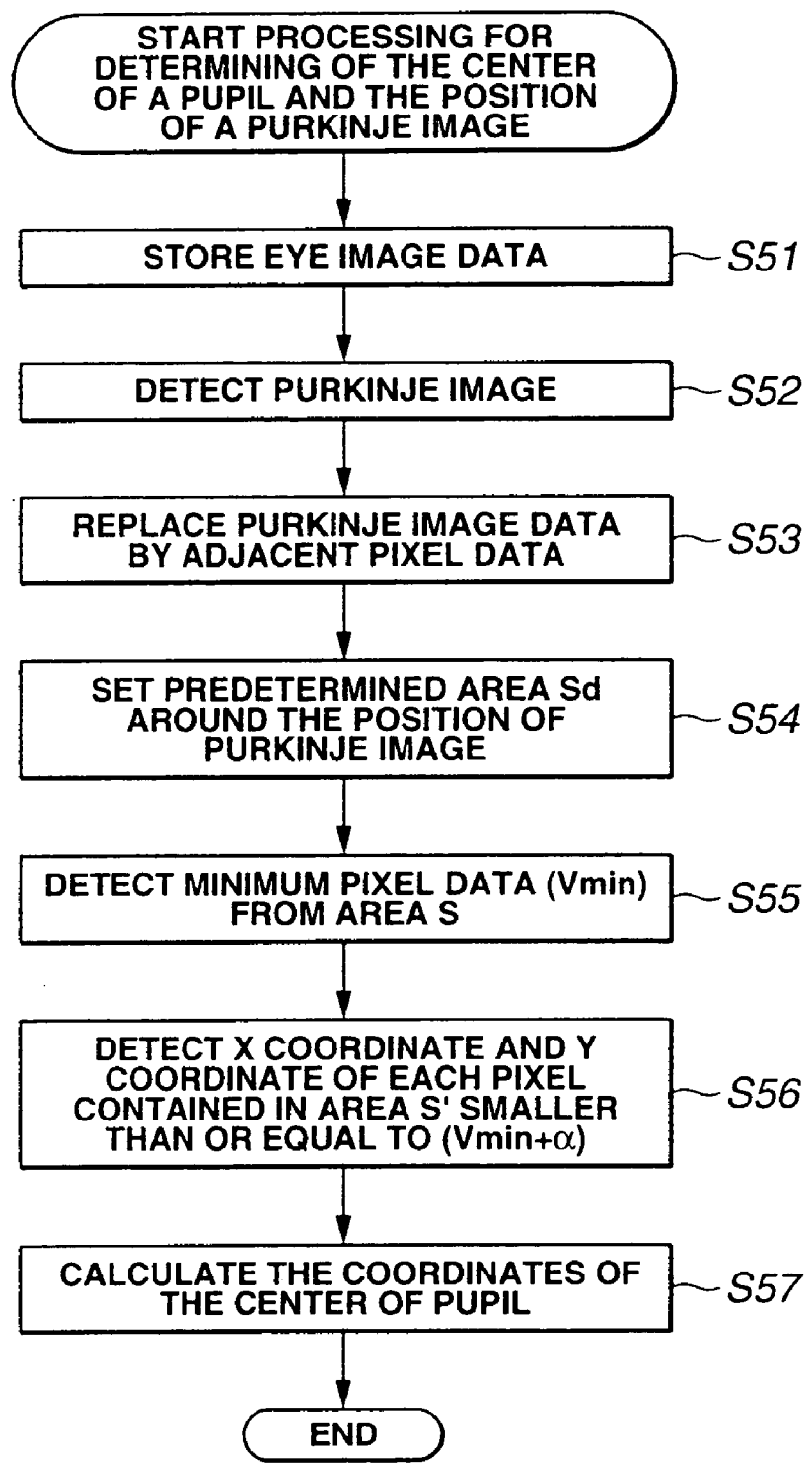
FIG. 57 is a flowchart illustrating processing for determining the position of the center of a pupil and the position of a Purkinje image in the same embodiment.

FIG. 57 is a flowchart illustrating processing for determining the position of the center Op of the pupil and the position of the Purkinje image Pi.

In step S51, image data of the observer's eye obtained by performing photoelectrical conversion by the CCD 134 of the line-of-sight-direction/angular-velocity detecting portion 7 is stored in the memory 155 of the controller/recorder 4. Based on this image data, the following processing is performed by, for example, the first CPU 161.

To remove noise components caused by external light, step S51 may be modified as follows. The image data of the CCD 134 is first stored before projecting infrared light on the observer's eye. Then, the image data of the CCD 134 obtained by projecting infrared light on the observer's eye is stored. Then, the former image data is subtracted from the latter image data, thereby generating image data having an improved S/N ratio. Based on this image data, the following processing can be performed.

In step S51, the image data obtained by the CCD 134 is transferred and stored in the memory 155 of the controller/ recorder 4. Alternatively, a buffer memory may be provided after the A/D conversion circuit 137 of the line-of-sight-direction/angular-velocity detecting portion 7, and the image data can be stored in this buffer memory, and then, the following processing may be performed by, for example, the second CPU 121. With this configuration, the image data for detecting the line of sight can be immediately processed rather than being transferred to the controller/recorder 4. Accordingly, the direction of the line of sight can be detected more quickly, and it is possible to easily respond to a change in the direction of the line of sight.

Figure 41:
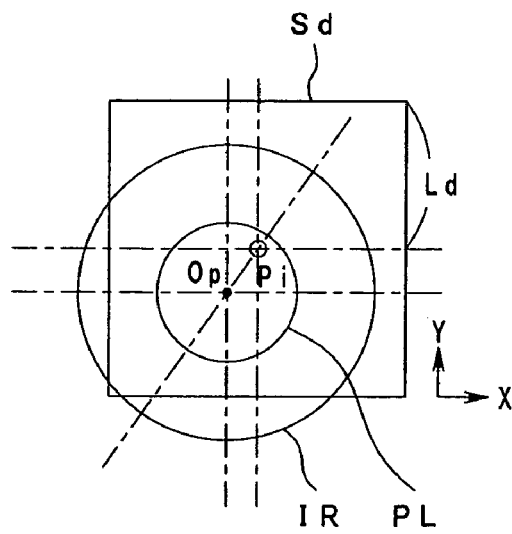
FIG. 41 illustrates a predetermined area set in the image of the eye around a Purkinje image in the same embodiment.

Then, in step S52, the Purkinje image is detected from the obtained image data, and the position of the Purkinje image (for example, the X coordinate representing the center line Lp and the Y coordinate indicating the line perpendicular to the center line Lp shown in FIG. 41) is determined. As described above, the Purkinje image is much brighter than the other image portions. Accordingly, a predetermined threshold THPi may be set, and the area brighter than the threshold THPi can be determined as the Purkinje image. Processing for determining the Purkinje image is not restricted to this approach, and another type of image processing may be used. As the position of the Purkinje image, the centroid of the area brighter than the threshold THPi may be used, or the peak position of the output data may be employed.

Then, in step S53, the pixel data of the pixels determined as the Purkinje image is replaced by pixel data adjacent to the Purkinje image, i.e., pixel data without a Purkinje image. More specifically, the values of the pixel data are traced in the two-dimensional direction around the position of the Purkinje image so as to detect the inflection points of the pixel data. Then, the image inside the boundary formed by connecting the inflection points is determined as the Purkinje image, and the values of the pixel data of the Purkinje image are replaced by the values of the adjacent pixels outside the boundary. In this case, if there is a discrepancy between the levels of a plurality of pixel data adjacent to the Purkinje image, linear interpolation is performed to correct for the discrepancy of the levels, and then, the adjacent pixels can replace the Purkinje image smoothly.

Subsequently, in step S54, a predetermined area Sd around the Purkinje image Pi is set, as shown in FIG. 41. The predetermined area Sd shown in FIG. 41 is set for the image of the eye around the Purkinje image. In the example shown in FIG. 41, the predetermined area Sd is set in the form of a square having one side parallel to the X coordinate and the other side parallel to the Y coordinate. However, the area Sd is not restricted to a square and may be a circle. The predetermined area Sd is set so that it can contain the overall image of the pupil even when the Purkinje image Pi is displaced from the center Op of the pupil by the maximum distance. The area Sd can be set in this manner by designating a half the length Ld of one side when the area Sd is a square, as shown in FIG. 41, and by designating the radius when the area Sd is a circle.

Then, in step S55, the minimum value Vmin is detected from the pixel data contained in the area Sd.

Then, in step S56, a predetermined value $\alpha$ is added to the minimum value Vmin, i.e., Vmin+$\alpha$, is set. The value $\alpha$ is set so that Vmin+$\alpha$ becomes lower than the level of the image data of the iris area. Then, the X coordinates and the Y coordinates of the pixels smaller than or equal to Vmin+$\alpha$ are detected. The area formed of a set of the detected pixels is set to be S'.

Subsequently, in step S57, the centroid of the area S' determined in step S56 is set to be the position of the center of the pupil. More specifically, the average of the X coordinates and the average of the Y coordinate of all the pixels contained in the area S' are determined, and the averaged X coordinate and Y coordinate are set to be the position of the center of the pupil.

In the above-described example, the centroid of the pixels corresponding to the pupil is used as the position of the center of the pupil. However, the middle point between the maximum and the minimum of the X coordinates and the middle point between the maximum and the minimum of the Y coordinates in the pixel area corresponding to the pupil may be determined, and such middle points are set as the center of the pupil. Since the pupil is generally circular, the image when the eyeball is rotated becomes an ellipse. Accordingly, the above-described processing can be performed.

By performing the above-described processing, the X coordinate and the Y coordinate of the Purkinje image and the X coordinate and the Y coordinate of the center of the pupil can be determined.

The pixels in the above-described processing may be actual pixels formed on the image capturing plane of the CCD 134, or may be virtual pixels collected from a plurality of adjacent pixels. If a collection of the plurality of adjacent pixels is used, the processing time can be reduced.

The sizes of the eye organs vary depending on the age, gender, or race, i.e., they vary depending on the individuals. Additionally, due to a variation in the line-of-sight-direction detecting portions depending on manufacturing of the individual cameras or the manner in which the head-mounted unit 2 is worn on the head, the position of the line-of-sight-direction detecting portion to the eye is slightly changed. Accordingly, the direction of the line of sight determined by the uniform parameters according to equation (12) cannot be always precise for all photographers.

For this reason, in the camera 1 of this embodiment, calibration for the direction of a line of sight can be optimally conducted according to the individual photographers.

Figure 58:
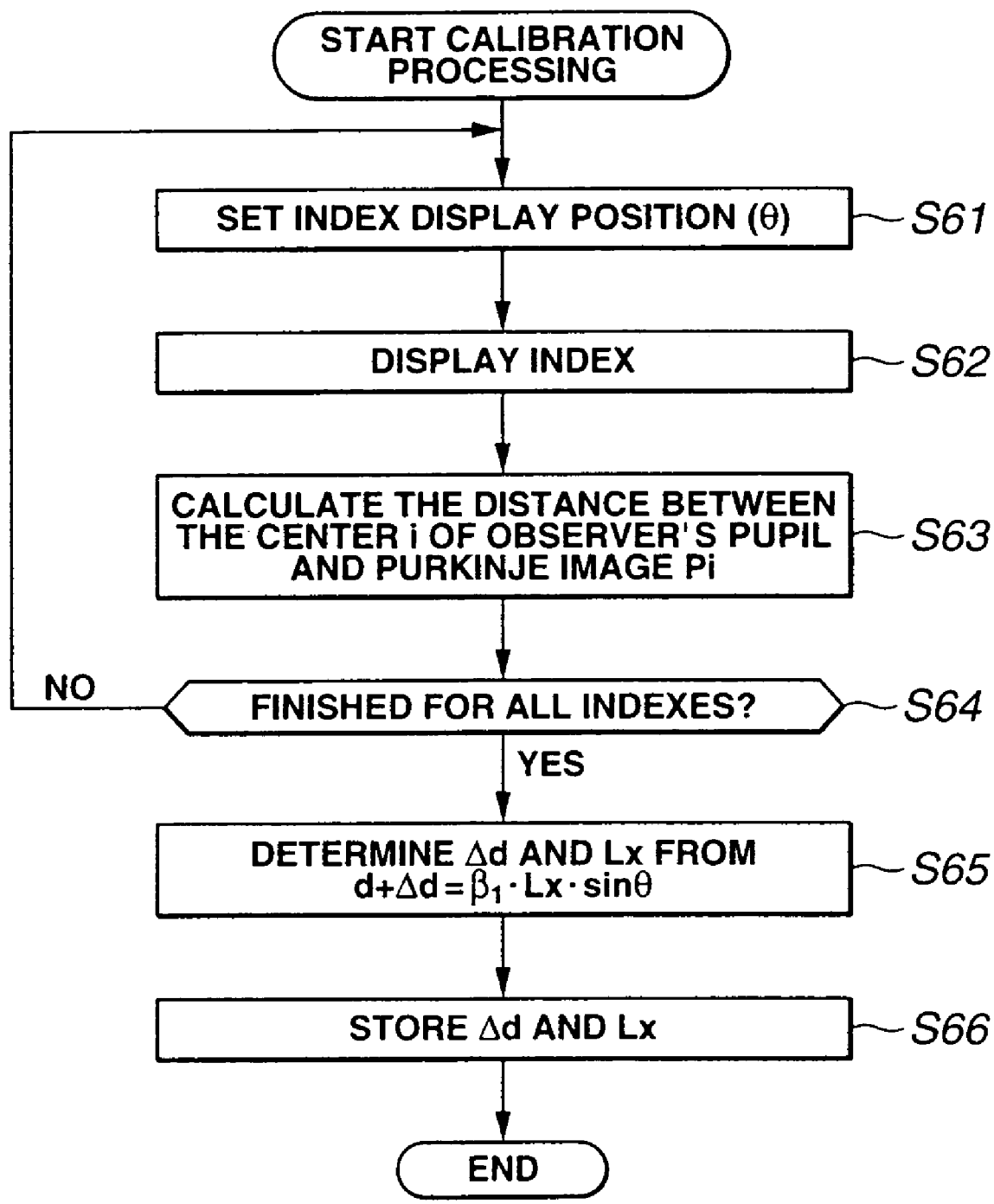
FIG. 58 is a flowchart illustrating calibration processing for detecting the direction of a line of sight in the same embodiment.

FIG. 58 is a flowchart illustrating calibration processing for the direction of a line of sight.

When the calibration mode is selected by operating, for example, the menu button 63, the menu selection switch 66, 67, 68, or 69, or the setting switch 65 of the first operation switch 162, the calibration processing is started.

In step S61, the calibration index to be used is selected from the indexes P1 through P5, such as those shown in FIG. 31.

Then, in step S62, the selected index is indicated in a see-through manner by blinking. As stated above, such an indication can be observed by the eye opposite to the eye for which the line-of-sight-direction/angular-velocity detecting portion 7 including the line-of-sight-direction detecting portion is disposed.

For example, the index P1 is first caused to blink, and the observer is instructed to see the index P1. When the observer sees the index P1, he/she performs a predetermined key operation. Upon detecting the input of the key operation, in step S63, the image data is input by the CCD 134 and the distance d between the center i of the pupil and the Purkinje image Pi is calculated based on equation (12). In this case, the value of the distance d obtained when the photographer sees the index P1 is set to be d1.

It is then determined in step S64 whether steps S61 through S63 have been finished for all the indexes P1 through P5.

If steps S61 through S63 have not been finished for all the indexes p1 through P5, the process returns to step S61, and the above-described processing is performed on the subsequent index to calculate distances d1 through d5 for all the indexes P1 through P5.

Equation (12) holds true only when the positional relationship is ideal. In actuality, various allowances have to be considered, as described above. Then, equation (12) is modified into the following equation by adding correction information Δd.

$$d + \Delta d \cong \beta_1 \cdot L_x \cdot \sin\theta \tag{13}$$

In equation (13), the angle θ is preset by the display position of one of the indexes P1 through P5 (indicated by θ1 through θ5 corresponding to the indexes P1 through P5, respectively). The distance d (d1 through d5) is detected by the line-of-sight-direction detecting portion. $L_x$ becomes different depending on the individuals.

In step S65, the above-described angles θ1 through θ5, the distances d1 through d5 determined in step S63, and the magnification $\beta_1$ of the image forming lens 132 are substituted into equation (13), thereby determining five equations (linear expressions) having unknown factors Δd and $L_x$. To determine the two unknown factors Δd and $L_x$, two linear expressions including those factors are established. Accordingly, 5C2=10 sets of solutions can be obtained. Then, predetermined statistical calculation is performed on the sets of solutions to determine Δd and Lx which can be considered to be optimal for each photographer.

Then, in step S66, Δd and $L_x$ are stored in the EEPROM 102, and the calibration processing is completed.

To detect the direction of the line of sight, Δd and $L_x$ obtained by the above-described calibration processing and the actually measured distance d between the center i of the pupil and the Purkinje image Pi are substituted into equation (13) so as to determine the direction θ of the line of sight.

The line-of-sight-direction data obtained as described above can be used in real time during the photographing operation, and also, it can be used when performing image editing after the photographing operation. Accordingly, when recording moving-picture data, the determined line-of-sight direction is recorded together with the moving-picture data in association with the detected time information.

To use the line-of-sight-direction data in real time during the photographing operation, the photographing optical system 31 of the image capturing device 30 can be automatically focused on a subject in the direction of the line of sight. In this case, the focal point in a predetermined area around the portion of the image formed on the CCD 87 corresponding to the line of sight should be detected by considering the parallax described with reference to FIG. 35.

FIG. 43 illustrates the structure of various data recorded in step S8 in FIG. 54.

The data recorded in the recording memory 157 has a structure, such as that shown in FIG. 43.

That is, the data is formed of a still-image data management area, a moving-picture data management area, an edited moving-picture data management area, a still-image data area, a moving-picture data area, an audio-data area, an angular-velocity data area, a line-of-sight-direction data area, and an edited moving-picture data area.

The still-image data management area is an area for managing still-image data recorded in the still-image data area in the auto mode (A) or in the manual mode (M), and the header addresses of the photographed still-image data are recorded.

The moving-picture data management area is an area for managing moving-picture data recorded in the moving-picture data area in predetermined units, and details thereof are described below.

The edited moving-picture data management area is an area for managing the edited moving-picture data area in which edited moving-picture data is recorded, and details thereof are also described below.

The still-image data area is an area in which still-image data is recorded.

The moving-picture data area is an area in which moving-picture data is recorded in predetermined units.

The audio-data area is an area in which audio data collected by the first microphone 17 and the second microphone 18 is recorded in predetermined units.

The angular-velocity data area is an area in which angular velocity data detected by the angular velocity sensors 141 and 142 is recorded in predetermined units.

The line-of-sight-direction data area is an area in which line-of-sight-direction data calculated by the first CPU 161 based on the image data from the line-of-sight-direction/angular-velocity detecting portion 7 is recorded in predetermined units. As the line-of-sight-direction data recorded in the line-of-sight-direction data area, the angle θ indicating the visual axis determined based on the image data from the line-of-sight-direction detecting portion of the line-of-sight-direction/angular-velocity detecting portion 7 may be recorded. Alternatively, the angle θ', which is corrected for the parallax, as expressed by equation (10), when a subject along the visual axis is viewed from the image capturing device 30, may be recorded, or the two angles θ and θ' may be recorded. In this manner, since the line-of-sight-direction data (line-of-sight-direction information) is recorded at predetermined time intervals, the amount and the speed by which the line of sight is continuously moved can be calculated. Accordingly, the line-of-sight-direction data includes at least one of the continuous moving amount and the moving speed of the line of sight.

The edited moving-picture data area is an area in which edited moving-picture data is recorded in predetermined units.

The basic concept of the structure of the moving-picture data is as follows.

It is necessary that the moving-picture data be recorded in temporal association with the audio data simultaneously recorded with the capturing of the moving-picture data and also with the angular-velocity data and the line-of-sight-direction data simultaneously detected with the capturing of the moving-picture data. In this embodiment, therefore, those items of data in every predetermined time interval are collected as a unit, and the header addresses in the memory area at which those items of data contained in the unit are recorded are recorded in the moving-picture data management area. Accordingly, by referring to the management data recorded in the moving-picture data management area, the moving-picture data, audio data, angular-velocity data, and line-of-sight-direction data contained in a desired unit can be accessed.

The cycle at which each of the moving-picture data, audio data, and angular velocity data is input is set to be, for example, 1/30 seconds, and the cycle at which the line-of-sight-direction data is input is set to be, for example, one second. Each item of data for one second is contained in one unit. In this case, 30 sets, one set being formed of the image data, audio data, and angular velocity data, and one item of line-of-sight-direction data are recorded in one unit. Accordingly, in the moving-picture data management area, data for managing 30 items of image data, data for managing 30 items of audio data, data for managing 30 items of angular-velocity data, and data for managing one item of line-of-sight-direction data are recorded for one unit. In the moving-picture management area, the same number of management data as the number of units is repeatedly recorded.

FIG. 44 illustrates a detailed configuration of the moving-picture data management area.

In the moving-picture data management area, the same number of management data as the number of files is recorded starting from the file name.

The management data concerning each file includes, as shown in FIG. 44, the file name, the flag (FLG), the start time, the end time, the unit size, and data concerning the unit (unit data).

The file name is the name provided for the moving-picture data. The flag (FLG) indicates whether or not the file has been edited. The start time indicates the time at which the photographing of the moving-picture data is started, and the end time indicates the time at which the photographing of the moving-picture data is ended.

The unit size is the size when the moving-picture data, audio data, angular-velocity data, and the line-of-sight-direction data are recorded in one unit.

The same number of unit data as the number of units contained in this file is provided. In one unit, the ADR(A) indicating the header address of the moving-picture data, ADR(B) representing the header address of the audio data, ADR(C) indicating the header data of the angular velocity data, and ADR(D) representing the header data of the line-of-sight-direction data are recorded.

Accordingly, by referring to this moving-picture data management area, the types of data recorded on the recording memory 157 can be identified, for example, as shown in FIG. 45. FIG. 45 illustrates an example of information obtained by referring to the moving-picture data management area.

In the example shown in FIG. 45, a list of file names recorded on the recording memory 157, the photographing date and time for each file, and whether the editing processing has been performed for each file is indicated.

FIG. 46 illustrates a detailed configuration of the edited moving-picture data management area.

In the edited moving-picture data management area, the same number of management data as the number of files of the edited moving-picture data is recorded starting from the file name.

The management data concerning each file includes, as shown in FIG. 46, the file name, start time, end time, photographing time, and recording area.

The file name, start time, and end time are similar to those recorded in the moving-picture data management area.

The photographing time is information concerning the total time of the photographed moving pictures.

In the recording area, the header addresses of a plurality of items of data for each unit having a predetermined unit size are recorded, as in the moving-picture data management area.

Figure 59:
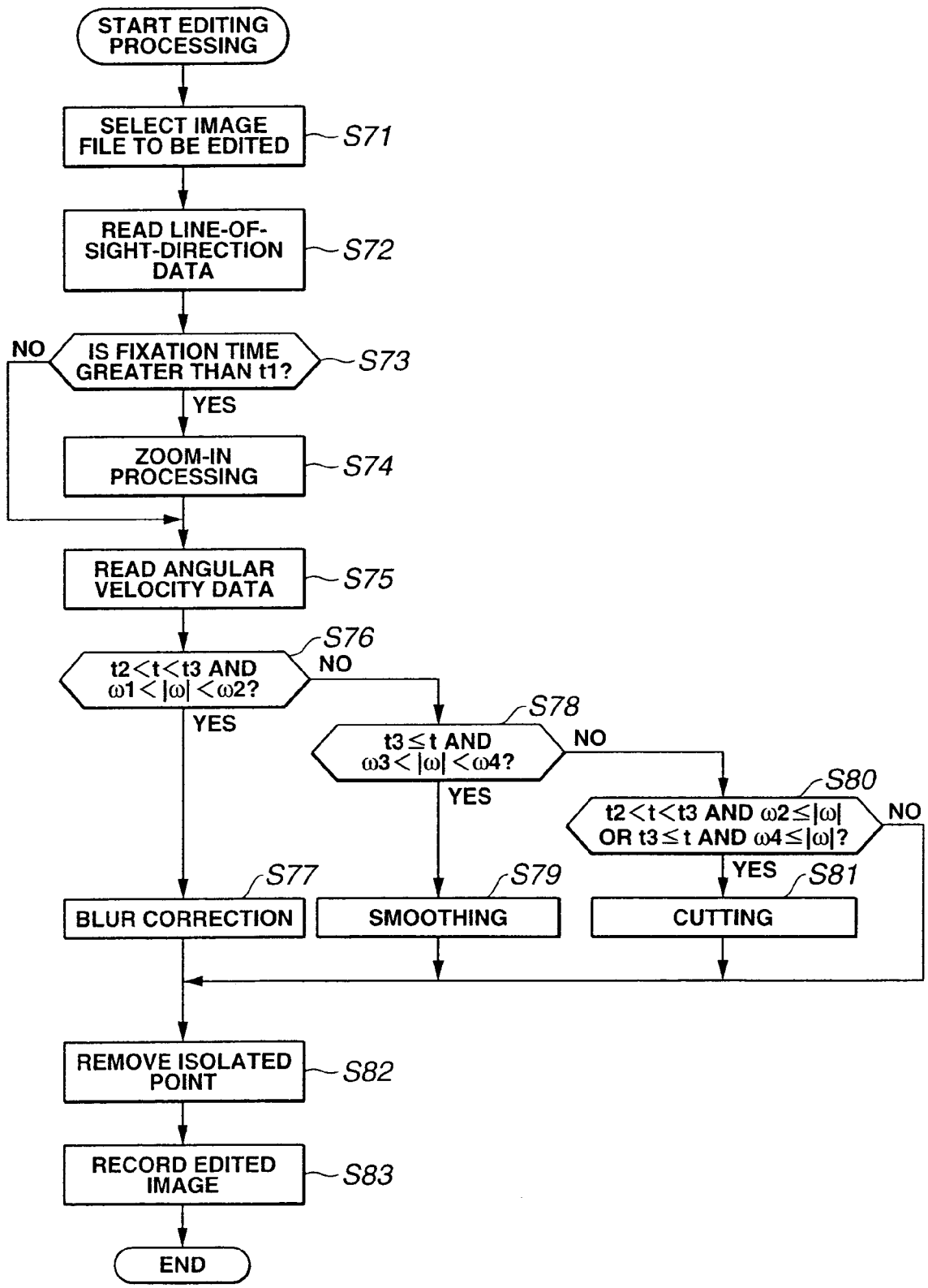
FIG. 59 is a flowchart illustrating editing processing in the same embodiment.

FIG. 59 is a flowchart illustrating editing processing.

This editing processing is started when selecting the editing mode by operating, for example, the menu button 63, the menu selection switch 66, 67, 68, or 69, or the setting switch 65 of the first operation switch 162.

After starting this processing, in step S71, continuously photographed image files (i.e., moving-picture files) are set as one unit, and a list of the photographing date, photographing time, and information indicating whether the files have been edited is indicated, as shown in FIG. 45. Then, at least one image file is selected from the image files by the operator.

Then, in step S72, by referring to the management information recorded in the moving-picture data management area, such as that shown in FIG. 44, the line-of-sight-direction data corresponding to the selected image file is read.

It is then determined in step S73 based on the read line-of-sight-direction data whether the fixation time (the time for which the photographer sees a subject) is longer than a predetermined time t1. A determination as to whether the photographer sees in a certain direction can be made whether a vector indicating the direction of the line of sight changes within a predetermined amount.

If it is determined in step S73 that the fixation time is longer than the predetermined time t1, in step S74, the zoom-in operation is performed.

Figure 47:
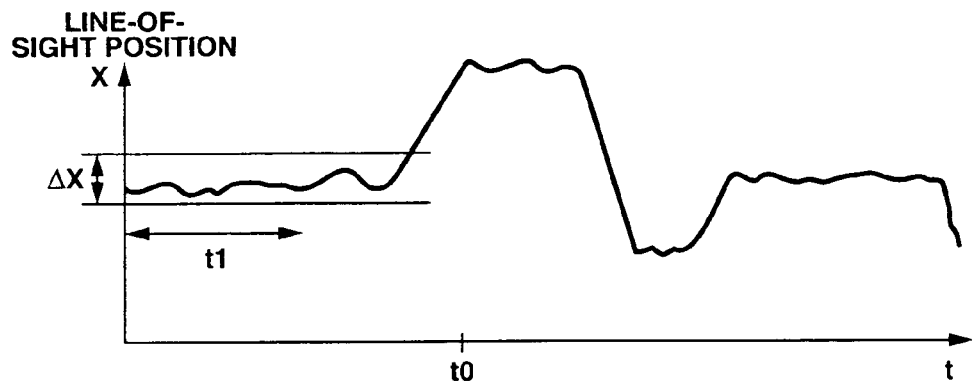
FIG. 47 is a diagram illustrating a line-of-sight position in the X direction with respect to a time change in the same embodiment.
Figure 48:
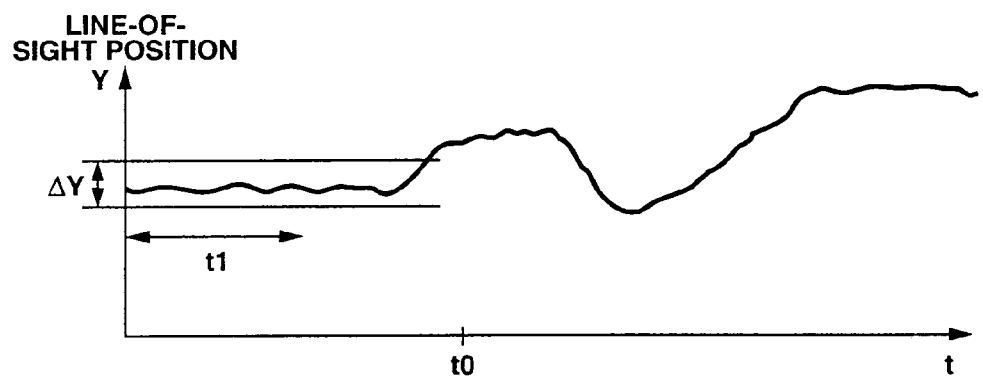
FIG. 48 is a diagram illustrating a line-of-sight position in the Y direction with respect to a time change in the same embodiment.
Figure 49:
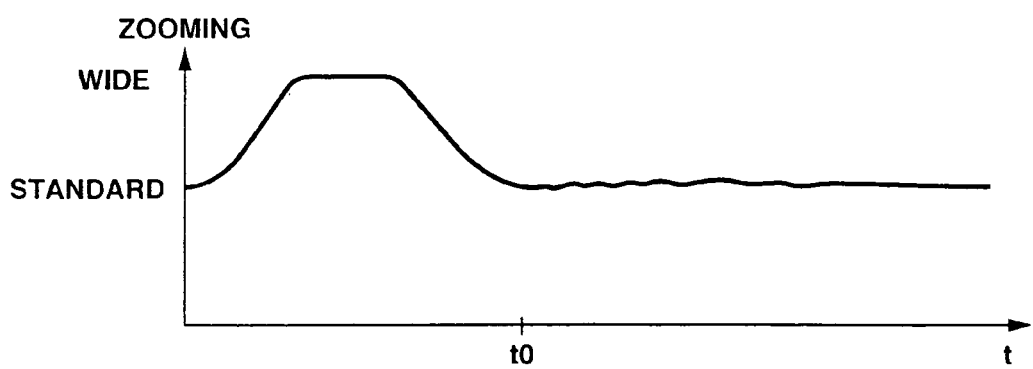
FIG. 49 is a diagram illustrating zooming with respect to a time change in the same embodiment.

The zoom-in operation is described below with reference to FIGS. 47 through 49. FIG. 47 illustrates the line-of-sight position in the X direction with respect to a time change. FIG. 48 illustrates the line-of-sight position in the Y direction with respect to a time change. FIG. 49 illustrates a time change in the zooming operation. In FIGS. 47 through 49, the time plotted in the horizontal axis indicates the same time at the same position.

The X axis and the Y axis are orthogonal with each other indicating a vector space representing the direction of the line of sight.

$\Delta X$ and $\Delta Y$ indicate a change in the line-of-sight position in the X direction and in the Y direction, respectively. When changes in the line-of-sight position in the X direction and in the Y direction are smaller than or equal to $\Delta X$ and $\Delta Y$, and when the fixation time is longer than the predetermined time t1, the image is slowly enlarged toward the fixation point, as shown in FIG. 49. That is, the image is simultaneously enlarged and trimmed (changing of the enlargement area) so that the fixation point is positioned at the center of the image. When the image is enlarged to a certain level, such a state is maintained for a while, and then, the image is reduced to the original magnification (standard field angle) toward the end t0 of the fixation time.

While the photographer is fixing a subject in a certain direction, he/she instantaneously may change the line of sight to another direction and then returns to the original direction. Such a movement is considered as noise, and can be ignored for calculating the fixation time. Since the image processing can be easily performed by the known moving-average method and noise handling, details thereof are omitted.

Referring back to FIG. 59, after step S74 or if it is determined in step S73 that the fixation time is longer than the predetermined time t1, in step S75, the angular-velocity data in the two directions (yaw direction and pitch direction) is read.

Figure 50:
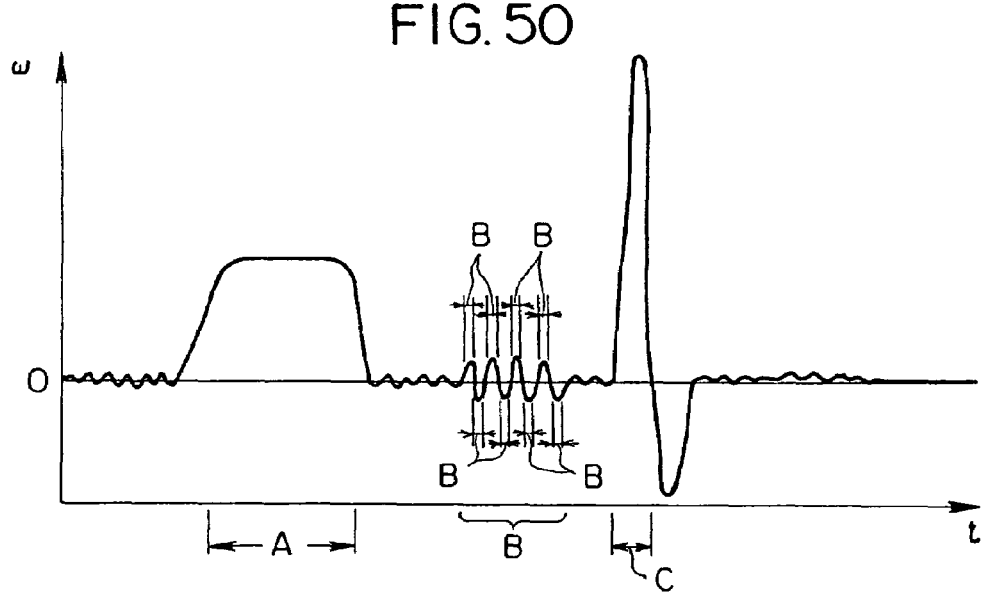
FIG. 50 is a diagram illustrating the angular velocity with respect to a time change in the same embodiment.
Figure 51:
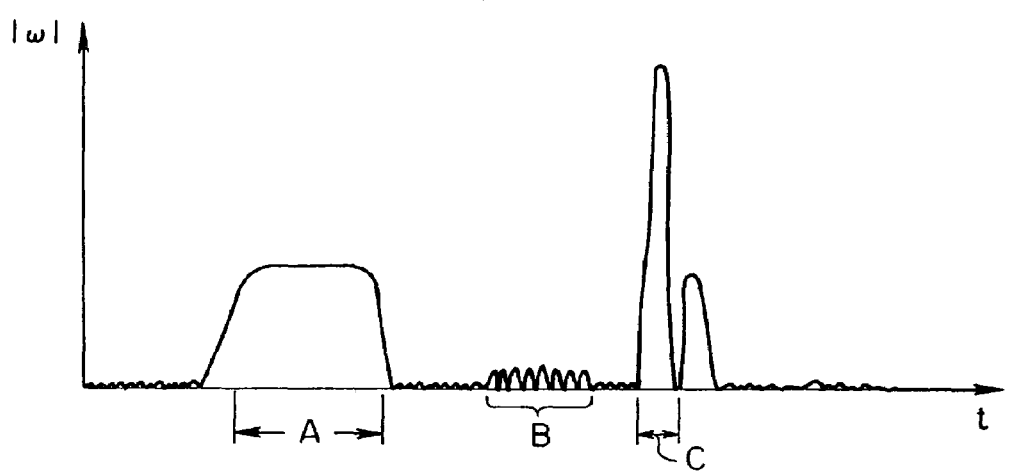
FIG. 51 is a diagram illustrating the absolute value of the angular velocity with respect to a time change in the same embodiment.
Figure 52:
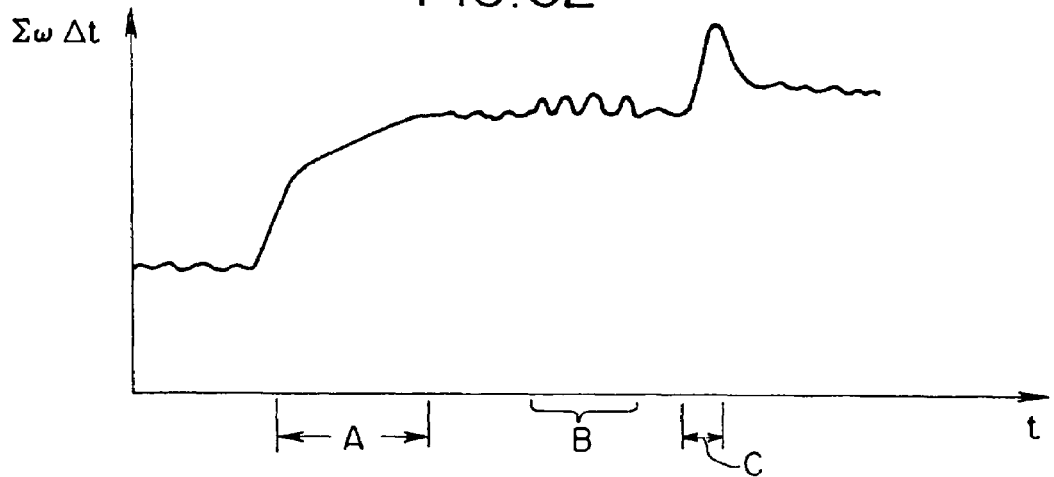
FIG. 52 a diagram illustrating the integrated value of the angular velocity with respect to the time in the same embodiment.

Thereafter, based on the read angular-velocity data, predetermined editing processing is performed. Before proceeding with an explanation of the editing processing, the basic concept of the editing processing is described below with reference to FIGS. 50 through 52. FIG. 50 is a diagram illustrating the angular velocity with respect to a time change. FIG. 51 is a diagram illustrating the absolute value of the angular velocity with respect to a time change. FIG. 52 is a diagram illustrating the integrated value of the angular velocity with respect to the time. In FIGS. 50 through 52, the time plotted on the horizontal axis indicates the same time at the same position. The integrated value ($\Sigma\omega\Delta t$) of the angular velocity shown in FIG. 52 corresponds to the amplitude.

The basic concept of the editing processing is as follows. A change in the angular velocity $\omega$ shorter than or equal to a very short time t2 is considered as noise and is ignored. Then, a predetermined time t3, which is longer than t2, is set to be a threshold, and if the duration time t is shorter than t3, it is determined that a vibration (i.e., blurring) in a short cycle has occurred. If the duration time t is longer than or equal to t3, it is determined that a change other than blurring has occurred. If it is determined that blurring has occurred, blurring is corrected, and if blurring cannot be corrected, cutting processing is performed. If it is determined that a change other than blurring has occurred, smoothing processing (a sudden change in the image is corrected to a smooth change so that the recording time is prolonged), and if the smoothing processing is not possible, cutting processing is performed.

Based on such a concept, more specific cases for the editing processing are described below with reference to zones A, B, and C shown in FIGS. 50 through 52.

In zone A, the duration time t is not shorter than t3. Thus, it can be considered that a change other than blurring has occurred, and the absolute value $|\omega|$ of the angular velocity is suitable for performing smoothing processing. Accordingly, smoothing processing is performed. More specifically, a certain number of frames according to the level of smoothing are inserted between the frames forming the moving picture. In this technique, however, as the level of smoothing is higher (a time change in the image is extended longer), the motion of the picture becomes clumsier. Thus, frames for interpolating the motion of the image data are generated and inserted.

In zone B, the duration time t is shorter than the predetermined time t3. Thus, it can be considered that blurring has occurred, and the absolute value $|\omega|$ of the angular velocity is suitable for performing blur correction. Accordingly, blur correction is performed.

In zone C, the duration time t is shorter than the predetermined time t3. Thus, it can be considered that blurring has occurred. However, since the absolute value $|\omega|$ of the angular velocity is too large to be subjected to blur correction, the cutting processing is performed on the image in zone C.

Although it is not shown, there may be a case where the duration time t is longer than or equal to the predetermined time t3 and it can be considered that a change other than blurring has occurred. However, if the absolute value $|\omega|$ of the angular velocity is too large to be subjected to smoothing processing, the cutting processing is performed on the image in this zone.

In the zone before zone A and the zone between zone A and zone B, the absolute value $|\omega|$ of the angular velocity is small enough not to require blur correction or smoothing processing. Thus, editing processing is not performed.

Figure 53:
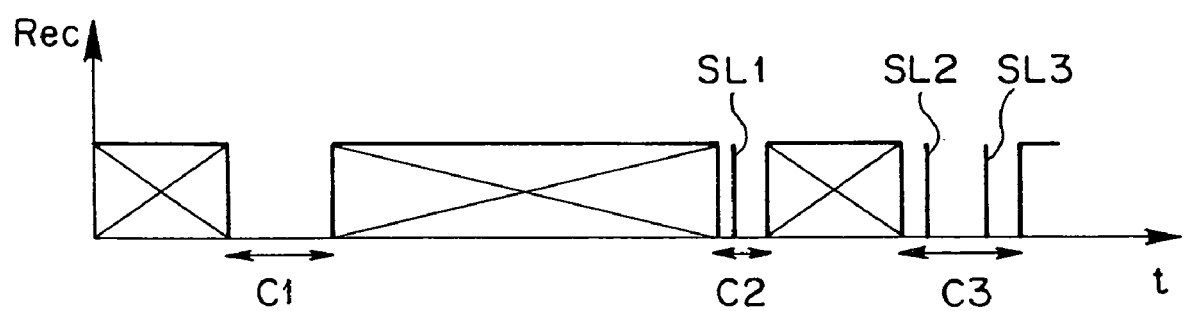
FIG. 53 illustrates isolated images remaining as a result of performing cutting in the same embodiment.

As a result of performing the cutting processing, isolated images may remain, as shown in FIG. 53. In FIG. 53, the presence or absence of images are indicated in binary form along the time axis. In the example shown in FIG. 53, zone C1, zone C2, and zone C3 are cut, and image SL1 in zone C2, image SL2 and image SL3 in zone C3 remain. Such isolated images are removed, as described below.

Referring back to FIG. 59, step S76 and the subsequent steps based on the above-described concept are described below.

It is determined in step S76 whether the duration time t for a change of at least one of the angular velocities in the two axes satisfies the condition t2<t<t3. If this condition is satisfied, it is further determined whether the absolute value $|\omega|$ of the angular velocity satisfies the condition $\omega 1<|\omega|<\omega 2$ ($\omega 1$ is the lower limit of the angular velocity requiring blur correction, and $\omega 2$ is the higher limit of the angular velocity requiring blur correction).

If the conditions in step S76 are satisfied, in step S77, blur correction is performed by known image processing.

If the conditions in step S76 are not satisfied, the process proceeds to step S78 to determine whether the duration time t for a change in the angular velocity $\omega$ satisfies the condition $t3 \leq t$. If this condition is satisfied, it is further determined whether the absolute value $|\omega|$ of the angular velocity satisfies the condition $\omega 3<|\omega|<\omega 4$ ($\omega 3$ is the lower limit of the angular velocity requiring smoothing processing, and $\omega 4$ is the higher limit of the angular velocity requiring smoothing processing).

If the conditions in step S78 are satisfied, in step S79, the above-described smoothing processing is performed.

If the conditions in step S78 are not satisfied, the process proceeds to step S80 to determine whether the duration time t for a change in the angular velocity $\omega$ satisfies the condition t2<t<t3 and whether the absolute value $|\omega|$ of the angular velocity satisfies $\omega 2 \leq |\omega|$ or whether the duration time t for a change in the angular velocity $\omega$ satisfies the condition $t3 \leq t$ and whether the absolute value $|\omega|$ of the angular velocity satisfies $\omega 4 \leq |\omega|$.

If the conditions in step S80 are satisfied, in step S81, the cutting processing is performed on the corresponding zone.

When the conditions in step S80 are not satisfied, the following three cases can be considered.

In the first case, although the duration time t corresponds to blurring (t2<t<t3), the absolute value $|\omega|$ of the angular velocity is smaller than or equal to the lower limit $\omega 1$. In this case, it is not considered that blur correction is required, and editing processing is not performed.

In the second case, although the duration time t corresponds to a change other than blurring ($t3 \leq t$), the absolute value $|\omega|$ of the angular velocity is smaller than or equal to the lower limit $\omega 3$. In this case, it is determined that a change in the direction is sufficiently gentle and that smoothing is not required. Thus, editing processing is not performed.

In the third case, the duration time t corresponds to noise ($t \leq t2$). The noise may occur in normal zones or in zones after performing cutting processing (i.e., the noise remain as isolated points, as shown in FIG. 53). The isolated points are removed by the processing described below.

That is, after step S77, S79, or S81, or if the conditions in step S80 are not satisfied, the process proceeds to step S82 in which isolated points are removed.

Then, in step S83, the edited moving-picture data is recorded on the recording memory 157, and the editing processing is completed.

When the image quality is found to be poor, it is improved as much as possible, and when correction is not possible, the cutting processing is performed, thereby obtaining high-quality images. This editing processing is automatically performed without the need for the photographer to perform a troublesome operation.

In the example of the editing processing shown in FIG. 59, zooming, cutting, smoothing, or blur correction is conducted based on biological information, such as the line-of-sight information or the angular velocity information. However, the editing processing is not restricted to the above-described type of processing. For example, a determination may be made based on a temporal change in a pattern of the angular velocity data as to whether the photographer is walking, and if the photographer is found to be walking, the zooming is changed to the wide mode. Conversely, if it is determined that the photographer is walking, part of the image may be extracted so that fluctuations in the image can be suppressed, and the extracted image is zoomed (enlarged) to the telephotographing mode. By performing this processing, fluctuations in the image can be suppressed so that the visually natural moving picture can be played back.

In the above-described image processing, after the photographing operation, the images are edited based on biological information, such as the line-of-sight information or the angular velocity information concerning the head, and then, the edited image data is recorded on a recording medium. However, the images may be edited in real time during the playback operation. More specifically, the content of predetermined editing processing (hereinafter referred to as the "editing information") and time information concerning the start time of the editing processing are stored in a memory in association with the original image and time information when the biological information is obtained. When the image data is played back, the original image data and the editing information are simultaneously read from the memory while maintaining the original image data, and then, the image data is played back while editing the original image data in real time based on the editing information. This type of editing processing is referred to as "dynamic editing processing".

Figure 60:
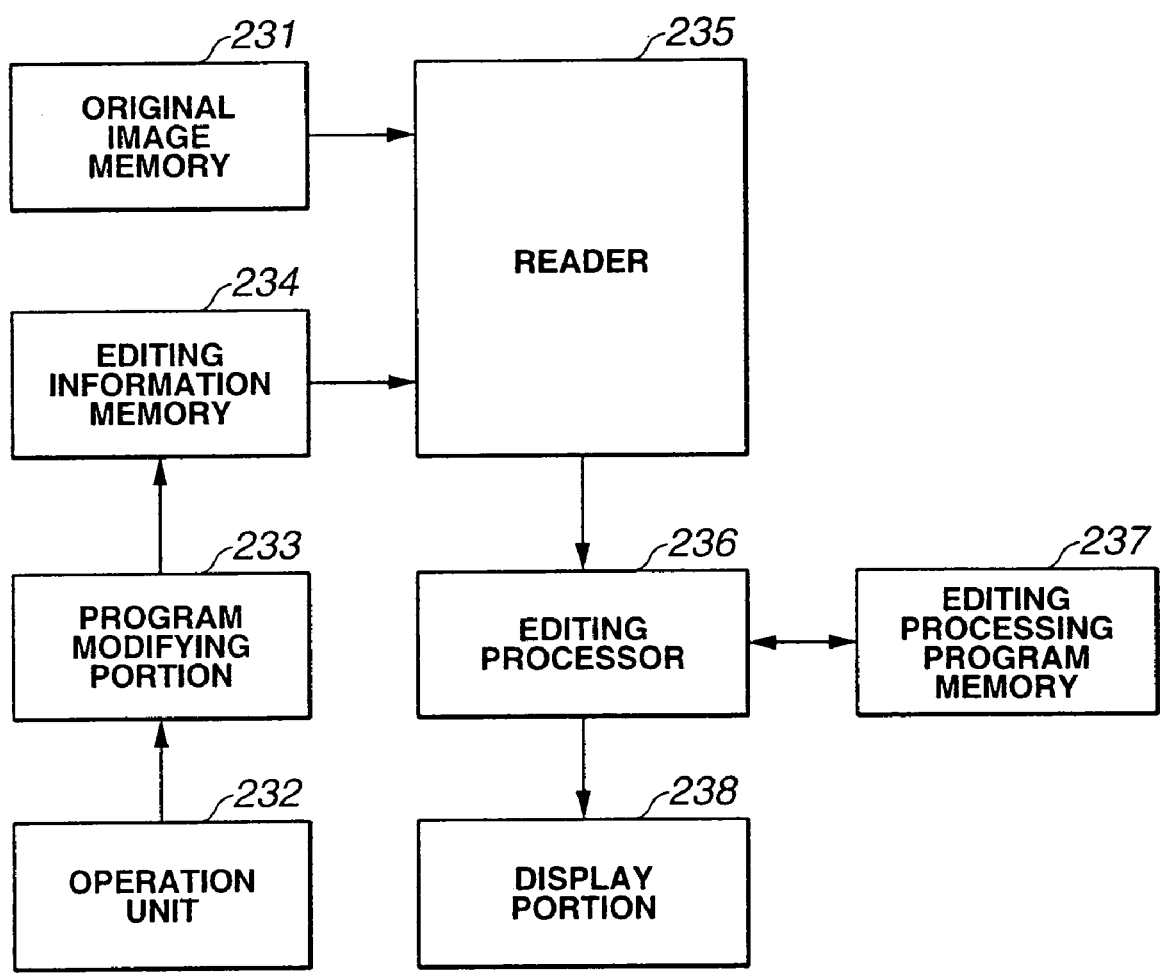
FIG. 60 is a schematic block diagram illustrating the configuration of a dynamic editing processing apparatus in the same embodiment.

FIG. 60 is a schematic block diagram illustrating the configuration of a dynamic editing processing apparatus.

The dynamic editing processing apparatus, which serves as both an image editing device and an image playback device, includes an original image memory 231, an operation unit 232, a program modifying portion 233, an editing information memory 234, a reader 235, an editing processor 236, an editing processing program memory 237, and a display portion 238.

The original image memory 231 is image-data recording means in which original image data is stored in association with time information concerning the time at which the corresponding original image is captured (obtained).

The operation unit 232 is operation means for externally operating the dynamic editing processing apparatus manually.

The program modifying portion 233 is editing-information modifying means for modifying editing information stored in the editing information memory 234 in accordance with the operation performed on the operation unit 232.

The editing information memory 234 is biological-information recording means in which code information (see FIGS. 61 through 70), which is described below, related to an editing processing program, such as that shown in FIG. 59, and editing information related to the original image data stored in the original image memory 231 are stored in association with the above-described time information. Biological information which is not used as the editing information can be recorded on the editing information memory 234.

The reader 235, which forms processing means, reads the original image data from the original image memory 231 and reads the editing information from the editing information memory 234 in accordance with the related time information, and transfers the read image data and editing information to the editing processor 236.

The editing processor 236, which forms the processing means, performs editing processing on the original image data read by the reader 235 by using the editing information (which is related to the original image data according to the time information) read by the reader 235.

The editing processing program memory 237, which forms the processing means, stores specific editing processing programs based on editing patters, which are described below.

The display portion 238, which is display means, displays image data processed by the editing processor 236 so that the user can observe the image data.

Details of the information stored in the editing information memory 234 are described below with reference to FIGS. 61 through 70.

Figure 61:
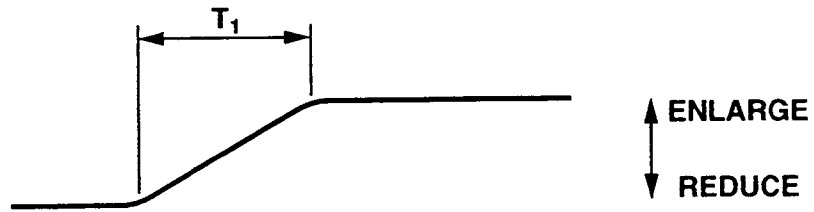
FIG. 61 illustrates a first zooming pattern in the same embodiment.
Figure 62:
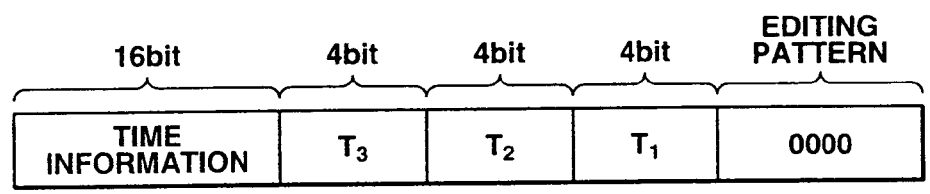
FIG. 62 illustrates zooming editing information stored in an editing information memory in accordance with the first zooming pattern in the same embodiment.
Figure 63:
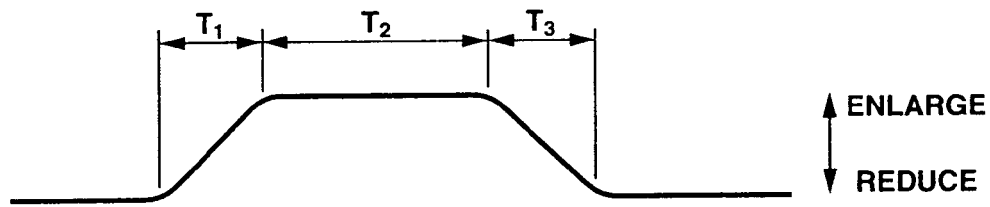
FIG. 63 illustrates a second zooming pattern in the same embodiment.
Figure 64:
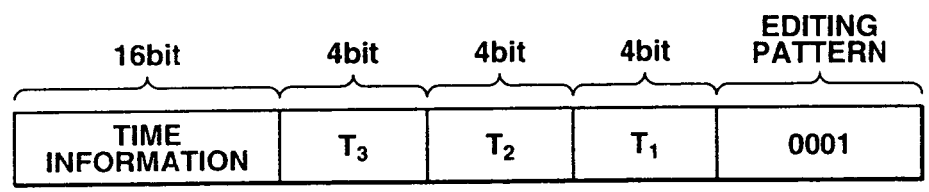
FIG. 64 illustrates zooming editing information stored in the editing information memory in accordance with the second zooming pattern in the same embodiment.
Figure 65:
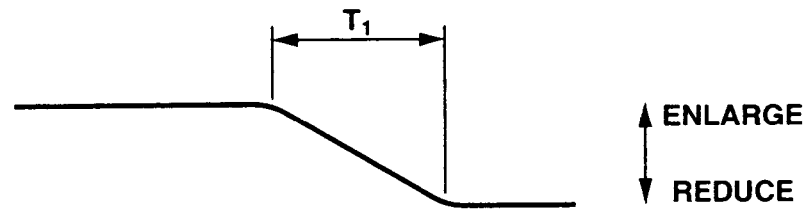
FIG. 65 illustrates a third zooming pattern in the same embodiment.
Figure 66:
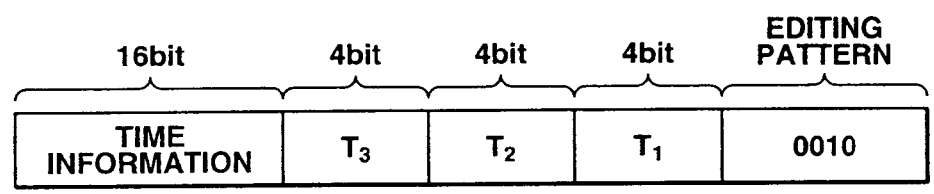
FIG. 66 illustrates zooming editing information stored in the editing information memory in accordance with the third zooming pattern in the same embodiment.
Figure 67:
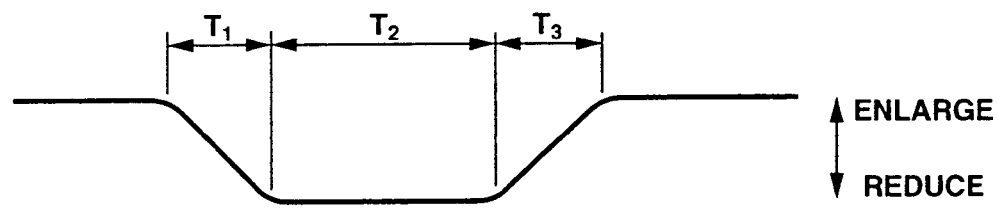
FIG. 67 illustrates a fourth zooming pattern in the same embodiment.
Figure 68:
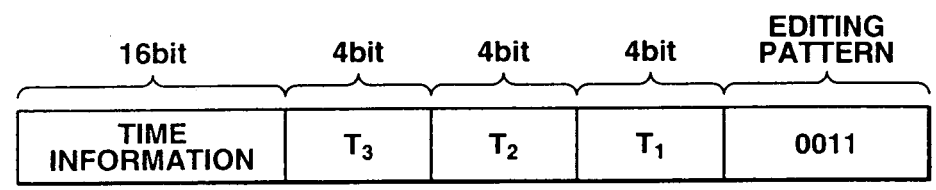
FIG. 68 illustrates zooming editing information stored in the editing information memory in accordance with the fourth zooming pattern in the same embodiment.

FIG. 61 illustrates a first zooming pattern. FIG. 62 illustrates zooming editing information stored in the editing information memory 234 in accordance with the first zooming pattern. FIG. 63 illustrates a second zooming pattern. FIG. 64 illustrates zooming editing information stored in the editing information memory 234 in accordance with the second zooming pattern. FIG. 65 illustrates a third zooming pattern. FIG. 66 illustrates zooming editing information stored in the editing information memory 234 in accordance with the third zooming pattern. FIG. 67 illustrates a fourth zooming pattern. FIG. 68 illustrates zooming editing information stored in the editing information memory 234 in accordance with the fourth zooming pattern.

In the first zooming pattern shown in FIG. 61, the subject is zoomed in (enlarged) during time $T_1$, and then, the zooming is maintained.

In this case, the zooming editing information shown in FIG. 62 is stored in the editing information memory 234. In this editing information, the lower four bits are a zooming pattern, the subsequent four bits are the first zooming time ($T_1$), the subsequent four bits are the stop time ($T_2$), and the subsequent four bits are the time for which the initial state is resumed ($T_3$), and the higher 16 bits are time information indicating the start time of the editing processing.

In this example the memory capacity for storing the time $T_1$, $T_2$, and $T_3$ is set to be four bits. However, a required number of bits can be allocated.

In the lower four bits, the zooming pattern code ("0000") indicating the first zooming pattern is stored.

Then, in the subsequent four bits ($T_1$), information concerning the zooming time shown in FIG. 61 is stored. In the first zooming pattern, code "0000" is stored in $T_2$ and $T_3$ since they are not defined.

In the second zooming pattern shown in FIG. 63, the subject is zoomed in (enlarged for time $T_1$, and then, zooming is maintained for time $T_2$, and the subject is then zoomed out (reduced) for time $T_3$.

In the second zooming pattern, the zooming pattern code "0001" is stored, as shown in FIG. 64. The time $T_1$, $T_2$, and $T_3$ are defined.

Then, in the third zooming pattern shown in FIG. 65, the subject is zoomed out (reduced) for time $T_1$, and then, zooming is maintained.

In the third zooming pattern, the zooming pattern code "0010" is stored, as shown in FIG. 66 only time $T_1$ is defined, and code "0000", indicating that data is undefined, is stored in the time $T_2$ and $T_3$.

In the fourth zooming pattern shown in FIG. 67, the subject is zoomed out (reduced) for time $T_1$, and then, zooming is maintained for time $T_2$, and the subject is then zoomed in (enlarged) for time $T_3$.

In the fourth zooming pattern, the zooming pattern code "0011" is stored, as shown in FIG. 68. The time $T_1$, $T_2$, and $T_3$ are defined and stored.

Figure 69:
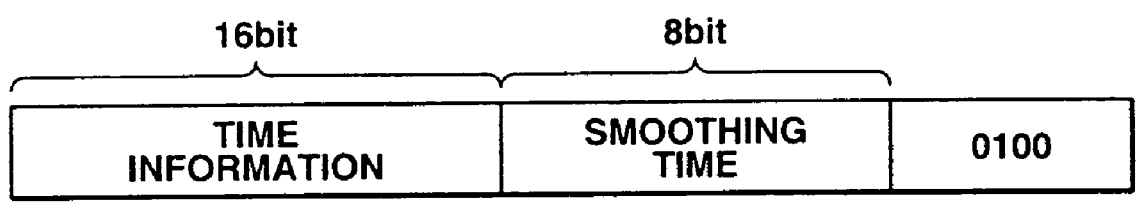
FIG. 69 illustrates an example of code representing smoothing editing information in the same embodiment.

FIG. 69 illustrates an example of code representing smoothing editing information.

In the lower four bits, code "0100" representing smoothing editing processing is stored. In the subsequent eight bits, the time interval (smoothing time) from the start to the end of the smoothing operation is stored. In the higher 16 bits, time information concerning the editing start time is stored.

Figure 70:
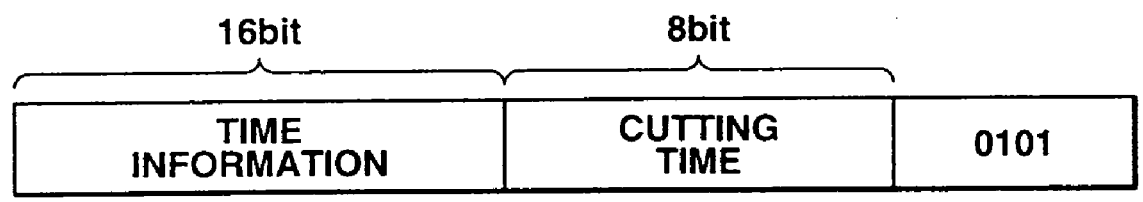
FIG. 70 illustrates an example of code representing cutting editing information.

FIG. 70 illustrates an example of code representing cutting editing information.

In the lower four bits, code "0101" representing cutting editing processing is stored. In the subsequent eight bits, the time interval from the start to the end of the cutting operation is stored. In the higher 16 bits, time information concerning the editing start time is stored.

Accordingly, the reader 235 reads the editing information stored in the editing information memory 234, simultaneously with the image data stored in the original image memory 231, in association with the time information.

The editing processing programs stored in the editing processing program memory 237 are programs for implementing editing patterns in accordance with the lower four bits of the editing information stored in the editing information memory 234.

The editing processor 236 then reads the editing pattern from the editing information read by the reader 235, and then reads the editing processing program corresponding to the editing pattern from the editing processing program memory 237, thereby executing the predetermined editing processing.

The image edited as described above is displayed on the display portion 238.

The above-described dynamic editing processing is automatically performed. However, it is convenient if the user can perform editing according to his/her taste. To satisfy this demand, in this embodiment, the operation unit 232 and the modifying portion 233 are provided, as shown in FIG. 60, so that the user can manually modify the editing information stored in the editing information memory 234 externally.

That is, to modify the editing information, a known playback function, such as pause, back, or slow, is used to modify the editing information, such as that shown in FIG. 62, 64, 66, 68, 69, or 70, while checking the image on the display portion 238. In this case, the editing result can be checked on the display portion 238, and since the original image remains stored, the editing operation can be repeatedly performed, thereby allowing the user to obtain the optimally edited image.

The above-described operation for detecting the direction of a line of sight requires an advanced technique and a high cost. Accordingly, providing the line-of-sight detector only for performing the above-described editing operation is not cost-effective. Thus, if only the editing operation is performed, angular velocity information can be used instead of the line-of-sight information, in which case, the cost-effectiveness can be improved while achieving advantages similar to those obtained by using the line-of-sight information. In this case, a determination is made based on the angular velocity information as to whether the angle of the head remains within a certain area for a predetermined time, and if this condition is satisfied, it is determined that the observer sees a subject in a certain direction. Then, processing similar to the processing based on the line-of-sight information, for example, zoom-in processing in step S74 of FIG. 59, can be performed.

By the use of the dynamic editing processing apparatus shown in FIGS. 60 through 70, the provision of a recording medium for storing edited image data is not necessary, and the memory capacity can be saved, which is particularly effective when recording moving picture data. Since editing information for performing automatic editing processing can be changed according to the individual's taste, editing processing reflecting a user's intention can be implemented.

In the processing shown in FIGS. 54 through 59, the processing concerning image capturing and detecting a line-of-sight direction is performed mainly by the second CPU 121, and the processing concerning the see-through image display and light projection for distance measurement is performed mainly by the fourth CPU 111. The AF processing and AE processing is executed mainly by the third CPU 103. The processing concerning recording, editing, playback of image data and detecting an operation performed on the operation switches are mainly executed by the first CPU 161. In this manner, the CPUs connected to the peripheral devices having the corresponding functions execute the processing related to the functions. However, since the CPUs are connected to each other, the processing may be distributed in a desired manner according to the processing performance.

Although in the above-described example the HOE 25 is used as the combiner of the see-through image display portion 6, a convex-lens optical system or a concave-lens optical system, a half mirror, a free-form optical element formed of glass or plastic, or a combination thereof may be employed.

As means for projecting an image in the see-through image display portion 6, the LED 113, the condenser lens 114, and the LCD 115 are used. Alternatively, another display device, such as an electroluminescence (EL) panel or a self-luminous plasma display, may be used.

According to the foregoing embodiment, biological information concerning the motion of a photographer is recorded, and based on the recorded biological information, predetermined editing processing is performed on the recorded image data. Thus, the configuration of the camera is simplified, and also, the photographer can take pictures without having to concentrate on a photographing operation. The photographer can behave as naturally as other people during a photographing operation without feeling bothered. Since image editing is performed based on the biological information concerning the photographer, image editing reflecting a photographer's intention can be automatically conducted. When editing processing is performed on recorded image data, complicated processing, such as predictive processing, required for performing editing in real time during a photographing operation is not necessary, thereby making it possible to perform editing processing relatively easily.

Since the image capturing device and the line-of-sight-direction/angular-velocity detecting portion can be worn on the photographer's head, a subject observed by the photographer can be detected with high precision.

Additionally, since the movement of the photographer's head is detected by the angular velocity, editing processing, such as correction for image blurring caused by the movement of the head, cutting, and smoothing (extension of the recording time), can be automatically performed.

Then, the direction of a line of sight, which is the fixation point of the photographer, is detected, thereby making it possible to automatically perform editing processing, such as electronic zooming (enlarge/reduce) and trimming. In this case, as the line-of-sight-direction information, at least one of the moving speed and the continuous moving amount in the line-of-sight direction is used, and thus, the photographer's intention can be more faithfully reflected.

By considering a parallax between the line-of-sight-direction/angular-velocity detecting portion and the image capturing device, the angle θ viewed from the image capturing device with respect to the line-of-sight direction θ detected by the line-of-sight-direction/angular-velocity detecting portion is determined. Accordingly, even when a subject is at a short distance, the photographic range (photographer's fixation point in an image to be captured) detected by the image capturing device corresponding to the line-of-sight direction of the photographer can be precisely identified. Thus, editing processing based on the line-of-sight information can be precisely performed.

The photographer is liable to perform a photographing operation by using the head-mounted display device while taking normal action, such as walking or driving. In this case, the photographer may be distracted by photographing information displayed on the display means, and he/she may collide an object in front. The camera of this embodiment detects such a dangerous situation, and gives a warning or prohibits the display operation. Thus, accidents can be prevented in advance.

To detect the line of sight, light reflected by the cornea, which is much brighter than that reflected by the other areas, is used. Accordingly, the rough position of the pupil can be easily determined. In this case, since an infrared LED is used for emitting infrared light to the cornea, the observer cannot be prevented from observing a subject.

Further, from a predetermined area including the position of the light reflected by the cornea, the pixel having the minimum value is detected, and then, a predetermined value is added to this minimum value, and the resulting value (which is greater than the minimum pixel value and smaller than the pixel value of the iris) is set as a threshold. Then, a group of pixels smaller than the threshold is determined as a pixel group belonging to the image of the pupil. Thus, the area of the pupil can be simply determined with high precision.

The centroid of the pupil is determined as the center of the pupil. Accordingly, even if some noise is contained in the image data, the position of the center of the pupil can be reliably determined with high precision.

Additionally, based on the position of the center of the pupil and the position of the light reflected by the cornea, the line-of-sight direction can be easily determined with high precision.

Original image data before being edited can be read from a recording medium and is displayed while being edited by using editing information based on biological information. In this case, the provision of a recording medium for storing edited image data is not necessary, and the memory capacity can be saved, which is particularly effective when recording moving picture data.

Since editing information for performing automatic editing processing can be changed according to the individual's taste, editing processing reflecting a user's intention can be implemented.

Additionally, since the eyesight-correcting lenses are disposed on the front surfaces of the transparent optical members, photographers having different eyesight levels can observe a predetermined image superimposed on a subject which is substantially directly observed (in this case, observed via the eyesight-correcting lenses).

A natural spectacle-type camera having aesthetically pleasant-looking appearance can be formed with a simple configuration.

Since the eyesight-correcting lenses can be easily removed separately from the transparent optical members, the eyesight correction can be easily performed depending on the user. Even if the eyesight of the left eye is different from the eyesight of the right eye, lenses having different eyesight levels can be fixed.

Additionally, the transparent optical members and the image capturing device are integrally held by the frame. Accordingly, even if eyesight-correcting lenses are replaced by a new pair, the angle adjustment between the transparent optical member and the image capturing device is not required. It is thus possible to provide an easy-to-use head-mounted camera with eyesight-correcting lenses.

[Appended Portions]

According to the foregoing embodiment of the present invention, the following configurations can be implemented.

[Appended Portion A1]

An image editing apparatus comprising:

biological-information recording means for recording biological information related to a movement of a photographer when the photographer observes a subject in association with time information concerning a time at which the biological information is recorded;

image-data recording means for recording image data in association with the time information; and processing means for reading the image data recorded by the image-data recording means and for performing predetermined editing processing on the image data based on the biological information recorded at the same time as the image data.

[Appended Portion A2]

The image editing apparatus according to appended portion A1, wherein the image data is obtained by being photographed by a camera worn on the head of the photographer.

[Appended Portion A3]

The image editing apparatus according to appended portion A1, wherein the biological information is angular velocity information concerning an angular velocity of the head of the photographer.

[Appended Portion A4]

The image editing apparatus according to appended portion A3, wherein, as the editing processing, at least one of cutting, blur correction, an extension of a recording time, and electronic zooming is performed on the recorded image data based on the angular velocity information.

[Appended Portion A5]

The image editing apparatus according to appended portion A1, wherein the biological information is line-of-sight-direction information concerning a direction of a line of sight of the photographer.

[Appended Portion A6]

The image editing apparatus according to appended portion A5, wherein electronic zooming is performed on the recorded image data as the editing processing based on the line-of-sight-direction information.

[Appended Portion A7]

The image editing apparatus according to appended portion A5, wherein the line-of-sight-direction information comprises at least one of a moving speed of the direction of the line of sight and a continuous moving amount of the direction of the line of sight. [Appended Portion A8] The image editing apparatus according to appended portion A1, wherein information concerning the editing processing is modifiable by a manual operation.

[Appended Portion A9]

An image editing method comprising the steps of:

recording image data and biological information related to a movement of a photographer when the photographer observes a subject in association with time information concerning a time at which the image data is recorded and a time at which the biological information is recorded; and reading the recorded image data and performing predetermined editing processing on the image data based on the biological information recorded at the same time as the read image data.

[Appended Portion A10]

An image editing program executed by a computer, comprising the steps of:

recording image data and biological information related to a movement of a photographer when the photographer observes a subject in association with time information concerning a time at which the image data is recorded and a time at which the biological information is recorded; and reading the recorded image data and performing predetermined editing processing on the image data based on the biological information recorded at the same time as the read image data.

[Appended Portion A11]

A recording medium for recording thereon an image editing program executed by a computer, the image editing program comprising the steps of:

recording image data and biological information related to a movement of a photographer when the photographer observes a subject in association with time information concerning a time at which the image data is recorded and a time at which the biological information is recorded; and reading the recorded image data and performing predetermined editing processing on the image data based on the biological information recorded at the same time as the read image data.

[Appended Portion B1]

A head-mounted camera comprising:

line-of-sight-direction detecting means for detecting a direction of a line of sight by detecting a movement of one of the eyeballs of a photographer;

display means for displaying predetermined photographic information on the other eyeball of the photographer;

image capturing means disposed separately from the eyeball of the photographer with a predetermined distance, for photographing an image of a subject;

parallax correcting means for correcting for a parallax generated between the line-of-sight-direction detecting means and the image capturing means; and computation means for computing a fixation point of the image photographed by the image capturing means based on the direction of the line of sight detected by the line-of-sight-direction detecting means after correcting for the parallax.

[Appended Portion B2]

The head-mounted camera according to appended portion B1, further comprising:

recording means for recording image data photographed by the image capturing means and fixation point data computed by the computation means in association with each other based on time information concerning a time at which the image data is generated and a time at which the fixation point data is generated.

[Appended Portion C1]

A head-mounted display device with a safety function, comprising:

display means for displaying predetermined information overlapped with an external image observed so that the predetermined information is observable; and safety means for preventing a danger that can be occurred while the predetermined information is displayed by the display means.

[Appended Portion C2]

The head-mounted display device with a safety function, according to appended portion C1, further comprising:

relative-velocity detecting means for detecting a relative velocity between an observer and an object in front of the observer, wherein the safety means performs at least one of an operation of giving a warning by using the display means and an operation of prohibiting the display by the display means based on a detection result obtained by the relative-velocity detecting means.

[Appended Portion C3]

The head-mounted display device with a safety function, according to appended portion C1, further comprising:

relative-velocity/relative-distance detecting means for detecting a relative velocity and a relative distance between an observer and an object in front of the observer, wherein the safety means performs at least one of an operation of giving a warning by using the display means and an operation of prohibiting the display by the display means based on a detection result obtained by the relative-velocity/relative-distance detecting means.

[Appended Portion C4]

The head-mounted display device with a safety function, according to appended portion C1, further comprising:

walking detecting means for detecting whether or not a photographer is moving;

wherein, when determining that the photographer is moving based on a detection result obtained by the walking detecting means, the safety means performs at least one of an operation of giving a warning by using the display means and an operation of prohibiting the display by the display means.

[Appended Portion C5]

The head-mounted display device with a safety function, according to appended portion C1, wherein the safety means comprises safety operation means for forcefully prohibiting the display by the display means by an operation.

[Appended Portion D1]

A line-of-sight-direction detecting device comprising:

two-dimensional photoelectric conversion means for capturing an image of an observer's eye and for converting the image into image data;

cornea-reflected-light detecting means for detecting a position of light reflected by a cornea of the observer based on the image data;

area setting means for setting a predetermined area including the position of the light reflected by the cornea in the image data;

minimum-value detecting means for detecting a pixel having the minimum value Vmin from pixels contained in the area set by the area setting means;

pupil detecting means for detecting a pixel group having values smaller than a value obtained by adding a predetermined value α to the minimum value Vmin from the area set by the area setting means; and line-of-sight-direction computation means for calculating a position of the center of the pupil based on the pixel group detected by the pupil detecting means and for computing a direction of a line of sight based on the position of the center of the pupil and the position of the light reflected by the cornea.

[Appended Portion D2]

The line-of-sight-direction detecting device according to appended portion D1, wherein the line-of-sight-direction computation means calculates a centroid position of the pixel group detected by the pupil detecting means and sets the centroid position to be the position of the center of the pupil.

[Appended Portion D3]

The line-of-sight-direction detecting device according to appended portion D1, further comprising:

infrared-light projecting means for irradiating infrared light to the observer's eye as parallel light.

[Appended Portion E1]

An image playback device comprising:

biological-information recording means for recording biological information related to a movement of an observer when the observer observes a subject in association with time information concerning a time at which the biological information is recorded;

image-data recording means for recording image data in association with the time information;

processing means for reading the image data recorded by the image-data recording means and performs predetermined editing processing on the read image data based on the biological information recorded at the same time as the image data; and display means for displaying the image after being edited.

[Appended Portion E2]

The image playback device according to appended portion E1, wherein the processing means processes the edited image data so that the edited image data is recorded on the image-data recording means, and the display means reads the edited image data from the image-data recording means and displays the edited image data.

[Appended Portion E3]

The image playback device according to appended portion E1, wherein the display means reads the image data before being edited from the image-data recording means and displays the image after being edited while allowing the processing means to perform the predetermined editing processing on the image data based on the biological information.

[Appended Portion E4]

The image playback device according to appended portion E1, further comprising:

operation means for inputting information concerning the editing processing by a manual operation; and editing-information modifying means for modifying, based on the information input by the operation means, the information concerning the editing processing on the biological information read from the biological-information recording means.

[Appended Portion E5]

The image playback device according to appended portion E1, wherein the image data is obtained by being photographed by a camera worn on the head of a photographer.

[Appended Portion E6]

The image playback device according to appended portion E1, wherein the biological information is angular velocity information concerning an angular velocity of the head of a photographer.

[Appended Portion E7]

The image playback device according to appended portion E6, wherein, as the editing processing, at least one of cutting, blur correction, an extension of a recording time, and electronic zooming is performed on the recorded image data based on the angular velocity information.

[Appended Portion E8]

The image playback device according to appended portion E1, wherein the biological information is line-of-sight-direction information concerning a direction of a line of sight of a photographer.

[Appended Portion E9]

The image playback device according to appended portion E8, wherein electronic zooming is performed on the recorded image data as the editing processing based on the line-of-sight-direction information.

[Appended Portion E10]

The image playback device according to appended portion E8, wherein the line-of-sight-direction information includes at least one of a moving velocity of the direction of the line of sight and a continuous moving amount of the direction of the line of sight.

[Appended Portion E11]

An image playback method comprising the steps of:

recording image data and biological information related to a movement of an observer when the observer observes a subject in association with time information concerning a time at which the image data is recorded and a time at which the biological information is recorded;

reading the recorded image data and performing predetermined editing processing on the read image data based on the biological information recorded at the same time as the image data; and displaying the image after being edited.

[Appended Portion E12]

An image playback program executed by a computer, comprising the steps of:

recording image data and biological information related to a movement of an observer when the observer observes a subject in association with time information concerning a time at which the image data is recorded and a time at which the biological information is recorded;

reading the recorded image data and performing predetermined editing processing on the read image data based on the biological information recorded at the same time as the image data; and displaying the image after being edited.

[Appended Portion E13]

A recording medium for recording thereon an image playback program executed by a computer, the image playback program comprising the steps of:

recording image data and biological information related to a movement of an observer when the observer observes a subject in association with time information concerning a time at which the image data is recorded and a time at which the biological information is recorded;

reading the recorded image data and performing predetermined editing processing on the read image data based on the biological information recorded at the same time as the image data; and displaying the image after being edited.

[Appended Portion F1]

An image recording device comprising:

a recording medium for recording image data and biological information; and grouping means for grouping the image data and the biological information recorded within a predetermined time in association with each other by time information concerning a time at which the image data is recorded and a time at which the biological information is recorded.

[Appended Portion F2]

The image recording device according to appended portion F1, wherein the biological information includes at least one of information concerning a tilting angle of a head and information concerning a direction of a line of sight.

Having described the preferred embodiment of the invention referring to the accompanying drawings, it should be understood that the present invention is not limited to the precise embodiment and various changes and modifications thereof could be made by one skilled in the art without departing from the spirit or scope of the invention as defined in the appended claims.

What is claimed is:

1. An image capturing apparatus comprising:
   an image capturing portion configured to be worn on a head of a photographer, for generating image data;
   a biological-information detector configured to be worn on the head of the photographer, to detect biological information concerning a movement of the photographer when the photographer observes a subject, the biological information being used for performing editing processing on the image data;
   an image-data recorder structured to record the image data in association with time information concerning a time at which the image data is generated; and
   a biological-information recorder structured to record the biological information in association with the time information concerning the time at which the image data is generated.

2. The image capturing apparatus according to claim 1, wherein the biological-information detector comprises an angular-velocity detector to detect an angular velocity of the head of the photographer as the biological information, and the biological-information recorder records information concerning the angular velocity in association with the time information concerning the time at which the image data is generated.

3. The image capturing apparatus according to claim 2, wherein, as the editing processing, at least one of cutting, blur correction, an extension of a recording time, and electronic zooming is performed on the recorded image data based on the angular velocity information.

4. The image capturing apparatus according to claim 1, wherein the biological-information detector comprises a line-of-sight-direction detector to detect a direction of a line of sight of the photographer as the biological information, and the biological-information recorder records information concerning the line-of-sight direction in association with the time information concerning the time at which the image data is generated.

5. The image capturing apparatus according to claim 4, wherein electronic zooming is performed on the recorded image data as the editing processing based on the line-of-sight-direction information.

6. The image capturing apparatus according to claim 1, further comprising an image editing processor that performs editing processing on the image data recorded in the image-data recorder based on the time information.

7. The image capturing apparatus according to claim 6, further comprising a display portion to display an image representing the image data processed with the editing processing, wherein the display portion displays the image processed with the editing processing, while causing the image editing processor to perform a predetermined editing processing based on the biological information.

8. The image capturing apparatus according to claim 7, further comprising: an operation unit to manually input information concerning the editing processing; and an editing-information modifying portion to modify, based on the information inputted with the operation unit, information concerning the editing processing based on the biological information.

* * * * *